United States Patent
Tietzen et al.

(10) Patent No.: US 11,113,713 B2
(45) Date of Patent: Sep. 7, 2021

(54) LINKING A TRANSACTION WITH A MERCHANT TO AN INTERACTION WITH AN AUGMENTED REALITY ADVERTISEMENT

(71) Applicant: Edatanetworks, Inc., Calgary (CA)

(72) Inventors: Terrance Patrick Tietzen, Edmonton (CA); Matthew Arnold Macpherson Bates, Beaumont (CA); Michael J. Kimball, Santa Ana, CA (US)

(73) Assignee: EDATANETWORKS INC., Calgary (CA)

( * ) Notice: Subject to any disclaimer, the term of this patent is extended or adjusted under 35 U.S.C. 154(b) by 0 days.

(21) Appl. No.: 16/996,060

(22) Filed: Aug. 18, 2020

(65) Prior Publication Data

US 2021/0056584 A1 Feb. 25, 2021

Related U.S. Application Data

(60) Provisional application No. 62/890,321, filed on Aug. 22, 2019.

(51) Int. Cl.
*G06Q 30/02* (2012.01)
*G06T 19/00* (2011.01)

(52) U.S. Cl.
CPC ..... *G06Q 30/0242* (2013.01); *G06Q 30/0205* (2013.01); *G06Q 30/0211* (2013.01); *G06T 19/006* (2013.01); *G06Q 30/0279* (2013.01)

(58) Field of Classification Search
CPC .................................................. G06Q 30/02
See application file for complete search history.

(56) References Cited

U.S. PATENT DOCUMENTS 9,071,886 B2 * 6/2015 Shkedi ............. H04N 21/23424
9,131,282 B2 * 9/2015 Shkedi ............. H04N 21/44222
(Continued)

FOREIGN PATENT DOCUMENTS

KR 10179373881 * 11/2017 ............. H04H 60/00

OTHER PUBLICATIONS

Yu, Hong Yeon; Kim, Nao Woo; Lee, Byung-Tak; Park, II Kyun, System and method of providing augmented reality advertisement service based on media ID junction (English), Nov. 7, 2017 (Year: 2017).*

*Primary Examiner* — Marilyn G Macasiano
(74) *Attorney, Agent, or Firm* — DeSandro Law Group PLLC; Bradley K. DeSandro

(57) ABSTRACT

Customers receive an incentive with use of an installed cellphone app to image an AR-bearing ad. Matches between data from the customer's accounts for each merchant are compared to the data in association with the customer's logical identifier for their cellphone, and particularly with each incidence of a rendering on their display screen of an AR view of a product advertisement containing the AR-triggering symbol to initiate the corresponding AR enhanced view of the ad. In conjunction with chronological time stamping of occurrences, a likelihood is derived that the customer's viewing of the AR enhanced product advertisement influenced the potential customer's subsequent purchase of the corresponding advertised product as evidenced within the potential customer's rich transactional data from the customer's debit and/or credit accounts. The certainty of each match is determined to further initiate the merchant's incentive to the customer which may be the merchant's donation to a community program.

20 Claims, 14 Drawing Sheets

(56) References Cited

U.S. PATENT DOCUMENTS

| | | | |
|---|---|---|---|
| 9,832,528 B2* | 11/2017 | Lejeune | H04N 21/26275 |
| 2009/0172723 A1* | 7/2009 | Shkedi | H04N 5/76 |
| | | | 725/32 |
| 2010/0037253 A1* | 2/2010 | Sheehan | H04N 21/2668 |
| | | | 725/31 |
| 2010/0274664 A1* | 10/2010 | Fernandez Gutierrez | G06Q 30/0241 |
| | | | 705/14.45 |
| 2012/0096489 A1* | 4/2012 | Shkedi | H04N 21/44222 |
| | | | 725/34 |
| 2012/0164938 A1* | 6/2012 | Jeong | H04N 21/84 |
| | | | 455/3.05 |
| 2012/0167135 A1* | 6/2012 | Yu | H04H 60/63 |
| | | | 725/35 |
| 2019/0313133 A1* | 10/2019 | Mcschooler | H04N 21/812 |

* cited by examiner

LINKING A TRANSACTION WITH A MERCHANT TO AN INTERACTION WITH AN AUGMENTED REALITY ADVERTISEMENT

FIELD

Implementations relate to a customer transaction for the purchase of a product influenced by a customer initiated impression of an augmented reality viewing of a product-related advertisement within a marketing system promoting links between community programs, merchants, members and possibly intermediaries.

RELATED APPLICATIONS

This application claims priority to U.S. Provisional Application Ser. No. 62/890,321, titled "Linking A Transaction With A Merchant To An Interaction With An Augmented Reality Advertisement," filed on Aug. 22, 2019, which is incorporated herein by reference.

BACKGROUND

Several systems presently exist that provide reward points or discounts to member customers. Most of these are set-up as loyalty systems whereby a loyalty card or number is provided to a customer. A customer may gain reward points when a transaction occurs and the loyalty card or number is provided at the point of the transaction. Generally, the use of the loyalty card or number is recorded at the point of sale device. Accumulated reward points can be redeemed for products, discounts, or other rewards. Such loyalty systems are provided directly by a merchant or by an organization representing one or more merchants.

Additionally, systems have been created whereby reward points accumulated by a user may be donated to an organization, such as a charitable organization. For example, U.S. patent application Ser. No. 11/746,502, which is hereby incorporated by reference, discloses an invention wherein a percentage of a transaction cost may be donated directly to a charitable organization. The choice to donate reward points, or a percentage (or other portion) of a transaction, to a charitable organization may be at the discretion of a customer. For example, the choice may be made at the time of registering with a loyalty program, so that specified future transactions will automatically generate a donation. Alternatively, the choice may be made at the point of redeeming reward points, whereby the customer can direct particular points to a charitable organization. Yet another option is for the choice to be made at the time of the transaction. systems may not enable merchants to suitably reflect these changing objectives in the manner in which benefits are accrued to cardholders in connection with financial transactions.

Retail brick and mortar displays advertising products for sale contain detailed information about a product's use, features, maintenance, etc. which can be overwhelming for a retail store customer. For this reason, overlaying the retail brick and mortar product advertisement display with an augmented reality (AR) data set corresponding to the product can be helpful to the consumer in understanding and being influenced to purchase the product. Such AR data set can include a quick start guide, images of the product's use and significance of such use to the customer, etc. While AR viewing of product advertisements can be helpful to influence the customer to purchase the product, there is a need in the state of retail consumer retail art to provide further incentives to cardholders to purchase products that also meet the merchant's changing objectives in manners in which benefits are accrued, as incentives, to cardholders in connection with financial transactions.

BRIEF DESCRIPTION OF THE DRAWINGS

Implementations will be better understood, and objects of implementations will become apparent when consideration is given to the following detailed description thereof. Such description refers to the annexed drawings wherein.

Figure 1:
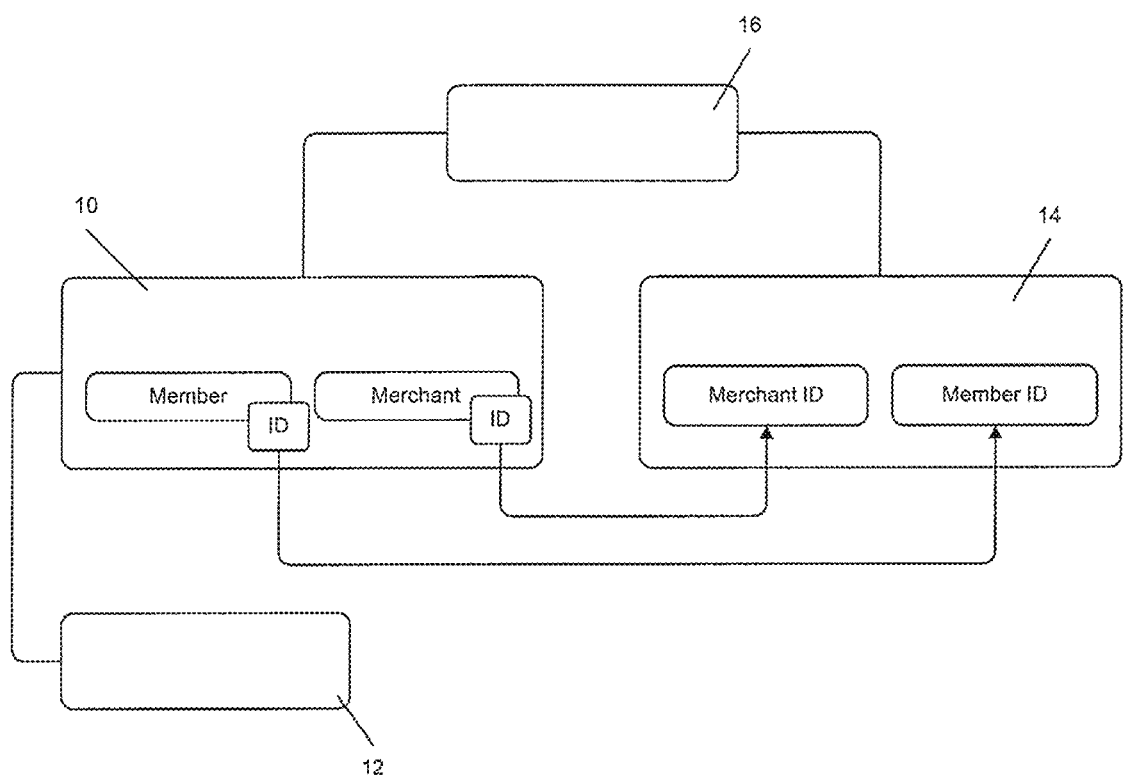
FIG. 1 is a systems view of the marketing program.

In the drawings, embodiments are illustrated by way of example. It is to be expressly understood that the description and drawings are only for the purpose of illustration and as an aid to understanding, and are not intended as a definition of the limits of implementations.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the invention. The following description of example embodiments is, therefore, not to be taken in a limited sense, and the scope of the invention is defined by the appended claims.

The functions or algorithms described herein may be implemented in software or a combination of software and human implemented procedures in one embodiment. The software may consist of computer executable instructions stored on computer readable media or computer readable storage device such as one or more memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

As used herein the term augmented reality (AR) is intended to also include one or more combinations of augmented reality, virtual reality, and mixed reality having both augmented and virtual reality components. As used herein the term "product" is intended to mean product and/or service. As used herein the terms "cardholder" or "financial card holder" are intended to mean an account holder of an account issued to the account holder by an issuing institution, such as an issuer bank. As used herein the term "merchant" is intended to mean a merchant having a merchant account issued to the merchant holder by an acquiring institution, such as an acquirer bank. As used herein the term "transaction" is intended to mean an account holder making a purchasing on an account issued by an issuing institution from a merchant for which clearing and settlement of the transaction results in a currency amount for the transaction being forwarded from the account holder's account to the merchant's account, and where clearing and settlement is proceeded by an authorization request for the transaction being forwarded to the issuing institution from the acquiring institution, and an authorization responding being forwarded from the acquiring institution back to the issuing institution.

Implementations include a system, data access management utility and a method of generating links between local merchants and community programs, whereby the merchant may provide incentives to customers in relation to community programs. Implementations may track community programs, as well as customer transactions, including both online and offline transactions, that occur between participants and that make use of the incentive, as further detailed below. Implementations may include as participants: customers, merchants, community organizations, intermediaries, and other groups or individuals, including merchants, members and intermediaries of the marketing system of implementations. Participants may have participant identifiers. The participant identifiers may be generated by the marketing system or may be linked to a payment source. Data may be collected about all participants, either expressly, or from offline or online transactions between participants utilizing a participant identifier, and such data may be stored in a data storage area. All data in the data storage area may be accessed by a data mining tool, a transaction linking utility, and an analytic mode, which may provide results that include information, such as details of consumer behaviour and analytic reporting. Matches between transactions and members may be identified by the transaction linking utility, and a level of certainty that the match is accurate may be determined.

For the purpose of this patent application, the term "community programs" may be understood to define an ongoing community program (such as a shelter in a community), a term community program (such as a charity funding drive), or a community event (such as a festival). The term "community programs" may further be understood to define a community program serving a specific area (such as a festival held in a local park), a community program serving a neighborhood (such as a neighborhood clothing drive), a community program serving a larger area (such as a city-wide hosting of a sporting event), or a community program serving a still wider area (such as a national literacy program, or an international development program).

Businesses in the marketing program are referred to as "merchants", while customers are referred to as "members". An entity granted limited participation in a marketing program, such as for a specific term, or only granted the ability to participate in specific activities, such as an advertising associate, may be referred to as an "intermediary". The term "participants" may reference any entity participating in a marketing program, including merchants, members, intermediaries, system administrator(s) and any other participant in the marketing system.

Implementations may involve an Internet, intranet or other networked environment. Therefore, any reference to any of Internet, intranet or other networked environment should be understood broadly to encompass not only the referenced term, but all of Internet, intranet or other networked environment. In the same manner terms indicating aspects of either the Internet, an intranet or another networked environment, such as a webpage in an Internet environment, should be understood broadly to include the equivalent available in the Internet, intranet or other networked environment.

The marketing system of implementations may be particularly advantageous for local or regional participant merchants. These merchants typically do not have a significant, if any, online presence (e.g., they may be strictly a "brick and mortar store"). Implementations may enable such merchants to benefit from access to, and/or generation of, real-time analytic information relating to members, community programs, and other information that would not otherwise be available to them. For example, the transaction linking utility, and the data mining tool of implementations, sometimes with an analytic mode, may be used by a local participant merchant store to derive actual or projected customer behaviour information and other reporting. As an example of the function of the marketing system, such information or reports may be utilized to design future incentive programs to be implemented by merchants and to generate links between local merchants and community programs operating in a nearby location.

Such links may include, for example, incentive programs that provide a donation to a community program based upon a purchase between a customer, such as a member of the marketing system, and merchant of the marketing system, incentive programs that occur during a community program event, such as a festival, or other incentive programs that link community programs and merchants. The links may be formed because the activities of the community program and the merchant become intertwined and/or inter-reliant. Returning to the prior examples of incentive programs, the link between the merchant and the community program occurs in the former example because donations are provided to the community program upon a purchase from a merchant, and in the latter example because the merchant incentive is only offered during the time of a community program event. The activities of the community program and the merchant become inter-reliant. A skilled reader will recognize that a variety of other links may be formed between merchants and community programs through a variety of other means or other types of incentive programs as well.

Overview

Implementations include generating links between local merchants and community programs, whereby the merchant may provide incentives to customers in relation to community programs. Each customer is eligible to receive the incentive after using their web enabled mobile computing device to image a product advertisement that includes an augmented reality (AR) triggering symbol. An installed app on the device initiates a corresponding AR enhanced view of the product advertisement that is rendered on the device display screen. Implementations may track community programs, as well as both online and offline customer transactions between participants that make use of the incentive. Participants may have participant identifiers, which may be linked to a payment source. Data may be collected about all participants, either expressly, or from offline or online transactions between participants utilizing a participant identifier, and said data may be stored in a data storage area. All data in the data storage area may be utilized by logic tool, which may provide information, such as details of consumer behavior and analytic reporting. Matches between rich transactional data from the customer's debit and/or credit accounts for each merchant is compared to the data that was stored in association with the customer's logical identifier for their web enabled mobile computing device, and particularly with each incidence of a rendering on their display screen of an augmented reality (AR) view of a product advertisement containing the AR-triggering symbol to initiate the corresponding AR enhanced view of the product advertisement. In conjunction with chronological time stamping of occurrences, a likelihood is derived that the customer's viewing of the AR enhanced product advertisement influenced the potential customer's subsequent purchase of the corresponding advertised product as evidenced within the potential customer's rich transactional data from the customer's debit and/or credit accounts. Each such match is determined to a level of certainty that the match is accurate and so as to further initiate the fulfillment of the merchant's incentive to the customer which may be the merchant's donation to a community program.

In one embodiment a system administrator of a marketing system may facilitate the collection of information regarding community programs. This may involve community programs providing information to the system administrator of their own volition and/or the system administrator searching for, and requesting, community program information. Such community programs may be occurring in the immediate, near or distant future. The information may be collected via an online search, a search of one or more community databases, from information sent by community programs to the administrator, or other means. Information regarding community programs may be stored in a data storage source, such as a database. Merchants, members and other groups or individuals may become participants in the marketing system. Each participant may have a participant identifier. Upon joining the marketing system, or after joining, the participants may provide information regarding themselves, including the location of the participant (e.g., a merchant's store(s) location(s), a customers home and/or work address, etc.) to the marketing system. The marketing system may store the information as data in the storage area.

The data in the storage area may be mined by a data mining tool. The data mining tool may be utilized by any participant of the marketing system. For example, the data mining tool may be used to match a community program to a participant merchant in the area where the community program is to occur, or is occurring. The result may be that a local participant merchant may be made aware of an upcoming local festival. The participant merchant may devise a merchant incentive in relation to the community program, such as a discount, a donation to the community program, a give away, a sweepstakes entry, rewards (such as reward points) or any other incentive.

The data mining tool may also be utilized to identify members of the marketing system who are identified as existing near the participant merchant store location. For example, the data mining tool may identify participant members living and/or working in the area of the merchant store location and/or one or more community programs, in accordance with member profile information and other data stored in the data storage area and any linked data sources. The data mining tool may also be utilized to identify participant members who may be likely to visit the merchant store and/or make use of the incentive, in accordance with demographic information or preferences derived from data stored in the data storage area and any linked data sources. A skilled reader will recognize that other information regarding a member, for example, such as transactional behaviour, may also be utilized to identify participant members who may be likely to visit the merchant store and make use of the incentive.

The merchant, or another market system participant working with the merchant, may advertise the merchant's one or more incentives and/or the community program to at least the members identified by the data mining tool. Such advertisements may be communicated to an identified member and/or other potential customers by way of a brick and mortar advertisement for a product, where the advertisement includes an augmented reality (AR) triggering symbol. The potential customer uses the camera of their personal web enabled mobile computing device to capture and render on the display screen of the web enabled mobile computing device an image of the product advertisement. An identification is made within the captured image of one or more AR triggering symbols. A look-up is performed for each of the identified AR-triggering symbols to find corresponding matches to one or more corresponding AR data sets. A retrieval is performed for each of the matching AR data sets. While the camera is capturing a corresponding identified AR-triggering symbol, a rendering is performed on the display screen of the corresponding matching AR data set. The rendering of each corresponding AR data set on the display will preferably be an augmented reality (AR) view of the product advertisement so as to overlay the captured image of product advertisement. As such, the potential customer experiences an AR enhance product advertisement.

Preferably, the AR view of the product advertisement will include a mention of one or more merchant incentives in relation to the community program, such as a discount, a donation to the community program, a give-away, a sweepstakes entry, rewards (such as reward points), or any other incentive to further incent the potential customer to purchase the advertised product. In alternative embodiments of the forgoing implementations, the particular AR view of the product advertisement that is experienced by the potential customer can be varied in accordance with retrievably stored information pertaining the potential customer. For instance, the potential customer's demographical categories, preferred favorite charities, residential community, past purchasing history, etc. can be used to particularize one or more AR data sets that are identified, accessed, retrieved, and used to render an AR enhanced product advertisement experience that has been micro-targeted for the potential customer.

In other implementations, various AR triggering indicia can be any combination of: (i) a bar code captured in an image by the camera of a web enabled mobile computing device; (ii) a QR code captured in an image by the camera of a web enabled mobile computing device; (iii) a particular geographic location detected by global positioning satellite (GPS) functionality of a web enabled mobile computing device; (iv) a particular combination of signals detected by blue tooth functionality of a web enabled mobile computing device; (vi) a particular combination of signals detected by WiFi functionality of a web enabled mobile computing device; (vi) a particular combination of audible ques detected by microphone functionalities of a web enabled mobile computing device. In alternative variations of the foregoing (iii) through (vi) AR triggering indicia, when received by a potential customer's web enabled mobile computing device, such AR triggering indicia can initiate a communication to the device stating, in effect, that one or more merchants are now offering AR enhanced product advertisements in their brick and mortar retail stores that can be experienced by the potential customer, after which the potential customer will be conditionally awarded an incentive in exchange for subsequently conducting a chronologically proximate online or offline transaction with the merchant.

In still other implementations, the incentive can be any combination of the following: (i) a special offer from the merchant to the potential customer; (ii) a special offer from a cross-selling merchant to the potential customer; (iii) specialized financing terms offered by the merchant to the potential customer; (iv) specialized financing terms offered by a third party creditor to the potential customer; (v) specialized donations offered by the merchant to a charity to be selected by the potential customer. When the potential customer experiences the AR enhance product advertisement and conducts a transaction with the merchant for the advertised product, the incentive is thereafter provided. Data acquired at each of the forgoing steps is information that can stored for later use in association with marketing studies pertaining to the customer, such as in artificial intelligence and/or neural networks.

Each other AR data set is similarly rendered while the camera is capturing the corresponding identified AR-triggering symbol. Data is stored so as to associate a logical identifier for the potential customer's web enabled mobile computing device with each incidence of the rendering on their display screen of each corresponding matching AR data set for the product advertisement.

Thereafter, rich transactional data from the potential customer's debit and/or credit accounts for each merchant is compared to the data that was stored in association with the potential customer's logical identifier for their web enabled mobile computing device, and particularly with each incidence of the rendering on their display screen of each corresponding matching AR data set for the product advertisement. These comparisons, in conjunction with chronological time stamping of occurrences, can be used to derive a likelihood that the potential customer's viewing of AR enhanced product advertisement influenced the potential customer's subsequent purchase the corresponding product as evidenced within the potential customer's rich transactional data from the potential customer's debit and/or credit accounts.

In other implementations, an incentive can be given to the potential customer as an award for experiencing one, or a combination of, AR enhanced product advertisements, even though the results of these experiences did not result in the potential customer purchasing the advertised product from the merchant or conducting any chronologically proximate transaction with the merchant. In such implementations, the awarded incentive may correspond to a particular combination of reach and frequency statistics, each being attributed to an advertising impression upon the potential customer.

In still other implementations, a potential consumer uses an 'app' installed on the consumer's smart phone in combination with focusing its camera on a product advertisement display that bears an AR triggering symbol. In such implementations, however, the particular AR triggering symbol initiates an instructive navigational AR experience by access to and use of retail store layout and geographical product location data. This AR experience is rendered to the potential customer, by use of the consumer's smart phone display screen so as to include AR walking instructions overlaid upon real world images captured by the camera that provide navigational guidance to enable the potential customer to walk inside the merchant's store to the location of each of several different products that are sold (or may be eligible for particular incentives) in the merchant's retail store. By way of example, and not by way of limitation, the overlaid AR guidance symbols may include pointers, arrows, aisle signs, textual directions, tactual perception indicators such a haptic, kinaesthetic, sensory, or tactile feedback(s) and/or audible tone(s) rendered by the smart phone, etc.

In an embodiment that involves cross-selling or cross-loyalty, as described in more detail below, implementations may facilitate consecutive, or simultaneous, communication of related incentives. For example, incentives of two merchants involved in a cross-selling program may be communicated either immediately one after the other, or together. The communication may further indicate a link or other connection between the incentives based upon the cross-selling program. A skilled reader will recognize that a variety of ways to indicate cross-selling or cross-loyalty incentives may be provided.

In one embodiment, a merchant may have an option regarding setting the prominence of the communication of an incentive to a member or other participant. For example, a merchant may make a request, and may pay a fee, for a particular prominence of an incentive in a communication to a member, other participant or any third parties. A merchant may also be given the opportunity to bid for a more prominent communication or display of an incentive to a member, participant of the marketing system, or third party. A skilled reader will recognize that prominent communication or displays of an incentive may involve a variety of criteria, such as, for example: the time of day when a communication occurs via radio; the positioning of an incentive on a webpage, printed page, or list showing one or more incentives; the typeface or graphics (e.g., bold, coloured, etc.) of an incentive on a webpage or printed page; etc.

After a potential customer has viewed a rendering on their display screen of a matching AR data set for a product advertisement, and a match is made with a predetermined threshold of likelihood that the potential customer made a corresponding purchase of the advertised product, the customer may redeem the incentive, through an online or offline transaction. Transaction details of transactions occurring between a merchant and a participant or third party, may be stored in the data storage area. At the time of the transaction, a member, or other participant, may provide a marketing system participant identifier to a merchant.

Transaction details may be transferred to the marketing system for storage and mining by a variety of means and at a variety of times. For example, transaction details may be transferred to the marketing system in real-time (e.g., as a transaction occurs and concludes), near real-time (e.g., almost immediately after a transaction concludes), and/or after a time lapse (e.g., at the end of a time period, such as a set time(s) during a day, at the end of the day, at the end of a week, at month-end, or at any other time after a transaction is finished, information regarding one or more transactions may be provided to the marketing system). The data mining tool may be utilized to collect data from the storage area, and possibly other data sources, to generate specific information, for example, such as information regarding consumer behaviour data that may provide: one or more reports pertaining to a particular incentive (e.g., success of an incentive); information to be utilized to create a new incentive; suggestions of new incentives; or other information.

In particular, the data mining tool may be utilized to determine if a transaction occurred as a result of an incentive directed or directly included with the potential customer's viewing of a rendering on their display screen of a matching AR data set for a product advertisement, where a match is made with a predetermined threshold of likelihood that the potential customer made a corresponding purchase of the advertised product. The AR-enhanced viewing of the product advertisement, if followed by a transaction with a particular period of time, may be assumed by the marketing system to indicate that the transaction occurred based upon the incentive borne or otherwise communicated in the AR-enhanced viewing of the product advertisement. It is also possible for a post-transaction survey to be provided to the participant who engaged in the transaction, and data collected from the survey may establish that the transaction occurred due to the incentive borne or otherwise communicated in the AR-enhanced viewing of the product advertisement. Such data may be utilized by the marketing system, merchant, and/or other participants to make determinations about future incentives, success of past incentives, marketing strategies, and other decisions.

Embodiments may include a transaction linking utility to access the data in the data storage area or data extracted or analyzed by the data mining tool and the analytic mode, and to utilize this data to identify links between a transaction and a member's viewing of the incentive borne or otherwise communicated in the AR-enhanced viewing of the product advertisement. For example, the transaction linking utility may analyze the data to recognize the existence of links or matches between transactions and other AR-enhanced product advertisement viewing behavior or activities of members or users. As such, the transaction linking utility may be operable to identify a match between one or more AR-enhanced viewings by a member and a later transaction when the member purchases a product or service at a merchant's store that the member had viewed the incentive borne or otherwise communicated in one or more AR-enhanced viewings of one or more product advertisements. The transaction linking utility may further determine a likelihood or level of certainty that a transaction resulted from an earlier AR-enhanced product advertisement viewing by a member. This operability of the transaction linking utility is described in more detail below.

A skilled reader will recognize that the transaction linking utility may utilize a wide variety of data to undertake its function and may link a transaction to a wide variety of AR-enhanced product advertisement viewing behaviors or activities by a member, and may determine the link to be of varying degrees of likelihood or certainty. The transaction linking facility may also involve data such as member profile data, including a member's financial card information, a member's use of one or more identified web enabled mobile computing devices each being capable of rendering AR-enhanced product advertisement viewing, or a member's identification, to determine a link between a member and a transaction.

Participants of the marketing system, other than the administrator, may not be provided with direct access to the data stored in the data storage area. Thus, any personal information regarding a participant stored in the data storage area will not be accessible by participants. Additional security measures may be included in the marketing system to ensure that personal information regarding a participant stored in the data storage area will not be disseminated to participants. Such security measure may further include means whereby the data mining tool, transaction linking utility and analytic mode may generate information in a manner so that such information is devoid of personal information regarding specific participants. In this manner, privacy of information, including personal information, may be maintained by the marketing system. Privacy of information of the marketing system may meet or exceed any regulations regarding private information in a specific location or wider area.

Benefits Over the Prior Art

Implementations may offer many benefits over the known prior art. For example, many local merchants lack the ability to access information sources that offer both: information regarding community programs local to a merchant store location; and customer participant information. The data and other information either stored in the data storage area of the marketing system of implementations, or in other data sources that are accessible by the marketing system, may be queried to identify members likely to make use of a merchant incentive. Implementations permits local merchants to become participants of the marketing system and to access this information. Implementations also offers a greater level of control to the merchant to create specific incentives related to community programs and to track the use participant members make of the incentives. Merchant store locations can be easily linked into community programs in the same locality.

Implementations provides an additional benefit, in that, after the participant customer initiates a documented AR-enhanced product advertisement viewing, the tracking of participant customer transactions in which the corresponding product is purchased, and that make use of an incentive, does not require a point of sale system. The prior art generally utilizes a point of sale device to track transactions made by a customer having a rewards number or card at a store. Point of sale systems are expensive and may lack compatibilities with other point of sale systems utilized by other merchants. In implementations, as tracking of transactions between merchants and members does not occur by way of the point of sale system, it is not necessary for a merchant to install an expensive point of sale system having tracking capabilities required by the prior art. Thus, implementations may provide a cost-effective means of tracking transactions as compared to expensive prior art systems. Additionally, implementations allows for transaction tracking to occur whether the transaction occurs online or offline. For example, a participant customer, after initiating a documented AR-enhanced product advertisement viewing, and thereafter making a transaction in a brick and mortar location of a participant merchant may be trackable in accordance with implementations. Moreover, any participant merchant incentive may be applied to a participant customer transaction that occurs either online or offline.

Still other benefits of implementations include the wide range of information that is collected in a common data storage area for use by the data mining tool, the transaction linking utility and the analytic mode, and the operability of the data mining tool, the transaction linking utility and the analytic mode to prevent dissemination of private and/or personal information.

Prior art inventions do not involve the collection of the breadth of information into a single location that is accessible by a data mining tool, a transaction linking facility and an analytic mode, that implementations achieves. Nor do prior art inventions limit the accessibility of private and/or personal information as effectively as implementations.

Another benefit of implementations over the prior art, is that, should the incentive involve a donation to a community program, the donation is reportable by the data mining tool in a clear manner. The result may be that implementations offers accountability in its reporting of donations. This accountability may also be the standard for donations to community programs made by participants of the marketing system by other means than incentives. The donator can see that the donation amount has been passed by a payment source to the community program.

Still another benefit of implementations over the prior art is that implementations may have several results for participants not achieved by prior art inventions.

Implementations may increase revenues of merchants by increasing transactions of the merchants that are participants of the marketing system due to customer (including participants) interest in, or loyalty to, community programs.

Implementations may increase customer (including participant) awareness of a local participant merchant store by permitting searching for merchants who offer AR-enhanced product advertisement viewings, communicating incentives from the merchant to members, mapping features showing merchant locations, and other features of implementations.

Implementations may also increase merchant goodwill by promoting the merchant's support of one or more community programs. Implementations may increase support of community programs by making it easier for merchants to become cognizant of community programs occurring near merchant stores in the same locality as the community programs. The support of community programs by merchants may be financial, or may be by increasing participant consumer awareness of community programs occurring in a particular location.

System

Implementations may include a marketing system involving a web server accessible by an administrator, one or more merchants, and one or more members registered with the marketing system. The web server may also be accessible, by way of specified and possibly limited access, by one or more intermediaries registered with the marketing system and third parties. The web server may be linked to a data storage area. Data pertaining to the administrator, merchants, members and/or intermediaries may be stored in the data storage area. Some data pertaining to third parties may also be stored to the data storage area in some embodiments of implementations. At least one participant identifier may be stored in the data storage area for each registered participant of the marketing system.

The web server may be operable so that a merchant may provide information to the web server regarding one or more transactions between a merchant and a customer. The customer may be a member of the marketing system. A skilled reader will recognize that data pertaining to a transaction between a merchant and a member, or other customer, may be transferred to the web server by a variety of means, for example, such as via manual entry, via another communication means, etc.

In one embodiment, a point of sale facility may also be utilized by the marketing system in some embodiments of implementations. The point of sale facility may be in communication with the web server, and may pass information regarding a transaction occurring between a merchant and a customer to the web server. The customer may be a member of the marketing system.

In another embodiment, data, or other information, may be transferred regarding a member or other participant from a separate data source, such as a data base, to the marketing system. For example, a member may be a financial card holder, and all financial card holders may be given the option to become members of the marketing program. The financial card company may also become an intermediary of the marketing system. Once a financial card holder agrees to become a member of the marketing system, information and other data regarding the financial card holder, as gathered by the financial card company, may be either transferred to the marketing system, or may be made accessible by the marketing system.

A skilled reader will recognize that other groups may become members, such as, for example store card holders, members of a community group, such as a co-op, bank card holders, or any other group, and that the persons involved in the group may become members of the marketing system. The group may gather information independently from the marketing system and this information regarding persons who become members of the marketing system may be made available to the marketing system via a transfer, or via access to the data source of the group.

The persons involved in the group may be granted an identification, such as a numeric identification. This identification may be acknowledged by the marketing system, so that when a person involved in the group becomes a member of the marketing system, the marketing system stores the identification provided by the group. The identification may be stored in the marketing system as the participant identifier. In some embodiments more than one participant identifier may be stored in the marketing system for a member, or a participant identifier may be stored and other identifications may also be stored. Any transaction that occurs and utilizes the identification may be recognized by the marketing system as a transaction involving the member whom the identification represents.

For example, a financial card holder may be granted a financial card number. The financial card holder may become a member of the marketing system. Upon becoming a member of the marketing system the financial card number of the member may be transferred, or otherwise provided, to the marketing system. The marketing system may utilize the financial card number as an identification for the member.

The one or more identifications, or one or more participant identifiers, identified as pertaining to a member of the marketing system may be utilized by the member during a transaction. For example, a member may utilize a financial card during the transaction and the financial card number may be an identification, or participant identifier, identified as pertaining to the member by the marketing system. The marketing system may therefore recognize that the transaction involves the member due to the use of the financial card number. A skilled reader will recognize that other identifications, or participant identifiers, may be utilized by a member, that such identifications may be stored by the marketing system, and that use of an identification, or participant identifier, during a transaction may provide a means of identifying a transaction as involving a particular member. As described above, the identification may be stored as a participant identifier by the marketing system.

As shown in FIG. 1, the marketing system may be operable in accordance with a web-based computer program product that provides a loyalty engine 10, linked to the web server. The loyalty engine may provide a marketing system interface to enable specific features, for example, such as surveys, incentive communications, data mining and other features. Transactions occurring between members and merchants, including transactions utilizing a point of sale facility 12, may be recorded or otherwise linked to data storage means. For example, a data storage means may be a database that may be included in one or more servers. As another example, a server farm may be included in the system of implementations and one or more linked databases may be included as a data storage area. A skilled reader will recognize that implementations may utilize a combination of stored data and real-time data (the real-time data may or may not be stored), and that both of these types of data may be utilized by the data mining tool. The data mining tool 14 may be operable by the loyalty engine, and may be utilized by members, merchants, the administrator, an intermediary, or any third party that is provided specific access to the data mining tool.

In one embodiment, transaction linking utility 16 may be utilized to compare transaction details regarding a merchant and/or member with stored data, for example, such as a member or merchant profile. In this manner a transaction may be confirmed to be between a specific merchant and a specific member. Details of the transaction may be stored in the data storage area as corresponding to the merchant and/or member involved in the transaction. For example, details of the transaction may be stored in the member profile, merchant profile, as historical transaction and/or as preferences.

The transaction linking utility may also be utilized to identify a specific member that may be eligible for one or more merchant incentives based upon a transaction. For example, the transaction linking utility may utilize information pertaining to the specific member's initiating of each documented AR-enhanced product advertisement viewing, member information including other recent transactions between the merchant and the member (e.g., assume member is likely to engage in future transactions with the merchant), frequency of transactions between the merchant and the member (e.g., member may be eligible for an incentive, which may be an increased discount or other augmented incentive, based on either frequent transactions with a merchant, or a particular number of past transactions with the merchant), and the amount of money spent in any transaction between the member and the merchant (e.g., member may be eligible for an incentive, which may be an increased discount or other augmented incentive, based on an amount of money spent in a transaction with the merchant), as well as any other post-transaction comments. Such parameters may be incorporated into a rule and the transaction linking utility may function in partnership with an analytics mode to identify member eligibility for an incentive.

An incentive may be communicated to a member through a variety of means, including a communication to a mobile device (e.g., a text, twitter, etc.), an email, a mailing, a telephone call, or any other means. The incentive may also be in many different forms, a sweepstake entry, a discount, a donation to a charity, rewards points, a coupon, or any other incentive form or combination of incentive forms (e.g., a donation to a charity and a discount, etc.).

In one embodiment, details regarding a participant initiating a documented AR-enhanced product advertisement viewing, or other information, may also be tracked and stored by the marketing system. Each such documented AR-enhanced product advertisement viewing detail may be utilized by the transaction linking utility to link a transaction to one or more such documented AR-enhanced product advertisement viewings and/or an incentive. These and other details may also be utilized to generate other information and/or reports, such as member preferences.

For example, a member may utilize the loyalty program engine of implementations, accessed by the member through a web page, to initiate a search for a particular merchant and/or product. The search will reveal brick and mortar locations for merchants at the member can initiate an AR-enhanced product advertisement viewing. As such, foot traffic at each such merchant's brick and mortar retail store may be significantly enhanced. Moreover, the transaction linking utility may track certain aspects of the member's AR-enhanced product advertisement viewing, for example, the number of such documented viewings by the member, the time that the member spends viewing the AR-enhanced product advertisement, and any repeat viewings of the same, or a combination of related, AR-enhanced product advertisement(s).

All AR-enhanced product advertisement viewing may be captured by the marketing system. In embodiments of implementations the AR-enhanced product advertisement viewing may occur through the use of a variety of web enabled mobile computing devices that can be identified to a particular member, customer, account holder, and/or cardholder, for example, such as a smart phone, a cell phone, a PDA, a tablet, a laptop, or other types of communication means. The AR-enhanced product advertisement viewing data may be analyzed by the marketing system. Analysis of the data relating to may reflect in AR-enhanced product advertisement viewing behaviors of the user and/or member undertaking such viewing.

The AR-enhanced product advertisement viewing behaviors of members and/or users may further be identified as being related to other demographic or other attributes of the members and/or users. For example, the AR-enhanced product advertisement viewing by a member may be recognized as having relevance to the behaviors of the member, so that certain merchants, products or services are indicated as being of interest to the member, and those interests may further be related to a specific demographic or attributes of the member, such as the age of the member, the location where the member lives or works, or any other demographic or attributes of the member. The AR-enhanced product advertisement viewing of a user who is not a member of the marketing program may also be analyzed, but the information to apply to this analysis may be less rich than the information applicable to the analysis of the AR-enhanced product advertisement viewing by a member, due to the information available in the member profile, which is not available for a user who is otherwise unknown to the marketing system.

Information related to the AR-enhanced product advertisement viewing may be captured for the purposes of the marketing program for AR-enhanced product advertisement viewing that occurs within the marketing program environment, as well as some AR-enhanced product advertisement viewing that occurs in the environment of a third party, for example, such as a merchant brick and mortar locations for merchants that are not currently enrolled in a particular marketing system or environment. In various embodiments of implementations, AR-enhanced product advertisement viewing will be offered to members and other users within the marketing environment. A skilled reader will recognize the number of ways that AR-enhanced product advertisement viewing may be offered in the marketing program environment and how the AR-enhanced product advertisement viewing information and related activity information may be captured by the marketing program. For example, a merchant that provides opportunities for potential customers to initiate AR-enhanced product advertisement viewing may form an agreement with the operator of the marketing program to allow such a merchant to be integrated with the marketing program.

A skilled reader will recognize that the benefits and advantages offered by AR-enhanced product advertisement viewing by potential customers in the marketing program environment may offer motivation, or other encouragement to members to increasing their respect incidence of initiating AR-enhanced product advertisement viewing in the marketing program environment. One such benefit is access to incentives provided in the course of AR-enhanced product advertisement view, as described herein.

As another benefit, in one embodiment a merchant may sponsor AR-enhanced product advertisement viewing undertaken by a member, or by members having particular attributes or being within a particular demographic. For example, a merchant may pay to have an advertisement displayed on another merchant's brick and mortar retail store product advertisement. The advertisement may be for the merchant, for a product or service, or for an incentive such as a donation to a community project based in exchange for a purchase subsequent to an AR-enhanced product advertisement viewing. As an example, a merchant located downtown in a city looking to increase purchases by suburban members, may pay to have an incentive or advertisement appear on such a retail store advertisement while suburban members are shopping in the retail store, and may by the activity of paying for the advertisement effectively sponsor the AR-enhanced product advertisement viewing of the member. A skilled reader will recognize the wide range of means by which a merchant may sponsor AR-enhanced product advertisement viewing, and how the sponsorship of such AR-enhanced product advertisement viewing may be directed towards an individual member, or to a group, category, or class of members, such as members having like attributes or demographics.

Another benefit may be that AR-enhanced product advertisement viewing occurring within the marketing program environment may cause the collection and generation of a richer data collection regarding the AR-enhanced product advertisement viewing and all activities related thereto. This may occur because more data is collected with the AR-enhanced product advertisement viewing that occurs within the marketing program environment than is collected when AR-enhanced product advertisement viewing occurs outside of the marketing program environment. In particular, the marketing program may have the ability to control the level of data collected relating to AR-enhanced product advertisement viewing when the AR-enhanced product advertisement viewing occurs within the marketing program environment. This may assist in maximizing the collection of data achieved by the marketing program. The increase in the richness of data collected when AR-enhanced product advertisement viewing occurs in the marketing program environment may be an advantage as it will enhance functions of elements of the marketing program, such as the data mining tool, transaction linking, facility, analytics mode, and any analysis undertaken by any of these elements, for example, such as member behaviour analysis.

AR-enhanced product advertisement viewing within the marketing program may also have the benefit of facilitating the ability of the marketing program to collect data regarding the conclusion of AR-enhanced product advertisement viewing sessions. For example, the analytics mode of implementations may be operable to determine the reason for the conclusion of AR-enhanced product advertisement viewing sessions. The analytics mode may be able to determine if a member prematurely stopped an AR-enhanced product advertisement viewing before it had concluded, or if a member performed multiple initiations of the same AR-enhanced product advertisement viewing session. A skilled reader will recognize the variety of determinations the analytics mode may make regarding the cause for these types of AR-enhanced product advertisement viewing sessions and how such determinations may add to the behavioural data that the analytics mode can generate relating to members. One or more incentives may be provided to, communicated to, or otherwise made accessible by a user or member during AR-enhanced product advertisement viewing. The provision of, communication of, or other access to, one or more incentives may occur at a variety of points during the AR-enhanced product advertisement viewing. For example: one or more incentives may be displayed on a merchant's brick and mortar retail store product advertisement display as upon a store end cap or a poster on a store front window; one or more incentives may be communicated to a communication device of a user or member, such as a smart phone, a cell phone, a PDA, a tablet, a laptop, or other types of communication means; or other communications or incentives or access to incentives may be possible. The incentives provided to, communicated to, or made accessible by the user or member may be of benefit to either the user or a community program, or an intermediary. For example: an incentive may be a coupon for redemption at a merchant providing a benefit to a user or member; or an incentive may be a donation to a community program that is made upon a transaction, or made possible only after the user or member has made a documented initiation of an AR-enhanced product advertisement viewing behavior or activity. In an alternative to the foregoing example, the communication delivered to the user or member during the AR-enhanced product advertisement viewing experience may be a history, description, video, or text advertisement for the merchant (such textual and/or audible messaging that reinforces the user's or member's appreciation of the merchant's strong support of the local community (e.g., communicating to the user or member the incentive that the merchant will make a merchant-defined, user or member directed donation to a local or community charity when the user or member conducts a transaction (e.g., makes a purchase) with the merchant. A skilled reader will recognize that a variety of incentives may be provided, communicated or made accessible to a user or member in a manner related to the AR-enhanced product advertisement viewing activities or other related behaviors.

In another embodiment incentives displayed to, provided to, communicated to, made accessible to, or otherwise offered to the users or members during AR-enhanced product advertisement viewing may be specific to the member or user. For example, an incentive may be one of several incentives that a merchant is offering to users or merchants. The determination to offer any incentive to a member or user may be based upon any details relating to the user or member recognized by the marketing program, such as: AR-enhanced product advertisement viewing activities or other behaviors; attributes; demographic details; prior transaction history; or any other details which may be derived from user or member behaviours, activities or any stored information of the marketing program relevant to the user or member, or relevant to the AR-enhanced product advertisement viewing activities or behaviors. The incentive may therefore be chosen to be offered to the user or member so that the incentive is specific to the user or member or to the AR-enhanced product advertisement viewing. Providing an incentive to a user or member in a directed manner may increase the likelihood that the incentive will be accepted or otherwise redeemed by the user or member. For example, a user or member may: accept that an incentive that is a donation be made to a community member; download an incentive that is a coupon and redeem this either at a merchant's online or bricks and mortar store; or may otherwise utilize an incentive.

In embodiments of implementations, incentives may be offered to a user or member during AR-enhanced product advertisement viewing, as a result of AR-enhanced product advertisement viewing at a merchant brick and mortar store, and based upon a transaction, as the result of multiple transactions, or for any other reason); or at any other location, including a community program location or event. A skilled reader will recognize the wide variety of incentives that may be offered to users and members.

In one embodiment an incentive may not be offered to a user or member during AR-enhanced product advertisement viewing. However, as discussed herein, other benefits, and advantages offered by AR-enhanced product advertisement viewing from within the marketing program environment may motivate users and members to conduct AR-enhanced product advertisement viewing from within the marketing program environment in other for non-related product advertisements.

Figure 8:
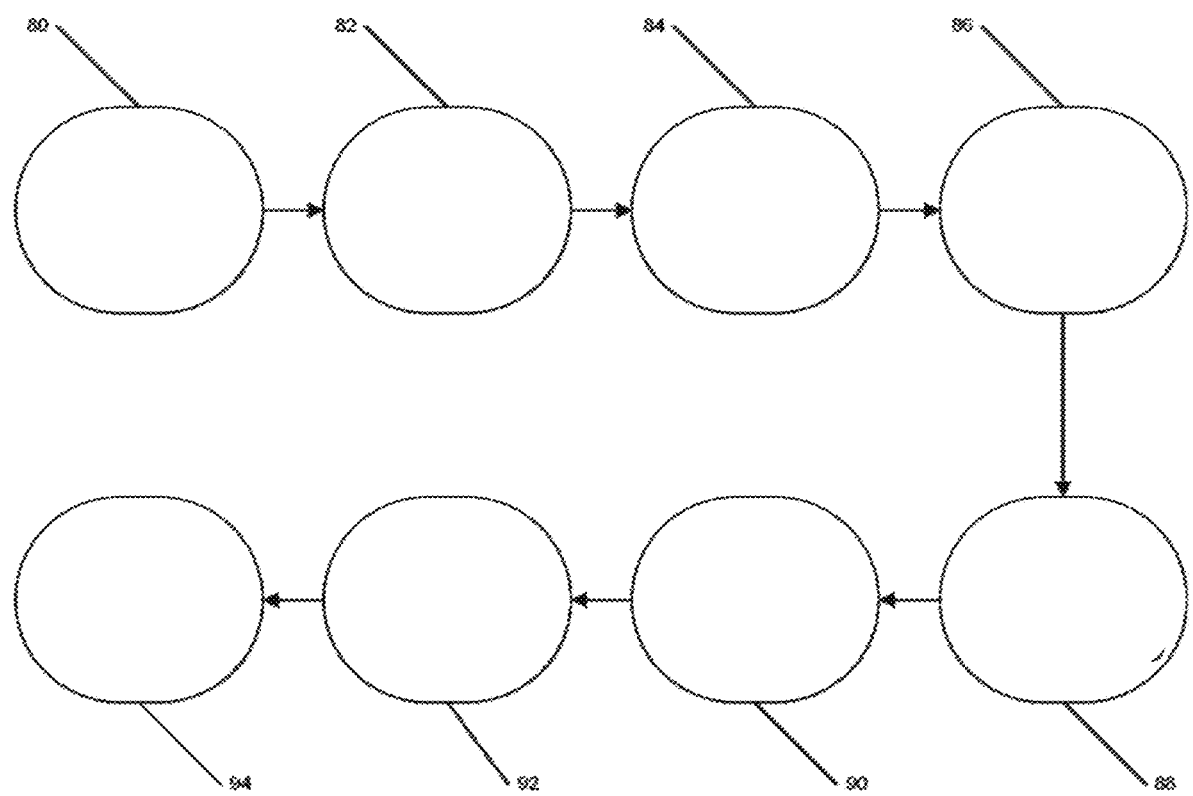
FIG. 8 is a flowchart showing the steps in one embodiment for a user to query a merchant and redeem an incentive at a merchant's bricks and mortar store location.

As shown in FIG. 8, in one embodiment a user 80, such as a member, may utilize a web enabled mobile computing device, such as a laptop, operable to initiate and perform an AR-enhanced product advertisement viewing 82 by the camera of the member's web enabled mobile computing device capturing an image of a product advertisement bearing an AR trigging symbol. Viewing 82 is initiated by the access and retrieval of one or more AR data sets corresponding to the AR trigging symbol via an online means (e.g., the Internet, an intranet, or other online means). The access and retrieval results from the generation of a query pertaining to the AR trigging symbol for the one or more corresponding AR data sets that will be used to overlay a product advertisement rendered by the display screen of the member's web enabled mobile computing device.

For example of the forgoing implementation, the member may use the camera of the member's web enabled mobile computing device to image a printed product advertisement that the member finds in a merchant's bike store located in a specific geographic region. The product advertisement bears an AR-triggering symbol that can be associated with an AR data set corresponding to the advertised product, where the data set is provided by a server farm that is made network accessible by the marketing program or may be otherwise linked to the marketing program, so that the member can thereby use their web enabled mobile computing device to initiate and perform an AR-enhanced product advertisement viewing for a bike in the merchant's bike store, where the merchant is participating in the marketing program. The user's AR-enhanced product advertisement viewing may further highlight information about the merchant's bike store, or a particular bike, or otherwise extract related data. This may cause the system to recognize a heightened interest in the bike on the part of the user than is indicated by the user's interaction with the AR-enhanced product advertisement viewing whereby the bike may be viewed, or the user may request still other AR-enhanced product advertisement viewing that can be initiated by other AR-triggering symbols located on the product advertisement. The indication of heightened interest in the bike may be utilized by the marketing system in its determination of the likelihood or level of certainty of a link between the AR-enhanced product advertisement viewing and a later transaction, as described herein.

The marketing system may undertake steps to recognize that the user is to initiating and performing an AR-enhanced product advertisement viewing at the merchant's bike store, for example, such as accessing the AR data sets that correspond to the advertised product for the merchant's bike store. An incentive may be provided by the merchant to the user, for example the incentive may be communicated to a communication means specified by the user. The communication means may be the same communication means the user utilizes to initiate and perform the AR-enhanced product advertisement viewing, or may be another communication means indicated by the user. The communication means where the incentive should be sent may be set in the user's profile, or may be indicated by the user while the user is accessing the marketing program, or the merchant's bike store information. For example, the incentive may be a discount on the price of a bike communicated to a web enabled mobile computing device 84 as indicated by the user while the user is initiating and performing an AR-enhanced product advertisement viewing at the merchant's retail brick and mortar bike store.

Once the incentive is communicated to the user, the user may take the incentive to the merchant's bike store 86. After the user initiates and perform an AR-enhanced product advertisement viewing using the user's web enabled mobile computing device, the user may utilize the incentive and redeem it for a discount on a bike 88 during a transaction at the merchant's brick and mortar retail bike store. Details regarding the transaction may be transferred to the marketing program 90. A further incentive may be triggered when the details regarding the transaction are received and processed by the marketing program. For example, the further incentive may be an incentive such as a prize entry, or a donation 92 to a community program. The marketing program may match the transaction details to the search behavior of the user if the user is a member of the marketing program. For example, based upon the transaction details that indicate that the member purchased a particular product for which an incentive had been acquired by the member by way of a communication to the user if, and only if, they that initiated and performed an AR-enhanced product advertisement viewing pertaining to the particular product that corresponded to a bike advertisement located at the merchant's retail brick and mortar store, then there will be a significantly high probability that the transaction resulted from the user's initiation and performance of an AR-enhanced product advertisement viewing for that particular product.

A post-transaction survey 94 may be generated and communicated to the user if the user is a member of the marketing program. For example, the survey may be communicated to the member the next time the member logs into the marketing program, such that the survey appears as a pop-up on the sign-in page after log-in, or the survey is accessible by a link shown on the sign-in page, or so that the survey is available to a member that is signed into the marketing program via some other means. Alternatively, communicated to a communication means belonging to the member or a user that is not a member, and be available to the user on that communication means, for example, such as a communication means indicated by the member in the member's profile or a communication means indicated by the user at another point, such as during the transaction, that is capable of accessing a communication, such as an email, a text, or some other communication message received by way of the user's web enabled mobile computing device.

The post-transaction survey may be completed by the member and the information included in the survey may be processed by the marketing program. For example, the post-transaction survey information may be processed to indicate a link between the transaction and any earlier activity, such as the query by the user, or any other activity. The information in the post-transaction survey may be utilized to confirm the transaction behaviour of a user. This information may be stored by the marketing program and may be provided to the merchant, or other participants of the marketing program, in a variety of forms upon a variety of events, for example, such as the generation of a report by the merchant. The merchant may use this information to develop effective incentive programs, to evaluate the success of incentive programs, or for other purposes.

In one embodiment, the merchant evaluate and adjust, by use of the transaction linking utility, a maximum time period for the time elapsed between the member initiating and performing an AR-enhanced product advertisement viewing for a product sold by a merchant using the user's web enabled mobile computing device, and a subsequent online or offline transaction between the member and the merchant. In some implementations, the transaction linking utility has access to data stored that provides product level information, panel data, Level 3 information, stock keeping unit (SKU) data, serial number data, etc. for each product that was purchased in the transaction between the member and the merchant. As such, the transaction linking utility can match each product purchased by a member in each transaction to one or more chronologically prior experiences by the member initiating and performing related AR-enhanced product advertisements for a particular product and/or for a category of particular products sold by the merchant. The transaction linking utility can thereby track the member's purchases from the merchant of a particular product and/or for a category of particular products, where the member used one or more of the member's debit or credit accounts in one or more online or offline transactions.

A maximum time lapse between a user's AR-enhanced product advertisement viewing and a subsequent transaction by the user at the merchant's store may be recognized by the marketing program. The maximum time lapse may be input by the merchant, or may be generated by the marketing program, or may be otherwise set in the marketing program. For example, the maximum time lapse may be generated by the marketing program in accordance with the merchant type, the AR-enhanced product advertisement viewing experience by the member, the merchant preferences, or any combination of these. Other rules for matching a members AR-enhanced product advertisement viewing to a transaction may be set, stored and utilized by the marketing program. Such rules may be modified at any time. In particular, the rules may be modified in accordance with the experience of a merchant. A merchant may also override the rules in specific circumstances.

The amount of time allowed for a maximum time lapse may further be member specific. For example, the marketing program may recognize that a longer period of time elapses between a member undertaking AR-enhanced product advertisement viewing activity and a transaction for the merchant for the advertising product than the maximum time lapse allows. This extended period of time may indicate that a member has a reason which prohibits him or her from travelling to a store in a timely manner after AR-enhanced product advertisement viewing for a particular product or merchant. For example, the member may be a professional who has a work-schedule that prohibits frequent shopping. If the marketing program determines that transaction occurs following the member's AR-enhanced product advertisement viewing activity outside of the maximum time lapse for such a member, the marketing program may determine that there is still a likelihood of a match between the AR-enhanced product advertisement viewing and the transaction in the case of this specific member based on past member behaviour. Therefore, the marketing program may adjust the maximum time lapse to a longer period relative to the historical data relating to the particular member.

The location of a member in relation to the location of the merchant store may also be a factor that is considered when determining a reasonable time lapse between the AR-enhanced product advertisement viewing and the transaction. For example, if the store is identified by the marketing program as being a significant distance away from the location of the member's residence, place of business, or habitual location for significant periods of time, the maximum time lapse may be extended to recognize AR-enhanced product advertisement viewing and transactions occurring at periods in time more distant than the maximum time lapse as having a likelihood of matching.

The time and date of an AR-enhanced product advertisement viewing in relation to a transaction may also be a factor that is considered when determining a reasonable time lapse between the AR-enhanced product advertisement viewing and the transaction, in accordance with historical data relating to AR-enhanced product advertisement viewing and transactions by a member. For example, an AR-enhanced product advertisement viewing initiated by a member on a Sunday night, that occurs at a location other than a merchant's brick and mortar retail store, and a transaction occurring on the following Saturday, or at another day that is beyond the maximum time lapse, may be recognized as having a likelihood of being a match if the member transaction history shows the member only shops on alternate weekends, or in another such pattern of time.

As skilled reader will recognize that a variety of factors may be utilized to determine if a transaction is likely to have been the result of an AR-enhanced product advertisement viewing. These factors may differ for specific members, based upon prior data collected by the marketing program and analysis of this data to indicate member behaviours. A skilled reader will also recognize the richness of rules and tools that the marketing program may utilize to undertake the analytics involved in matching transactions and AR-enhanced product advertisement viewing and indicating likelihoods or certainties of relationships therebetween.

In embodiments of implementations a transaction may occur online (e.g., via a website) or offline (e.g., at a brick and mortar store location, or at another physical location where the merchant is selling products or services such as, for example a kiosk, booth or other location). The tracked information may be utilized by the transaction linking utility to determine if the transaction represents a sale that occurred as a result of the AR-enhanced product advertisement viewing by the member that resulted in the member arriving at the merchant's retail brick and mortar store. A post-transaction survey may also be provided to verify that the transaction occurred as a result of the AR-enhanced product advertisement viewing. A skilled reader will recognize that a variety of variables may be utilized by the transaction linking utility to determine if a transaction occurs as result of a member's AR-enhanced product advertisement viewing on the marketing system, and that these variables may be governed by rules, or other means implemented by the marketing system.

In one embodiment, the marketing program may utilize the transaction linking utility to estimate matches between a member's, or other user's, AR-enhanced product advertisement viewing habits and the members or user's transactions at the merchant. Such estimates of matches may be undertaken to produce variable degrees of certainty for the match, or likelihood of a match between an AR-enhanced product advertisement viewing and a transaction. Examples of the certainty that may be indicated by varieties of AR-enhanced product advertisement viewing and transactions, include the following: a single or multiple AR-enhanced product advertisement viewings by member or other information pertaining to that merchant that is followed by a transaction at the merchant's store (either an online or offline store) and a post-transaction survey is not provided corresponding to the transaction may be considered to indicate a low level of certainty that the transaction occurred as the result of the AR-enhanced product advertisement viewing by the member or user of the merchant's website or other information pertaining to that merchant or the merchant's products and/or services; a single AR-enhanced product advertisement viewing by a member or other information pertaining to that merchant that includes multiple AR-enhanced product advertisement viewings on marketing system information (for example, such as a member initiates and performs an AR-enhanced product advertisement viewing, and thereafter is prompted to accept an incentive offered by the merchant) that is followed by a transaction and a post-transaction survey is not provided corresponding to the transaction may be considered to indicate a moderate level of certainty that the transaction occurred as the result of the AR-enhanced product advertisement viewing by the member or other information pertaining to that merchant or the merchant's products and/or services; multiple related AR-enhanced product advertisement viewings (for example, such AR-enhanced product advertisement viewing or other information relating to the same merchant undertaken by the same member or user across multiple AR-enhanced product advertisement viewing sessions) occurring prior to a transaction between the member (or user) and a post-transaction survey is not provided corresponding to the transaction may be considered to indicate a moderate level of certainty that the transaction occurred as the result of the AR-enhanced product advertisement viewing by the member or other information pertaining to that merchant or the merchant's products and/or services; any AR-enhanced product advertisement viewing by a member or other information pertaining to that merchant, the AR-enhanced product advertisement viewing being followed by a transaction that a post-transaction survey is provided for that confirms that the transaction occurred as a result of the AR-enhanced product advertisement viewing may be considered to indicate a high level of certainty that the transaction occurred as the result of the AR-enhanced product advertisement viewing by the member or other information pertaining to that merchant or the merchant's products and/or services; a transaction between a member or user and a merchant that is not preceded by any AR-enhanced product advertisement viewing by the member or other information pertaining to that merchant may be considered to indicate that the transaction did not occur as the result of any AR-enhanced product advertisement viewing by the member or other information pertaining to that merchant or the merchant's products and/or services; and a transaction between a member or user and a merchant that is preceded by an AR-enhanced product advertisement viewing which included the member or user highlighting or otherwise extracting information interactively during the AR-enhanced product advertisement viewing session regarding a product or service that is part of the transaction may be considered to indicate a moderate level of certainty that the transaction occurred as the result of the AR-enhanced product advertisement viewing by a member or user pertaining to that merchant or the merchant's products and/or services.

In one embodiment, it may be possible for the marketing system to recognize that items purchased after an AR-enhanced product advertisement viewing for the product may also be linked to other related-product AR-enhanced product advertisement viewings. For example, a user or member may initiate and perform an AR-enhanced product advertisement viewing for a product that is a particular type and brand of a coat that is being sold by a merchant. Later the user or member may purchase the coat through a transaction at the merchant's store. Other items may be purchased in the same transaction by the member or user. The other items purchased with the coat may be recognized by the marketing program to have occurred as a result of the AR-enhanced product advertisement viewing for the particular type and brand of the coat that was being sold by a merchant. Tracking the purchase of the extra items besides the coat may provide a means of capturing information related to the purchasing behaviours of the user or member purchasing the coat and the other items. This information may be utilized for the purpose of other analyses conducted by implementations.

As another example, the AR-enhanced product advertisement viewing may involve the communication of an incentive to a member. In this embodiment, a member, or other participant, may login to the marketing system website. The member may be considering purchasing a particular item, such as a bicycle, and consequently may utilize a search option to look for merchants who are members of the marketing system and are bicycle sellers. The member may also search bicycles, and the search may involve merchants of the marketing system. Thereafter, the member travels to the merchant's brick and mortar retail store and locates a poster or product advertising bearing a symbol that, when imaged by the user's web enabled mobile computing device, will allow the member to experience an AR-enhanced product advertisement viewing. The results of the AR-enhanced product advertisement viewing may either present an incentive to the member on the retail store advertisement imaged by the member's web enabled mobile computing device, or may cause an incentive to be communicated to the member by some other means, such as to the member's web enabled mobile computing device, to the member's email address, etc. If the member later purchases the bicycle, either online or at the physical location of the merchant's store, and redeems the incentive, this information will also be stored in implementations data storage area. The transaction linking utility may be utilized to provide results that indicate that the AR-enhanced product advertisement viewing for a particular product, (i.e., a particular type and brand of bicycle) and the purchase of the product occurred within a period of time that would suggest a link between the AR-enhanced product advertisement viewing with the corresponding incentive and the purchase.

Identification of the link between the AR-enhanced product advertisement viewing with the corresponding incentive and the subsequent purchase may indicate that the incentive may have influenced the transaction. Data reflecting that the incentive influenced the transaction may identify the incentive as successful to cause the transaction. Such data may be utilized evaluate the overall success of a particular incentive. An evaluation regarding the success of a particular incentive may be useful when either the merchant or the marketing system considers suggestions for possible new incentives.

In another embodiment, the incentive offered to a member may be dependent upon the existence of any link between the marketing system and the merchant. This means that more than one incentive may be developed to be offered to members. A member will be required to provide one or more identifications, or participant identifiers, to AR-enhanced product advertisement viewing session, whereby the AR-enhanced product advertisement viewing session will recognize the user as a member of the marketing system. In one embodiment the provision of one or more identifications pertaining to a member may be facilitated by the marketing system in a manner whereby the provision of the one or more identifications appears as seamless to the member utilizing the marketing system.

Should a member experience an AR-enhanced product advertisement viewing session at a retail brick mortar store of a merchant that is not connected, or otherwise linked, to the marketing system, the marketing system may cause a particular incentive to be communicated to the member pertaining to the purchase of the AR-enhanced product advertisement viewing for the product and/or other products. However, should a member experience an AR-enhanced product advertisement viewing at a merchant location that is connected, or otherwise linked to the marketing system, such as, for example, a merchant with linked network capability to one or more of the marketing system server farms, the merchant that is affiliated with the marketing system, or the merchant that is otherwise connected or linked to the marketing system, a different incentive may be offered to the member pertaining to the purchase of the product and/or other products pertaining to the member's AR-enhanced product advertisement viewings.

As an example, a merchant providing ads to its customers for AR-enhanced product advertisement viewing sessions, where that merchant is not linked to the marketing system may result in the provision of an incentive that is a price reduction of 10%, whereas merchants that are linked and/or connected to the marketing program may result in the provision of an incentive that is a price reduction of 30% and/or a donation equivalent to 15% of the price of the product to a community program. In some embodiments of implementations the incentive provided as a result of a member transacting with merchants that are connected or otherwise linked to the marketing system may offer greater rewards to the member than the incentive provided as a result of a member transacting with merchants that are not connected or otherwise linked to the marketing system. A skilled reader will recognize that a variety of incentives may be offered both to members that transact with merchants linked or connected to the marketing program as well as to member that are not linked or connected to the marketing program.

An incentive may also be communicated to a member, or other participant, without an AR-enhanced product advertisement viewing being undertaken by the member or other participant. Incentives may be displayed on a webpage or communicated to a member by another means, such as via a mobile device, email, through the mail, announcement at an event the member attends, or any other means. The marketing system may store information indicating the date and/or time of the communication of the incentive to the member. The marketing system may further be able to identify the redemption of the incentive, but only after the member has experienced a qualifying AR-enhanced product advertisement viewing. Should the redemption of the incentive meet particular criteria in relation to the communication of the incentive, such as, for example the redemption of the incentive, which may be in conjunction with a transaction, occurs within a specified period of time after the communication of the incentive to the member, then the marketing system may identify the transaction as being influenced by the incentive.

A skilled reader will recognize the variety of AR-enhanced product advertisement viewings that may be facilitated by the marketing system and the variety of results, and uses thereof, that may be facilitated by the transaction linking utility, the data mining tool and may involve the analytic mode. A skilled reader will further recognize the variety of data rules that may be set to indicate a link between a transaction and other member behaviours or activities, such as a variety or particular combination of AR-enhanced product advertisement viewing sessions.

In one embodiment an analytic mode may be engaged to function in connection with the transaction linking utility to produce reports, reviews or other feedback for participants interested in identifying instances where a transaction occurred as a result of an AR-enhanced product advertisement viewing by a member undertaken by the marketing program.

Figure 2:
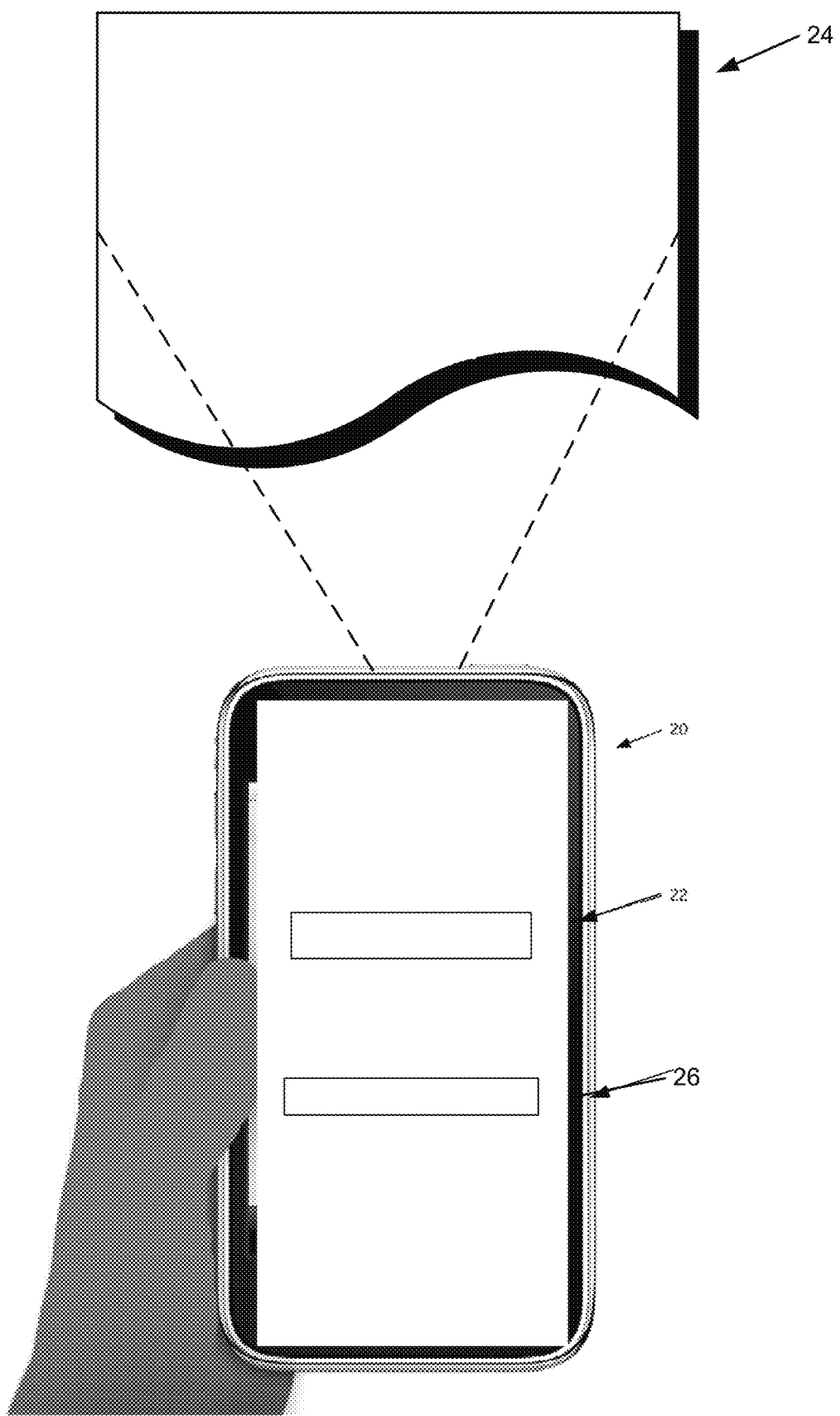
FIG. 2 is a view of a merchant incentive communicated to a smart phone.

As shown in FIG. 2, the system may be linked to a variety of web enabled mobile computing devices 20, for example, such as a smart phone, a cell phone, a PDA, a tablet, a laptop, or other type of communication means, whereby details may be uploaded and downloaded from a loyalty engine. For example, the system may be linked to a smart phone belonging which can be identified to a particular member. The web enabled mobile computing device 20 may be used by a member or participant to make a request for an AR-enhanced product advertisement viewing session. This session is initiated by their use of the camera (not shown) of the web enabled mobile computing device 20 to capture an image of a product advertisement 24, as shown in FIG. 2. The product advertisement, which may be a poster or signage inside a retail merchant brick and mortar store, includes or otherwise bears an AR-triggering symbol 26 that is detected by an application installed on the user's web enabled mobile computing device 20. The installed application on the web enabled mobile computing device 20 submits the request for the AR-enhanced product viewing session corresponding to the AR-triggering symbol 26. The loyalty systems, and/or components thereof, engages in a search process to locate one or more AR data sets that correspond to the AR-triggering symbol 26. The AR data sets are rendered on the display screen of the web enabled mobile computing device 20 so as to overlay the image 22 of the product advertisement 26 captured by the camera. Also, the web enabled mobile computing device 20 may receive a communication, via the AR-enhanced product advertisement or by other means, of one or more incentives for which the member may be eligible after conducting a transaction for the advertised product with the corresponding merchant. In this manner incentives may be disseminated to a member and communicated by the loyalty engine to the member's smart phone or by other means. The AR-triggering symbol 26 included in the imaged product advertisement 22 may further include a bar code, a unique reward identifier, or other intelligent information that can trigger via the installed application to retrieve the corresponding AR data sets for respective rendering as AR overlays of the rendered image 22 of the product advertisement.

Additionally, information entered into a communication means, such as a smart phone, may be transferred to the loyalty engine and ultimately stored in the data storage area. For example, a survey may be disseminated to a member whereby the survey is available to the member on the member's smart phone. Responses to the survey made by the member via the smart phone may be transferred to the loyalty engine and thereby stored in the data storage area. A skilled reader will recognize that data may be transferred to and from the loyalty engine, to merchants, members, intermediaries or any other third party.

Administrator Registration, Interface and Functionalities

In one embodiment, the marketing program may be hosted by an administrator. Said administrator may be an individual or an organization. Access to the marketing program, including access to some and/or all data may be provided to an administrator. Generally the administrator access to the marketing system may differ from access provided to others: access to the marketing system, including access to anonymized data may be provided to merchants and members; and limited access to the marketing program may be provided to third parties and/or intermediaries. The marketing system may be operable to allow an administrator to input particular data, including data pertaining to community programs.

The administrator may undertake a search for community programs for which incentives may be designed. By way of example, and not by way of limitation, any such incentive may be a promise by a merchant to make a donation of a transaction amount to a community program when a potential customer views an AR-enhanced product advertisement viewing for a product available by the merchant for purchase, after which the potential customer conducts the qualifying transaction with the merchant to purchase the product related to the AR-enhanced product advertisement viewing. After authentication of the qualifying AR-enhanced product advertisement viewing and subsequent transaction, the incentive is paid by the merchant or his agent to the community program. This search may utilize information available via the Internet, other databases, telephone services (such as those provided by some municipalities, media outlets, etc.), and other data sources. The administrator may also be provided information regarding community programs by third parties.

All details relating to the community programs may be stored in the data storage area of the marketing program. The data mining tool may be utilized to provide reports or lists providing information related to the community programs, for example, such as a list of community programs in a specific location (e.g., a town, a city or a borough, etc.).

In one embodiment, the administrator may utilize the administrator access facilities of the marketing system to provide information to a merchant regarding community programs occurring, or about to occur, in a location nearby to one or more of the merchant's stores, or information regarding members. A merchant may utilize this information to develop incentives relating to one or more of the merchant's stores. The incentive may be a coupon, sales discount, give away, sweepstakes entry, donation to a community program, or any other incentive. The incentive or information regarding the incentive may be disseminated to a member.

The marketing system may also be operable to allow the administrator to generate lists, reviews, reports or other information to be provided to prospective merchants, members and/or intermediaries to cause them to consider registering with the marketing program.

In some embodiments of implementations, a fee may be charged for any request for information, lists, reviews, reports generated by an administrator. A skilled reader will recognize the variety of types of fees that could be charged, such as, for example a fee for each request, a fee per lines on a report, and other types of fees.

Merchant Registration, Interface and Functionalities

A merchant may join the marketing program by registering. A merchant may be an online merchant, a merchant having one or more brick and mortar locations, or any other merchant. A merchant may identify the location of any bricks and mortar locations to the marketing system along with other merchant profile information. Merchant profile information may be provided to the marketing system at the time of registration as well as at points in time after the initial registration occurs.

A registration interface may be provided to the merchant via a web page, via a mobile device, or via any other means. The merchant information may include a variety of information, for example, such as a merchant participant identifier, the location of the merchant's store(s), the merchant's target clientele, etc. The merchant information may allow the marketing program to link a financial card or other billing system to the merchant.

Figure 3:
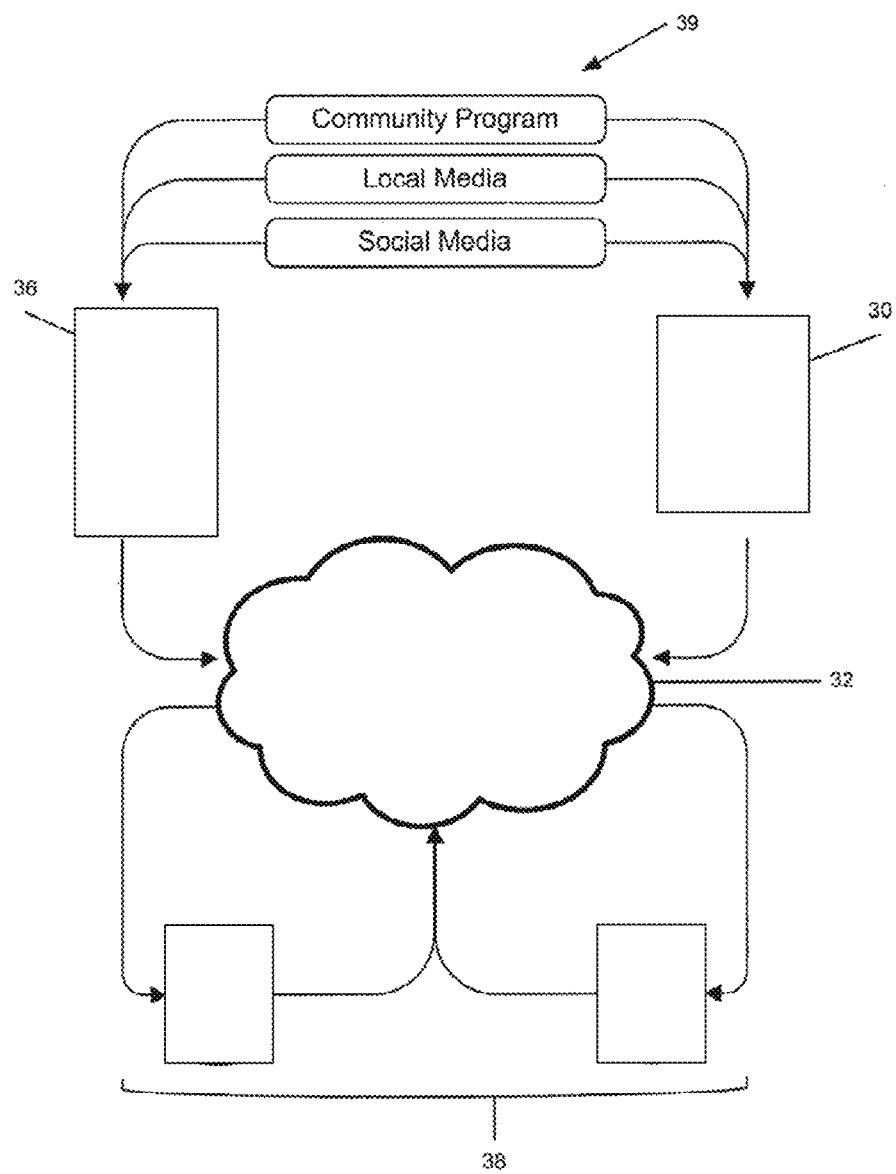
FIG. 3 is a systems view of a data transfer between a merchant, a member, the marketing system and a data storage area.

As shown in FIG. 3, a merchant 36 may register with the marketing program of implementations to become a participant. Registration may be facilitated by one or more registration means as described in more detail below. Registration may further occur through an interface 32, for example, such as a web page, etc. Information regarding the merchant, for example, such as the merchant's name, its store locations, its website and web page information, and other details may be provided by the merchant at registration, or at any later point, and stored in the data storage area 38. A merchant may develop merchant incentives, and may communicate these to members through a variety of means 39, including the marketing system web-pages, any merchant and/or intermediary web pages, social media (e.g., web pages, Facebook™, Twitter™, etc.), local media (e.g., radio advertisements, print media, television broadcasts, etc.) and through relationships with community programs (e.g., the community program promotes the merchant, for example, such as through a link from the community program website to the merchant's website, use of the merchant's logo or brand on community program materials, announcements of merchant incentives at a community program event, etc.). A skilled reader will recognize the variety of options that may be used to communicate an incentive to participants and/or third parties.

In one embodiment, the marketing program may provide an automated online boarding means or a manual boarding means. For example, a merchant having an existing registered merchant identification with another pre-registered financial program may be provided with a registration interface by the present marketing program, for example, such as a web page. The interface may include a means whereby merchant transactional information and preferences may be imported from the pre-registered financial program to the marketing program. The imported information may be stored in the data storage area as part of the merchant profile.

As an example, the imported information may include the merchant identification (such as an identification number), credit card information, or automated clearing house billing information already linked to a database. Additionally, the one or more forms of payment used with the pre-registered financial program may also be linked to the marketing program as tokens. Said tokens may be used to track transactions made with the associated forms of payment.

The information regarding the location of one or more brick and mortar locations of the merchant may be utilized to determine relationships between one or more community programs and the merchant, in particular any merchant location in the vicinity of the community program. The data mining tool, and in some instances the analytic mode, of implementations may be utilized to provide a list of community programs occurring in the same location as one or more of the merchant's locations. A merchant may request a more general list as well, showing all community programs in a city, province, country, or other information.

A merchant may also request a list of members, based on a variety of criteria, including proximity of the location of a member to one or more locations of a merchant, member preferences, member age, or other member information. A skilled reader will recognize the variety of criteria that may be applied to a member search undertaken by a merchant, such as, for example, demographic or preference information as reflected in the marketing system data stored in the data storage area. This information may be utilized to determine the members that an incentive will be communicated to. The information may also be used to create new incentives. By way of example, each such incentive may be qualified by the member performing AR-enhanced product advertisement viewing for a product sold by the merchant, and then purchasing the product from the merchant.

In some embodiments of implementations, a fee may be charged for any request for information submitted to the marketing system and/or administrator by a merchant. A skilled reader will recognize the variety of types of fees that could be charged, such as, for example a fee for each request, a fee per lines on a report, and other types of fees.

In one embodiment, the data mining tool, and in some instances the analytic mode, may be utilized to provide suggestions of possible new incentives to merchants. The transaction linking facility may be utilized to provide analysis or evaluations that may also be applied by the data mining tool or analytic mode to generate new incentives and suggestions of new incentives for merchants. This feature of implementations may utilize any of the data and/or information in the data storage area, it may also: recognize incentives utilized by merchants in the past; recognize the success of some past incentives; evaluate the success of an incentive and the community program that the incentive is to be used with; and further incorporate other information and criteria. The result may be one or more suggestions of incentives that a merchant may utilize at a particular point in time. It may be at the discretion of the merchant to adopt and utilize one or more of the suggested incentives, or not to adopt or utilize any of the suggested incentives. For example, a merchant may allow automatic approval of system generated incentives, and whereby the marketing system undertakes the approval of system generated incentives. A skilled reader will recognize that a variety of criteria and information may be utilized by such a feature of implementations.

The incentive may provide an inducement for the member, or other customers, to visit the merchant's store locations where the incentive is offered and redeemable after member or other customer has experienced a related AR-enhanced product advertisement viewing at the merchant's store location, and thereafter makes a purchase of a product from the merchant. The merchant may thereby increase the number of customers, in-store foot traffic, the notoriety of the merchant's store, sales, goodwill, etc. The incentive may also produce a benefit for the community program if it is linked to a community program by, increasing awareness of the community program, increasing attendance at a community program, increasing donations to the community program, etc. Specific benefits accruing to any of a community program, merchant, member and/or any intermediary may be recognized by a report, review, results, list, etc., provided by the data mining tool, or the transaction linking utility in some instances.

Incentives may be created to be redeemed upon a variety of events and/or activities. For example, an incentive may be provided to a member and/or an intermediary based upon a transaction. In this example, the incentive may be provided upon a transaction occurring, or may be provided to attempt to cause a transaction to occur. Such an incentive may be a discount on a purchase price of a product or service to a member, a give-away to a member, a sweepstakes entry and/or a donation to a community program.

In one embodiment, it may be possible for the incentive that is provided to a participant based upon a transaction to be different depending on various circumstances. For example, the incentive may be different for a participant who has had frequent transactions and/or recent transactions (e.g. frequent and/or recent transactions with a merchant, or group of merchants, or frequent transactions as a marketing program participant), then the incentive provided to a participant who is making a first transaction, makes infrequent transactions, or has not made a recent transaction. It may also be possible for a different incentive to be provided to participants based upon the total amount of the transaction (e.g. the money spent in the course of the transaction). Yet another possibility may be that a different incentive may be provided to a participant based upon the time of day when a participant makes a transaction. Basing an incentive on the time of day may help a merchant with products or services near the end of the business day to encourage the purchase of those products or services by participants. A different, augmented incentive may also be offered based upon other criteria, such as, for example volunteer hours with a community program, etc. A skilled reader will recognize that a variety of other events or activities may cause different incentives to be communicated to a participant.

As another example, incentives may also be provided based upon the completion of a survey by a participant. Such an incentive may be: a coupon that is electronically, or otherwise, provided to a participant after a survey is completed; a donation that is made to a community program upon the completion of a survey; and/or entry in a sweepstakes. It may be possible that more than one incentive may be provided to one or more participants upon the completion of a survey. It may also be possible for particular post-transaction surveys to even result in different incentives being provided to one or more participants in accordance with the answers provided in the survey. For example, the response to an experience rating question (e.g. a request to rate an experience as excellent, satisfactory or poor) could result in a participant responding that his or her experience was poor may receive a different incentive than a participant responding that his or her experience was excellent. In particular, a participant who has ranked his or her experience as poor on several post-transaction surveys (as may be recognized by use of the data mining tool of implementations searching for data in historical surveys) may receive a different, augmented incentive. A skilled reader will recognize that a variety of other incentives may be provided to participants upon the completion of a survey.

As yet another example, incentives may be provided based upon a member entering a specific geographical location and/or zone. By way of example, and not by way of limitation, the zone may be defined by real-time transportation time between the member and the merchant's retail brick and mortar retail store using typical modes of transportation for the relevant zone or geographical location. Such an incentive may be provided to one or more participants upon a member entering the parking lot of a shopping centre, or any other geographical location and/or zone. The incentive may be related to the geographical location and/or zone, such as, for example a coupon for a merchant near to the zone, or a donation to a community program near the location. A skilled reader will recognize that a variety of other incentives may be provided upon a member entering a specific geographical location and/or zone. A skilled reader will further recognize that incentives may be provided to one or more participants based upon other events or activities as well.

The marketing system of implementations may be operable by the merchant to generate incentives, to track transactions, and to provide other information relating to participants and community programs. The marketing system of implementations may further be operable by the merchant to generate analytic information providing an evaluation of the success of past incentives and other activities of the merchant.

Intermediary Registration, Interface and Functionalities

In one embodiment, one or more intermediaries may register with the marketing system and thereby become participants. In one embodiment, a participant, and particularly an intermediary, may be a financial card provider, one or more advertising associates, one or more charities, one or more public or private interest groups, marketing specialists, one or more community programs, or other groups or individuals.

Particular participants may offer unique and specific means of communicating an incentive to participants and/or third parties. Intermediaries may either work with such participants, or may provide unique and specific means of communicating an incentive to participants and/or third parties themselves.

In one embodiment, particular marketing program access may be configured to benefit one or more intermediaries. The access provided to intermediaries, or groups of intermediaries, may differ. For example, an advertising associate may be granted access to parts of the marketing program that are necessary for the advertising associate to work with a merchant to produce an incentive. As another example, a marketing program interface may be configured to provide access to a charity to part of the marketing program. That interface may enable a member, or other participant, to select one or more charities and allocate contributions or donations to a charity, for example, such as in percentages or contribution tiers (where the first X dollars benefit supported organization A, the next Y dollars benefit supported organization Y, etc.), or a combination thereof, to one or more charities. A skilled reader will recognize that implementations may involve a variety of other contribution priority schemes and/or a variety of marketing program interfaces to provide specific access to particular intermediaries.

In an embodiment, one or more intermediaries may also disseminate intermediary affiliate information to the marketing program, or information regarding the marketing program and/or any merchant incentive to its affiliates. For example, an intermediary may send direct mail to its affiliates, which may represent its existing contributor base if the intermediary is a charity, or financial card holders if the intermediary is a financial card provider. A skilled reader will recognize that the affiliates of an intermediary may be different groups in accordance with the type of intermediary. The direct mail may contain a website address and a participant identifier which may be generated for and associated with the intermediary by the marketing program when the intermediary registers with the marketing program. Upon receipt of the direct mail, an affiliate may navigate to the website address, which may be a portal to the marketing program. The affiliate may thereby be granted temporary, and possibly limited access to the marketing system for a specific purpose.

The direct mailing from the intermediary may also provide the affiliate with the opportunity to register as a member of the marketing system. During the registration process, the affiliate may enter the participant identifier. The act of entering the participant identifier may cause the marketing program to automatically configure the new member's preferences in accordance with rules created to cause specific operations upon the entry of the participant identifier. For example, entry of the participant identifier may cause the member's preferences to include information to provide for specific interaction between the intermediary and the new member, the new member and a merchant, the new member and a community program, or any other interaction. The interaction may include a contribution by the member of certain benefits to the intermediary, or to another participant, at a specific period in time, or upon a specific event. The entry of the participant identifier may further have the result that it signals to the marketing program that new member's personal information may be transferred via an electronic link to information regarding the new member available from another data source. The transferred information may be stored as part of the new members profile in the data storage area.

In one embodiment, at the point of registration with the marketing program, a member may identify a relationship to the intermediary. In another embodiment, the intermediary may post a list of validated people affiliated with its organization and the marketing system may match any registering member to an intermediary list.

Members Registration, Interface and Functionalities

Individuals may register with the marketing program to become members. Registration could be facilitated by one or more registration means. For example, the individual may already be associated with a pre-registered program, such as, for example a financial program or a program of an intermediary whereby the individual is an affiliate of the intermediary. The pre-registered program may have one or more pieces of personal (identification) or demographic information associated with the individual available in a data source. Preferably, the member will provide logical identifiers for corresponding web enabled mobile computing devices by which the member will experience AR-enhanced product advertisement viewing sessions at merchants retail store brick and mortar locations. A registration interface may be provided, this may include a page, for example, such as a web page, a page sent to an individual's mobile device (e.g., such as a smart phone, etc.), etc., whereby the individual approves joining the marketing program of implementations. The registration interface may include a means for importing all personal or demographic information and preferences from the pre-registered program to the marketing program of implementations.

In one embodiment, if the pre-registered program involves one or more identifications the one or more identifications may also be transferred to the marketing program. For example, if the pre-registered program is a financial program one or more forms of payment linked to the pre-registered financial program could also be linked with the marketing program of implementations to enable the marketing program to track transactions made with those forms of payment. In this manner the one or more forms of payment, or other identifications, may provide one or more participant identifiers linked to the new member for use by the marketing program. All registration data, including the one or more participant identifiers, may be stored in the data storage area, and may be accessible by the data mining tool.

As shown in FIG. 3, in another embodiment, an individual 30 may register with the marketing program of implementations by providing, through an interface 32, for example, such as a web page, a page provided on an individual's web enabled mobile computing device (e.g., such as a smart phone, etc.), or other interface, the individual's personal or demographic information and logical identification particular to the individual's web enabled mobile computing device. This information may include the individual's gender, the individual's age, the individual's location (e.g., home, workplace, or other location), as well as other demographic or personal information. The information may be stored in the data storage area and may be stored as a member profile. The marketing program may generate a participant identifier number for the new member. All registration data, including the participant identifier, may be stored in the data storage area 38 of implementations, and may be accessible by the data mining tool.

In one embodiment, a participant identifier card may be sent to the new member bearing the participant identifier number. A skilled reader will recognize that the participant identifier card need not be a physical card, but could be any form of payment device, including for example an RFID chip, a mobile phone, etc. depending on, for example, the supporting infrastructure of merchants.

The marketing program of implementations may be operable to receive information from the member, at the point of registration, as well as at any other point while the member is a member of the marketing program of implementations. Profile data may be collected by way of a variety of means, for example, such as a web page, a mobile device, a survey, transactions between members and merchants, or any other means. Said profile data may include a set of rich data including information that is additional information to that which is gathered at the point of initial registration. Said rich data may include a variety of information, for example, such as a list of the social networks the member is linked to, authentication information for those social networks (e.g. member names, passwords, etc.), preferred supported organizations and merchants (as described more fully below), transaction details for transactions undertaken by the member, survey data, any reviews generated by the member (e.g., merchant reviews, product reviews, or other reviews), updated location data, or other information. The information may be relevant to enabling optimal usage of the marketing program.

In one embodiment, the data mining tool may be operable to identify members who may be inclined to utilize incentives defined by merchants. This identification process may occur in accordance with the rules of the marketing program and/or the analytic mode, and may be based on administrative criteria, for example, such as demographic targeting of incentives.

The loyalty engine of implementations may be operable to communicate the merchant incentive to the identified members.

A skilled reader will recognize that the architecture of the marketing program may enable shielding of the personal information of all members from individual merchants. Shielding may be the result of the application of a security system linked to or otherwise integrated with the architecture of the marketing program and in particular with the transaction linking facility, the data mining tool and the data storage area. The marketing program administrator may be in control of the personal information and may be the sole party having direct access to such personal information. The personal information of a member may be accessed by the data mining tool, but any review, report, list, results or other data generated by the transaction linking facility, data mining tool or analytic mode, may be devoid of identifiable personal information, for example, any results of the data mining tool may be anonymized.

The marketing system of implementations may be optionally operable to provide member with access to the Internet and access to one or more search engines. Said search engines may be operable to support searching by the member. The member may search for merchants or products at which the individual's web enabled mobile computing device can be used to experience AR-enhanced product advertisement viewing. The search engines may be available through the marketing system, or outside of the marketing system. Search engines outside of the marketing system may be linked or otherwise connected to the marketing system. Any searches undertaken by the member utilizing a search engine may be tracked by the marketing program so that details of the search are collected by the marketing system, or if the search engine is outside the marketing program details of the search may be transferred to the marketing program due to the link or other connection between the search engine and the marketing program. Details of the search may be stored in the data storage area.

The loyalty engine of implementations may be operable to permit a member to create a review of a merchant or product. The loyalty engine may further be operable to permit other participants to create reviews as well. The reviews may be created based upon a template, or in response to rules of the loyalty engine, so that the member views a template, or a set of questions and merely responds to the template or questions. The template or questions may be accompanied by an option for free-form creation of a review, such as a space where the member may type a review, or portion of a review. Reviews may be available through the marketing program so that other participants may access the reviews. For example, reviews may be available on an electronic bulletin-board, via specific webpages, via a search, or through any other means. In some embodiments of implementations a member may be provided with an incentive or other reward by the marketing system upon the creation of a review.

In one embodiment, one or more questions on a survey may be dynamic and may be generated to be specific to a member. For example, one or more survey questions to be included on a survey to be provided to a specific member may be generated based on data relating to that specific member stored in, or accessible by, the marketing program. As an another example, one or more survey questions to be included on a survey to be provided to a group, class or category of members (for example, such as a group of boarded members, or other groups, classes or categories of member) may be generated based on data relating to the specific group, class or category of member stored in, or accessible by, the marketing program. Still another example, one or more survey questions may be generated to gather information regarding behaviour of users or members and may be used as a source of information that provides a richer underpinning to consumer behaviour analytics of the marketing program, in particular behaviour relating to a transaction that may facilitate the analysis of the likelihood of a link between behaviour of a member or a user, such as the individual's web enabled mobile computing device being used to experience AR-enhanced product advertisement viewing, and a transaction. A skilled reader will recognize the other uses of survey questions directed to extract information that may be analyzed to produce behavioural data relating to a member or a user.

Yet another example of specifically generated survey questions may include questions relating to a members use of their personal web enabled mobile computing device to experience AR-enhanced product advertisement viewing that the marketing program matches to the transaction with a low, moderate, high or other level of certainty, as described above. As another example of specifically generated survey questions these may include questions generated after a member provides negative review regarding a merchant. A survey generated upon a subsequent transaction involving the member and the merchant may include questions that are devised to indicate whether the experience of the member during the transaction with the merchant improved during the subsequent transaction as compared to the transaction for which the member provided a negative review.

In embodiments of implementations, the marketing program may be operable to support contribution priority schemes. The following represent examples of possible contribution priority schemes that may provided in embodiments of implementations. As one example, the marketing program interface may be operable to allow a member to modify his or her contribution preferences either at any time, or after particular periods of time. Another example is that the marketing program interface may be operable so that a community program, a foundation or other disseminating entity may register as an intermediary of implementations. A member may provide a benefit (e.g., a donation or other benefit) to one or more intermediaries (e.g., the community program, the foundation or other disseminating entity), either directly, or through a merchant.

Figure 4:
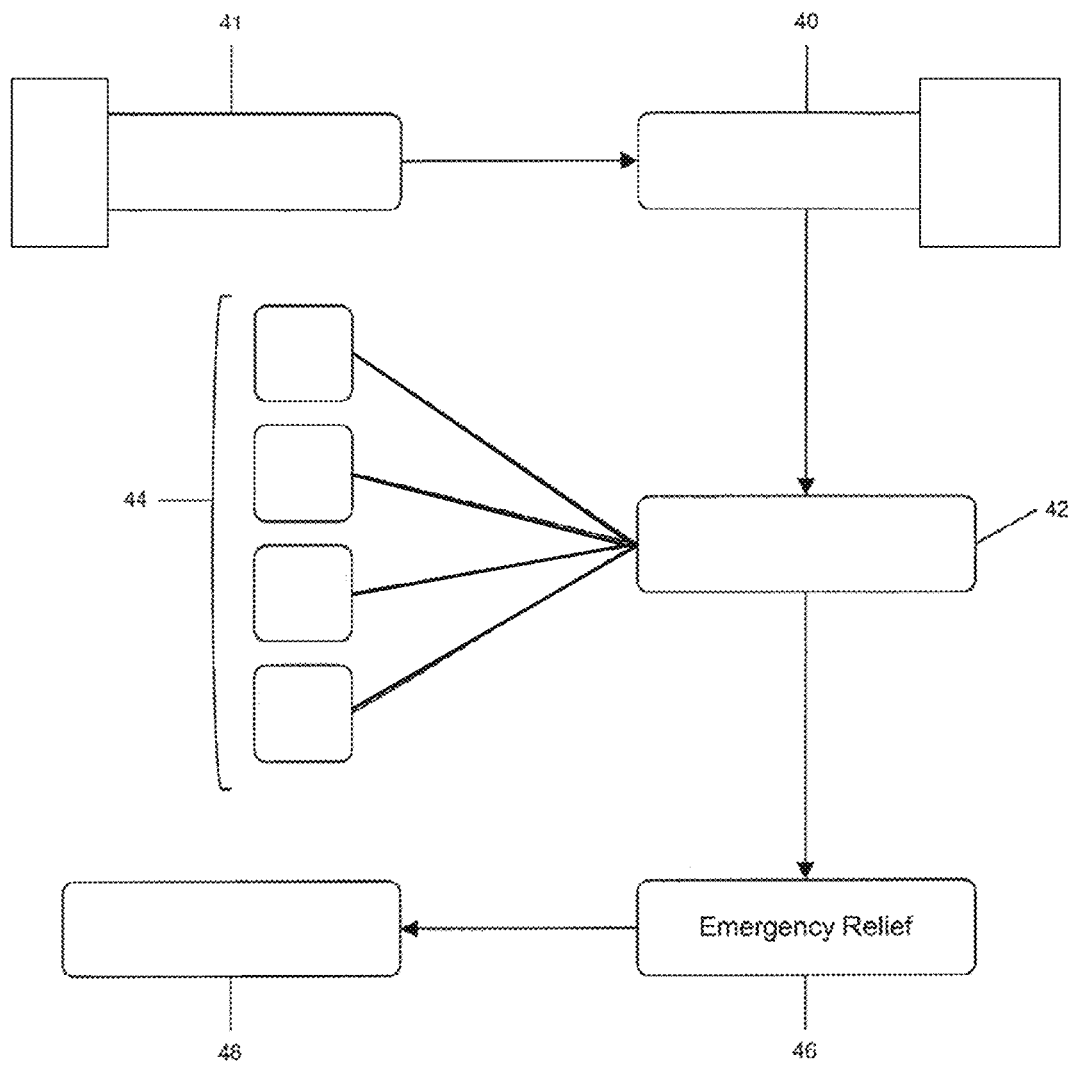
FIG. 4 is a systems view of a transfer of donations by the marketing system.

Following an member's use of their web enabled mobile computing device to experience AR-enhanced product advertisement viewing, for example, as shown in FIG. 4, the benefit may be generated based upon a subsequent transaction between a member 41 and a merchant 40 in accordance with a merchant incentive, such as an incentive that provides a donation to an intermediary based upon a transaction. Once the benefit is received by the intermediary 42 (e.g., the community program, the foundation or other disseminating entity) the intermediary may either accept the benefit, for example if the intermediary is a community program. Or, if the intermediary is not a community program or other group that is to receive any benefit, then the intermediary may disseminate portions of, or the whole of, the benefit to one or more organizations 44, for example, such as charities, community programs, etc. The intermediary may also determine in some instances to redirect portions of, or the whole of, the benefit to an organization such as an emergency relief organization. The decision to redirect the benefit, or portions thereof, in this manner may be due to an emergency (e.g., such as the Haiti earthquake). Information outlets 48, for example, such as the media and social networks, etc., may disseminate information about the support for the organization 46 and build goodwill for the merchant.

In another embodiment, a member may choose to match one or more donations that are generated based upon transactions with merchant stores. For example, the member may indicate to the marketing program that: all donations based upon transactions involving the member should be automatically matched by the member through the operation of the marketing program; that donations based upon transactions involving the member pertaining to one or more specific community programs, to one or more specific merchants, or to all community programs and/or merchants, during a specific period of time (such as during a period of emergency, during a particular campaign of a community program, or during any other period of time) should be matched automatically by the member through the operation of the marketing program; or that donations based on transactions between the member and one or more specific merchants should be automatically matched by the member through the operation of the marketing program. A skilled reader will recognize that other options for a member provide a matching donation through the operation of the marketing program may also be possible.

In yet another embodiment, an intermediary may choose to match donations generated in one or more regions. For example, the intermediary may indicate to the marketing program that: all donations based upon transactions involving all merchants should be automatically matched by the intermediary through the operation of the marketing program; that donations based upon transactions pertaining to one or more specific community programs, to one or more specific merchants, or to all community programs and/or merchants, during a specific period of time (such as during a period of emergency, during a particular campaign of a community program, or during any other period of time) should be matched automatically by the intermediary through the operation of the marketing program; or that donations based on transactions involving one or more specific merchants should be automatically matched by the intermediary through the operation of the marketing program. A skilled reader will recognize that other options for an intermediary to provide a matching donation through the operation of the marketing program may also be possible.

As yet another example, the marketing program interface may provide to the member one or more intermediary codes that, when entered by the member into the interface, could automatically configure particular dissemination rules whereby one or more specific benefits may accrue to one or more intermediaries, charities, community programs, etc. The dissemination rules may be recognized by the loyalty engine.

A skilled reader will recognize that these examples are not exhaustive, and other possible contribution priority schemes and specific interfaces for particular intermediaries may be provided. The contribution priority schemes of implementations may be operable to produce a transparent, accountable transfer of donations or other benefits.

Survey, Review, List, Report, Etc. Generator

To aid in the collection of data stored in the data storage area, and the generation of reviews, reports, lists, results and other data generated by the transaction linking utility, data mining tool or analytic mode, the loyalty engine may generate surveys to be completed by members or other participants of the marketing program of implementations. Such surveys may provide questions specifically created to derive information directed to the function of the marketing system, to particular transactions or transactions generally, to any merchant, intermediary or community programs, or to any other information relevant to the marketing system. Such surveys may be provided when a participant registers with the marketing system, or at any other point in time, such as after a member has used their web enabled mobile computing device to experience an AR-enhanced product advertisement viewing, or after a transaction, following a merchant incentive offering, etc. Surveys may be provided to participants by a variety of means, including through web-pages, upon logging into the marketing program, via a mobile device, as a printed survey at the merchant location, or via any other means.

In one embodiment, a post-transaction survey may be provided to a member involved in a transaction. The post-transaction survey may include a variety of questions, but may particularly include questions regarding the influences that led to the transactions. For example, was the transaction influenced by the member's user of their web enabled mobile computing device to experience a related AR-enhanced product advertisement viewing session, or was influenced by any incentive offered by the merchant. A skilled reader will recognize the variety of questions that may be included in a post-transaction survey.

Reviews, reports, lists, results, etc., based on the surveys can be generated for merchants. For example, survey results that indicate particularly good or bad service by a specific merchant, or particularly good or bad quality of a product, or any other information, may be identified by the data mining tool and the information may be summarized, or consolidated into a review of the merchant, product, or other element to be reviewed. In this manner reviews may be automatically generated by the marketing system, alternatively reviews may be generated upon request by a participant or third party. Reviews may also be created by participants, based upon a template or in a free-form manner. Another example of a use of such information is that when other members are searching for a merchant these members may access or be provided with a copy of a review regarding a particular merchant. A skilled reader will recognize that the use of reviews, reports, lists, results, and other documents may be wide and varied.

Local, Regional and/or National Applications

In some embodiments of implementations, the marketing programs may operate to produce local benefits, regional benefits and/or national benefits to the participants. For example, implementations may be operable to permit a member to participate the marketing program in one location, region, nation, etc. Yet implementations may further permit a member who is travelling, relocating, or is otherwise interested in another location, to participate, automatically, or upon request, in the marketing program in another location, region, nation, etc. Merchants that have an international, national, multi-regional, or multi-locational presence may be associated with the marketing program. Specific store locations associated with a merchant may be recognized as existing within a specific location, so that in the locational, or regional operation of the marketing program the stores locations may be associated with the corresponding community programs of the marketing program.

For example, an incentive may be applicable to one or more store locations of the merchant. An international incentive may be applicable to a community program that is international, such as Right to Play®, and said international incentive may be honored by all of the merchant's store locations in the world. A national incentive may be applicable to a national community program, such as the Canadian Olympic Torch Relay®, and said national incentive may be honored at all of the merchant's store locations within a particular nation (e.g., all Canadian store locations of The Bay®). A regional incentive may be applicable to a regional community program, such as the Vancouver Olympic Games®, and said regional incentive may be honored at all of the merchant's store locations within a particular region (e.g., all store locations of The Bay® in the City of Vancouver, British Columbia, etc.). Smaller locational incentives may also be provided that are applicable to a more localized location, such as a festival held in a park, and said localized incentives may be honored at all of the merchant's store locations within the specified location (e.g., store locations bordering the park where the festival is held, store locations on a street where a street festival is held, etc.)

A skilled reader will recognize that merchants of various sizes may participant in the marketing program of implementations. The marketing program may be operable to permit a community program and/or specific merchant store(s) to associate with the marketing program and receive benefits. Neither the community program nor the merchant need have a national presence. Merchants and community programs that do not have a national presence may enjoy lower national public recognition. This lower public recognition may have resulted in reduced benefits to the community program and/or local merchant store(s), since neither may be recognized beyond a small location and therefore a small number of donators or contributors or attendees or consumers, etc. Participation in the marketing program of implementations may provide participants with the benefit that members gain awareness of community programs and/or merchant store(s) occurring in their local area. This awareness may augment the notoriety of the community program and/or the merchant store(s). The awareness may further have other benefits, described herein, including increased attendance at a community program and/or increased sales at a merchant's store.

As described in this patent application, implementations may have a variety of embodiments, one such embodiment may involve a requirement that a member use their web enabled mobile computing device to experience an AR-enhanced product advertisement viewing which is thereafter followed by the member purchasing the advertised product in a transaction for which the merchant has offered the member an incentive such as the merchant committing to donate a portion of its revenue from the transaction at a one or more store locations involving members to a community program, said community program being local to the merchant store where the transaction takes place. The donation portion of the revenue amount may be based on various parameters. Said parameters may be tracked by the marketing program. The marketing program may operate so as to utilize the tracked transaction information to calculate the amount a merchant is to pay to a community program in accordance with the promised donation. The donation amounts may additionally be trackable and reportable in a clear manner upon request, so that the transfer of the donation amount is obvious and is possibly unencumbered by transfer fees. In this manner this embodiment may enable community programs and merchants to participate in the marketing program in a manner that is cost effective to all parties of the marketing program.

In another embodiment, the marketing program may be operable to permit a merchant to offer different contributions to designated community programs. This may involve a merchant providing multiple incentives at one or more store locations to members, and at least two of the multiple incentives being associated with different community programs. The marketing program may be operable to track the multiple incentives and/or the different contributions by merchants to designated community programs. The factors that may be tracked by the marketing program, said factors may determine the type of contribution to be made by the merchant to a community program and/or the merchant incentive to be applied to a transaction, may include one or more of the following: the time of day when a transaction occurs; the day of the week when the transaction occurs; any member demographics; any transaction history; any incentive details, for example, such as a coupon, provided at the time of the transaction; and the community program details. A skilled reader will recognize that other factors may be utilized by the marketing program to define and track contributions by merchants to community programs and/or merchant incentives.

Boarding Means

In one embodiment, to facilitate batch customer acquisition, a boarding means may be provided to operate to allow a third party and/or intermediary to associate itself with the marketing program. The intermediary may be, for example, an online retailer having a customer base with user accounts, an online payment provider also having a customer base with user accounts, an online advertiser, or any other online presence having a customer base with user accounts. The intermediary could also be a company and the members to be acquired by the marketing program could be the employees of the company. The marketing program may make the boarding means accessible to the intermediary by, for example, a user interface for creating the association. The intermediary may desire to associate with the marketing program for a plurality of purposes, including: increasing its own customer base to include the marketing program's members; altruistic purposes; to increase its own charitable giving for tax purposes; or to appeal to consumers and generate marketplace goodwill. The intermediary could also be a telecommunication company whose cell phone, internet, and related communication services are used by way of web enabled mobile computing devices operated by its customers who will become, after the boarding process, members of the marketing system. These newly boarded members, whose web enabled mobile computing devices are identifiable by the marketing system, are thereafter eligible for receiving the incentive of merchant defined, member directed donations to local charities after the members respectively experience AR-enhanced product advertisement viewing and thereafter purchase the advertised product in a transaction with the merchant has offered the member this incentive.

In one embodiment, the boarding process may operate so that once the intermediary associates with the marketing program, the user accounts of the intermediary may automatically become associated with the marketing program. Once the user accounts are associated with the marketing program each of the users is recognized as a new member of the marketing program. The marketing program may then be operable to provide a user interface for these new members, whereby the new members may complete their profiles. The provision of this user interface may occur in any of the manners described above, for example, such as through the provision of a survey, through the provision of a particular web page, or other means. A skilled reader will recognize that It this boarding process, and the acceptance of new members generally into the marketing program, may increase the awareness of the marketing program and may significantly increase its member base. As described above, this may produce benefits for the merchants, community groups, and other intermediaries participating in the marketing program.

Participant Location Facilitator and Mapping Function

All members of the marketing program may be identified by the loyalty engine of implementations as existing in a particular location. This location may be recognized as being in the vicinity of areas associated with particular community programs. In accordance with the scope of the community programs this area may have a perimeter that encompasses a wide or narrow territory, which scope may be defined by navigation or travel time. For example, the member may be recognized as existing in a location that is within an area that is a neighborhood, or an area that is a country. In embodiments of implementations, it may be possible for the marketing program to recognize a member as existing in a single location (e.g., a home address), or multiple locations (e.g., a home address, a work address and/or other addresses, such as a cottage address).

In one embodiment, a mapping means may be operable to allow a member or other participant to request a map showing merchants that are participants of the marketing program located in, or near to, an area that encompasses a location of the member. The marketing program may utilize the data mining tool to identify a location of the member from the member profile (e.g., the home address of a member), the marketing program may ask the member to choose a location if multiple locations are in the member profile (e.g., choose a home address or a work address of the member), or the marketing program may accept a location inputted by the member as the location of the member. The area of the map may be adjustable to show various sized areas. The marketing program may also be operable to allow a member to specify categories or types of merchants to be shown on the map (e.g., restaurants, clothing stores, hardware stores, etc.). A skilled reader will recognize that other parameters may be included in the requested query.

Implementations may generate a map based upon the member map query. The data mining tool may be utilized to identify any merchants and/or community programs located within the area of the map.

Figure 5:
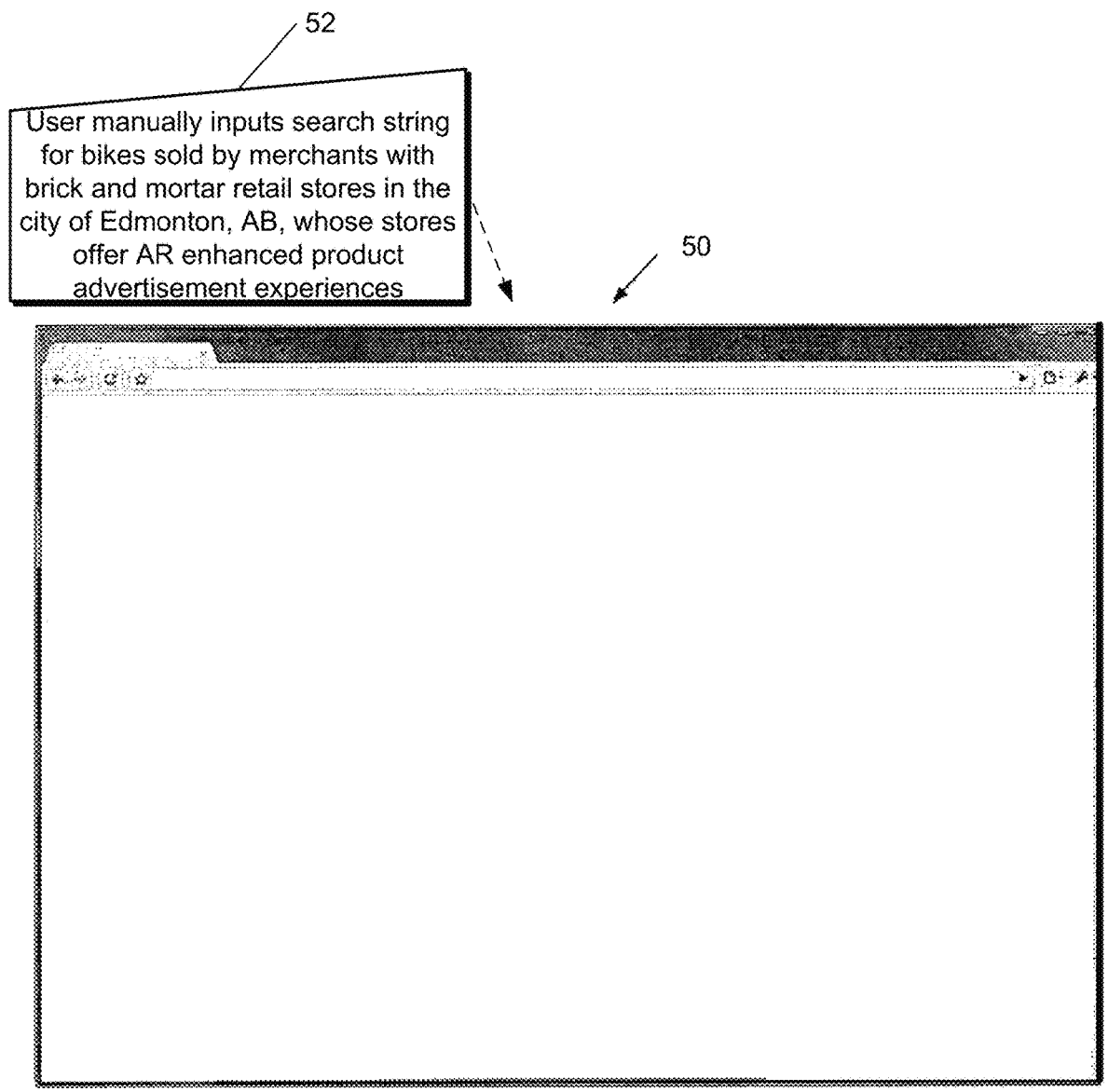
FIG. 5 is a screen view of a merchant information web page.

An example of a map 50 of implementations showing merchant information is shown in FIG. 5. The displayed merchant information on the map 50 implementation is the result of a search string 52 being manually input to a search engine by a user. The search engine using the search string 52 to locate bike merchants located in a particular city, where each merchant has a brick and mortar retail store in the city, and where that store features which product advertisement on posters or displays that bear an augmented reality (AR) triggering symbol. The user conducts this search for these merchants because the user will receive an incentive by: (i) going to one such merchant brick and mortar retail store; (ii) using the camera of a web enabled mobile computing device identifiable to the user to image the augmented reality triggering symbol on a product advertisement on poster or display; (iii) experiencing an AR enhanced product advertisement corresponding to the advertised product on the display screen of the web enabled mobile computing device; (iv) conducting an online or off line purchase of the product in a transaction with the merchant using a debit or credit account; and (v) receiving the incentive. In one example, the incentive can be a user directed, merchant defined donation to a charity of the user's choice that is also located in the city, where the merchant defined donation is a percentage of the transaction amount. Map 50 is just one example of possible maps that may be generated by implementations, and a skilled reader will recognize that other map displays or other map outputs may be possible.

Maps generated by implementations may show the merchant store(s) existing in, or near to, a location or area. The map may additionally show the location of any community programs occurring at the time when the query is sent (e.g., such as a street festival in the area, or a clothing drop-off located on a street). The map may have other facilities as well. For example, the map may indicate, may be by way of a symbol or colour indicator, that particular merchants are offering merchant incentives.

The map may also permit information regarding merchants, community programs and/or merchant incentives to be accessed by a participant, for example, such as by a display that appears when a mouse is held over where the merchant and/or community program is shown on the map, or by a clickable access to information (e.g., clicking the merchant location accesses the merchant web page or a summary of merchant information, etc.), or other information access and/or display means. The displayed or accessed information may include the location of a merchant store and/or a community program, the dates when a community program is occurring, the date(s) for a merchant incentive, and any other information. The displayed or accessed information may be provided in accordance with rules of the marketing program. A skilled reader will recognize that implementations may include other options of visually displaying or accessing information regarding merchants, community programs and merchant incentives in a specific location.

Still other embodiments of implementations may be operable to recognize the location of a member at a point of time. For example, a GPS system on a mobile device in the possession of a member or other participant may send location information to the marketing program. In this embodiment the marketing program may provide a member with information regarding merchant incentives pertaining to the location of the member at a point in time. (For example, a member who travels on vacation to New York City may be recognized by the marketing program as existing in New York City because the marketing program can read the location of the member based on a GPS feature or application linked to the smart phone in the possession of the member. The member may then submit a query to the marketing program requesting information about merchant restaurants local to the location of the member in New York City at the time of submitting the request. The marketing program may generate a map showing merchant restaurants in the vicinity of the location of the member submitting the request in New York City. The function and capabilities of the map may be as are described above.)

In an alternative embodiment of the foregoing implementations pertaining to a geolocation feature or application linked to the member's smart phone, the display of an image captured by the camera is overlaid with indicia, in an augmented reality view of the image, where the indicia are respectively overlaid upon a camera-captured, real time, real world image of a merchant's brick and mortar retail store. Each such indicia enhanced AR image of a merchant brick and mortar retail store serves to indicate to the viewing member that the merchant is currently offering an incentive to the member in exchange for conducting a transaction with the merchant. By way of example, and not by way of limitation, each such AR overlaid indicia can be a heart-shaped symbol that is an indicator that the merchant will make a merchant-defined donation to a charity selected by the member as an incentive to the member in exchange for conducting a transaction with the merchant.

The technological functionality in this geolocation focused alternative embodiment enables the overlaying of each such indicia over each displayed image of each such retail store, and includes the use of smart phone hardware and software based on tracking. To do so, tracking information, including smart phone location information, smart phone orientation information, or a combination thereof is determined. Each indicia (e.g., the heart-shaped symbol) is selected to associate with one or more points on each displayed image of each such retail store. The indicia enhanced AR image of each merchant brick and mortar retail store is determined to be generated, where the AR image includes each of the indicia overlaid on image of the merchant brick and mortar retail store based, at least in part, on the one or more points on each displayed image of each such retail store. A combination of approximate tracking of the smart phone with the member's knowledge of the scene being captured with the camera's image can be utilized to give the member a desirable and informative AR shopping experience. This AR enabled experience blends real world images with augmented indicia to render an image on the display screen that enhances the member's ability to intelligently shop for merchant incentivized goods and services.

Continuing with this alternative embodiment, the smart phone is in communication with one or more location services via a communication network to utilize geolocation data to generate and present location based information to the member's smart phone. 'Apps' installed on the member's smart phone (e.g., a map application, navigation application, AR application, or the like) are used to process geolocation data and present that data to the member via rending on the smart phone's display screen. Other installed 'apps' collect location information (e.g., Global Positioning System (GPS) information based on one or more GPS satellites, Assisted GPS (A-GPS), cell of origin information, etc.), orientation information (e.g., magnetometer information, accelerometer information, etc.), combinations thereof, etc. to determine information utilized in requesting geolocation data. Map information may include maps, satellite images, street and path information, item information such as merchant brick and mortar retail store location image and location information, signing information associated with maps, objects and structures associated with the maps, coordinate information associated with the information, etc., or a combination thereof. The retail store may be a representation of a physical object or a virtual object (e.g., images, audio, video, icons, advertisements, etc.) that can be associated with a location. Further, geolocation data can include information associated with Light Detection and Ranging (LIDAR), pointclouds acquired by one or more service providers (e.g., NAVTEQ, GOOGLE MAPS, etc.).

In still further enhancements to this alternative geolocation focused embodiment, the member's smart phone includes one or more components for providing a graphical user interface (GUI) that is to be utilized in an augmented reality experience. A location app can determine the location of the member's smart phone. The location of the member's smart phone can be determined by a triangulation system such as GPS, A-GPS, Cell of Origin, or other location extrapolation technologies. Standard GPS and A-GPS systems can use satellites to pinpoint the location of the member's smart phone. Location coordinates (e.g., GPS coordinates) can give finer details as to the location of the member's smart phone when media (e.g., images, video, etc.) is captured. For instance, GPS coordinates are embedded into metadata of captured media (e.g., images, video, etc.), and the GPS coordinates can include an altitude to provide a height. The altitude can also be determined using another type of altimeter. A magnetometer app, measuring strength and/or direction of a magnetic field, can be used in finding horizontal orientation of the member's smart phone. The orientation of lense(s) of the camera can serve as a reference point in determining direction. An accelerometer 'app', measuring acceleration in three-axes to provide the acceleration in three directions, can be used to determine vertical orientation of the member's smart phone. The horizontal orientation, in association with the geolocated member's smart phone, can be utilized to map the smart phone's location to one or more camera-captured images of merchant brick and mortar retail stores in the field of view of the camera. An installed camera 'app' converts optical images into a digital format to process incoming data relating to the proximate real world environment (e.g., while executing the location services app). The camera 'app' captures images from the information and extracts real-time elements that are added to the real world data. Thereafter, an AR enhanced, indicia bearing, image of a merchant's brick and mortar retail store can be rendered on the display screen of the member's smart phone.

By Way of Example of the Foregoing Alternative Geolocation Focused embodiment, and not by way of limitation, a potential customer can respectively point the camera of their smart phone at the store front of each of several different competing consumer cosmetic goods retailers, such as are located in a strip mall, inside a shopping mall, or at a stand alone location. In this example, the display screen of the member's smart phone would thereafter respectively render an AR view of each store front, but would include an overlaid, heart-shaped symbol superimposed upon each real time captured image as an indication to the potential customer as to whether or not the store being photographed is offering to make a merchant-defined donation to a local or community charity that had been previously selected by the potential customer. As such, the potential understands that the heart-shaped symbol represents an incentive to the member to conduct a transaction at the store being captured by the smart phone's camera. Based upon the presence, or absence thereof, of the heart shaped symbol on their smart phone screen, the potential customer can make a cosmetics purchasing decision. In this example, web enabled mobile computing device (e.g., smart phone) methodology as disclosed in U.S. Pat. No. 9,317,133, titled "Method and apparatus for generating augmented reality content", may be used, which is incorporated herein by reference.

Data Storage Area & Data Mining Tool

The data mining tool of implementations may be utilized to generate a wide variety of reports, reviews, lists, results, and other data from the data stored in the data storage area. In some embodiments of implementations, in order to produce certain outputs, the data mining tool may also engage the transaction linking utility to generate some information to be provided as part of the output.

The data stored in the data storage area may include information pertaining to past, present and/or future community programs. This information may be gathered by the administrator, as described above. The community program information may link a community program to a specific area or location, and may include details of the community program (e.g., dates, times, location(s), events, summary of community program, etc.)

The data may also include information regarding participants in the marketing program (e.g., merchants, members and intermediaries). This participant information may include information generated at the point of registration, as well as information collected at later points in time, for example, such as through surveys, etc.

The data may further include details of transactions between members and merchants. Such transaction details may include any merchant incentive that was applied to the transaction. If an incentive was applied the community program that the incentive was applicable to may also be included in the data.

In one embodiment, a link may be produced between the transaction data and the community program information already existing in the data storage area. The data mining tool may be operable to limit information appearing on any report, review, list, results, etc., so that such information cannot include any personal information pertaining to any participant of the marketing program. Alternatively, the data mining tool may generate reports, reviews, lists, results, etc., in accordance with rules whereby the data mining tool anonymizes any personal information utilized to generate the reports, reviews, lists, results, etc. A skilled reader will recognize that other methods and means may be utilized to ensure that personal information is not disseminated in any report, review, list, results, etc. Additionally, a skilled reader will recognize that the rules for limiting the dissemination of personal information may be in accordance with privacy legislation pertaining to a particular jurisdiction, may provide limitations representing several levels of security, or may be set to a standard that is stricter than privacy legislation. The standard of privacy imposed on the information may be chosen and applied at the discretion of the administrator.

A skilled reader will recognize that other information regarding the transactions, participants, merchant incentives, donations, and community programs relating to the merchant program may be collected by the loyalty engine and stored in the data storage area.

In one embodiment, a data access management utility may be utilized to organize the collection of data, the storage of data in the data storage area and the access of data in the data storage area. The data access management utility may be operable to restrict direct access to the data to the administrator, for the purpose of protecting data integrity and privacy of personal information. The data access management utility may further restrict access to particular by the data mining tool for particular types of information generation and/or for specific participants. In particular, the data access management utility may recognize that intermediaries have limited participation in the marketing program and therefore that any query or request for information instigated by an intermediary may not access, even for reporting purposes, particular data stored in the data storage area.

In one embodiment all of the information existing in the data storage area may be accessible by the data mining tool for the purpose of generating reports, reviews, lists, results, summaries, overviews, and any other information. The reports, reviews, lists, results, summaries, overviews, and other information may be generated in accordance with rules of the loyalty system. For example, rules may be created whereby a merchant transaction report is generated at a regular interval (e.g., monthly, etc.) for each merchant showing the transactions between merchants and members during a specified period of time.

Rules may also be created to be used for the generation of reports, reviews, lists, results, summaries, overviews, and other information upon request. For example, rules may be created whereby a merchant may request a list of members existing in the vicinity of a merchant's store location.

In some embodiments of implementations, free-form queries may also be undertaken by the data mining tool, whereby specific information may be gathered for a particular purpose or application. For example, after a merchant incentive is completed a free-form query may be created to generate information pertaining to the merchant incentive. This information may be reviewed to glean important understanding of the success of the merchant incentive. A report, review, result, etc. may be further utilized to develop new merchant incentives.

In still another embodiment, a web page or other display may be provided to a market program participant, whereby a request for information or other data query may be generated and conveyed to the data mining tool. The request for information or other data query may be generated through a request or search interface. For example, the request or search interface may be a web page or other display and it may provide entry spaces where specific information may be entered by a participant, such as a data range, a location, etc. Such a web page or other display requiring specific data entry may support a request for information or other data query that is governed by one or more rules of the marketing program. A web page or other display may further allow a participant to choose, or otherwise specify, specific types of information to be accessed by the data mining tool. Such choices or specifications may not be limited by any rules of the marketing program. A skilled reader will recognize that a variety of means may be utilized to provide a market program participant a means of requesting information or generating any other data query.

The data mining tool may be applied to utilize the request for information or other data query information provided by the participant, the marketing program rules, or other inputs to search the data storage area for data relevant to the request for information or other data query submitted by the participant to the marketing program. The data mining tool will be utilized to conduct the request for information or other data query search. Consequently, all of the information stored in the data storage area may be accessed by the data mining tool for the purpose of the request for information or other data query search. This information may include member profiles, transaction data, survey information, merchant incentive information, merchant information, intermediary information, etc.

Figure 6:
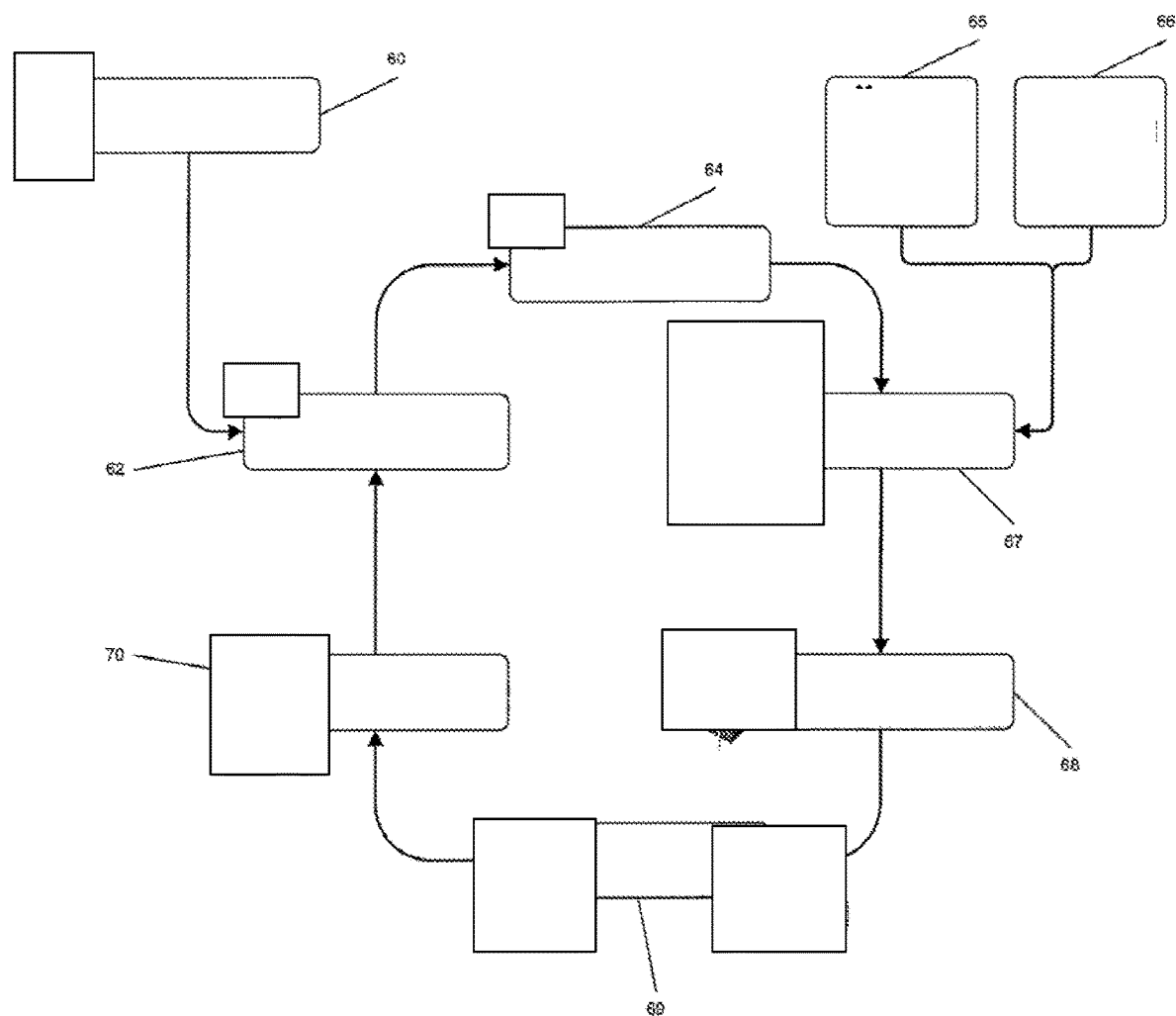
FIG. 6 is a systems view of a request process by a potential customer resulting in the potential customer having an AR enhanced product advertisement viewing experience.

For example, as shown in FIG. 6, a request by a member or participant 60 for an AR-enhanced product advertisement viewing session is initiated by their use of an identifiable web enabled mobile computing device 62 having a camera that images the product advertisement bearing an AR-triggering symbol detected by an application installed on the user's web enabled mobile computing device. When the participant 60 submits the request for the AR-enhanced product viewing session, the data mining tool may engage in a search process 64 to locate one or more AR data sets that correspond to the AR-triggering symbol. The member's request may be proceeded by online or manual efforts to locate a retail merchant brick and mortar store at which the member can find the product advertisement bearing an AR-triggering symbol. As an example, the member can use an online interface to access the data mining tool to conduct a search for merchants in a particular vicinity who also have the product advertisement bearing an AR-triggering symbol. The data mining tool may access data in the data storage area, including merchant profile information, survey feedback regarding merchants 65 and merchant incentive information 66. The data mining tool will generate results 67 that may be displayed to the participant or otherwise communicated to the participant. In one embodiment a cost may be levied for access to the results, and or further searches based upon the results.

The results may display more than one merchant. The participant may be provided with the opportunity to select one or more of the merchants 68 to narrow the scope of the results. For example, the participant may have the opportunity to click upon a merchant included in the results provided as part of an online display. The activity of clicking upon a merchant may cause the participant to access the merchant's web page, or to cause the data mining tool to generate and display more details regarding the merchant. For example, a web page 69 showing reviews relating to the selected merchant and merchant incentives may be displayed when a participant clicks upon a merchant.

After the member goes to the selected merchant and uses the camera of their web enabled mobile computing device to image the product advertisement bearing an AR-triggering symbol, the member will experience the AR-enhanced product advertisement viewing session, which session will be record for that member by the data mining tool or marketing system functionalities.

After the member or participant experiences the AR-enhanced product advertisement viewing session, the member or participant can conduct a transaction 70 with the merchant, such as a transaction whereby a participant purchases an item from a merchant, and said transaction may involve a merchant incentive if qualified by the member's prior use of their web enabled mobile computing device to experience the AR-enhanced product advertisement viewing session. A skilled reader will recognize that this is just one example of how the request for information or data query may function and that other functions are possible.

Analytic Mode

In one embodiment the data mining tool may include an analytic mode. The analytic mode may be operable to cause the data mining tool to perform an analysis based upon the data that the data mining tool accesses. The analytic mode may incorporate rules of the marketing system, or may be distinct from rules of the marketing system.

The analytics may cause the data mining tool to produce information that provides more than a display of a subset of the data stored in the data storage area. The analytic mode may access and incorporate any of the information collected and gathered by the marketing program and stored in the data storage area. The analytic mode may therefore utilized to reflect information: in response to a particular advertisement, merchant incentive or other aspect of the marketing program; providing behavioural data relating to member transactions; and/or pointing to member interests which may be the basis for directing particular advertisements or merchant incentives to individual members or member groups. The analytic mode may be utilized to provide information to be used to develop new merchant incentives, marketing and philanthropic strategies for the marketing program participants and/or the wider community. Analytic mode results may reflect results for a particular area, which may be a city block, a neighborhood, a city, a street, a region, a county, a province or state, a nation, etc., to reflect results for widening ranges of participants and locations.

For example, the data mining tool may produce a list of members existing in a particular location based upon a query, said query being either a free-form query or a rule(s)-based query, if the analytic mode is not engaged for the data mining tool. If the analytic mode is engaged the data mining tool may analyze or otherwise filter, re-represent, consolidate or manipulate prior to presenting the generated data in a report, review, list, overview, summary, result, etc. A skilled reader will recognize that the analytic mode can undertake a variety of data analysis techniques, including algorithms, calculations, reviews, filters, consolidation, manipulation, re-representations. The analytic mode may further involve one or more rules of the marketing program. Additionally the analytic mode may be utilized to produce reports, reviews, lists, overviews, summaries, results, etc. on a regular basis, or upon demand, as described for the data mining tool generally above.

The benefit of the analytic mode may be to generate particular data, provided in a specific format, that may be utilized for a precise purpose. For example, the analytic mode may generate information that provides customer demographics for a particular merchant incentive. The customer demographics may be utilized to develop new types of targeted merchant incentives. A skilled reader will recognize that variety of types of information may be generated by an analytic mode and that a variety of uses may be made of such generated information in the context of the marketing program.

The data mining tool, with or without the analytic mode engaged, may be utilized to provide information to participants of implementations that may aid in creating links between merchants, customer programs and/or specific customer demographics. For example, the data mining tool may be utilized to generate a list of members who may make use of a particular merchant incentive offered in one or more specific merchant store locations. Such a list may be utilized to provide instructions to the loyalty engine to disseminate a communication (e.g., via email, to a smart phone, etc.) to the members included in the list regarding a merchant incentive. As another example, the data mining tool may be utilized to generate a list of members and/or merchants existing in a particular location who may be interested in attending a specific community program event. Such a list may be utilized by a community event to produce a guest list to whom invites may be disseminated (e.g., via email, to a smart phone, via the regular post, etc.) to the member invitees. As yet another example, the data mining tool may generate a display of a set of reviews of a particular merchant to a third party considering becoming a member of the marketing program. Such a list may be utilized by the third party to decide whether to become a member of the marketing program or not, or whether to visit a particular merchant's retail brick and mortar store or not.

A skilled reader will recognize that a variety of information may be generated by the data mining tool, with or without the analytic mode engaged, and that the breadth of the information generated may be directly affected by the depth of information stored in the data storage area. Storing a wide variety of information in the storage data area, which may be portioned for storage purposes, but wholly accessible by the data mining tool, provides data having significant depth for the data mining tool to utilize. implementations is therefore operable to provide not only a wide variety of information, but also detailed information and specific targeted information to be utilized for many purposes.

Transaction Linking Utility

A transaction linking utility may be operable to determine links between member or user's user of their web enabled mobile computing device to experience AR-enhanced product advertisement viewing sessions and a transaction. The determination of links may be qualified, to indicate a level of likelihood or certainty of a match between such AR-enhanced product advertisement viewing behaviour by the member and a transaction. For example, the transaction linking utility may be operable to determine that an AR-enhanced product advertisement viewing for a product undertaken by a member may have resulted in a particular transaction occurring. In this manner the transaction linking utility identifies a link or a match between the AR-enhanced product advertisement viewing and the transaction by the member. The match may not be wholly certain in each case and therefore the transaction linking utility may further be operable to indicate a level of certainty or likelihood that the match or link between the AR-enhanced product advertisement viewing and the transaction is accurate. Many factors can be utilized to determine the level of certainty or likelihood. A skilled reader will recognize that a variety of member or user behaviours or attributes may further be factors in the determination of the transaction linking utility.

The transaction linking utility may be operable in some embodiments of implementations to generate behavioral data regarding activities or behaviours of members or users in relation to transactions. The transaction linking utility may be utilized in conjunction with the data mining tool and in some cases the analytic mode to generate specific data for a variety of purposes relating to transactions.

Method

A skilled reader will recognize that a variety of methods may be applied in implementations. The description below provides some possible examples of methods of implementations.

Registration of Participants and Data/Information Collection

The method of implementations may involve an administrator collecting information regarding community programs. The administrator may utilize automated search means and/or manual search means to locate community programs. Information regarding the community programs, for example, such as the dates, times, events, purpose of the community program, may be stored in the data storage area. The information collected regarding each community program may include details necessary for an individual to attend a community program, as well as details regarding the purpose, history or aims of the community program. All community program information may be stored in the data storage area. The information collected and stored for each community program may include details regarding the location where the community program operates or events relating to the community program are held.

The community program information may be displayed in a variety of means, such as in a list of community programs, a calendar showing the dates of community program events, or in any other means.

Members and merchants may register with the marketing program of implementations. The process of registration may involve the members and/or merchants providing certain information to the marketing program. This information may be saved in a profile for each member and/or merchant. The profile information may include a variety of types of details, but may also include a participant identifier. The participant identifier may be retrieved from organizations or programs the merchant and/or member is previously involved in, for example, such as a BIN number, a financial card number, or a transaction number. Alternatively the participant identifier may be randomly generated and applied to the profile by the marketing program. Additional information may be collected regarding participants due to activities (e.g., transactions, reviews, etc.) and/or the provision of additional information by participants (e.g., by direct input, survey responses, etc.). The participants will preferably provide logical identifiers for each web enabled mobile computing device that they will use to experience AR-enhanced product advertisements.

Some members may be boarded into the system, so that such members are not required to individually enter initial profile information. Profiles information may be transferred to the marketing program for members that have previously been involved with other organizations or programs form said organizations or programs. If boarding occurs the individual member will be required to activate the profile in order to register with the marketing program.

Figure 7:
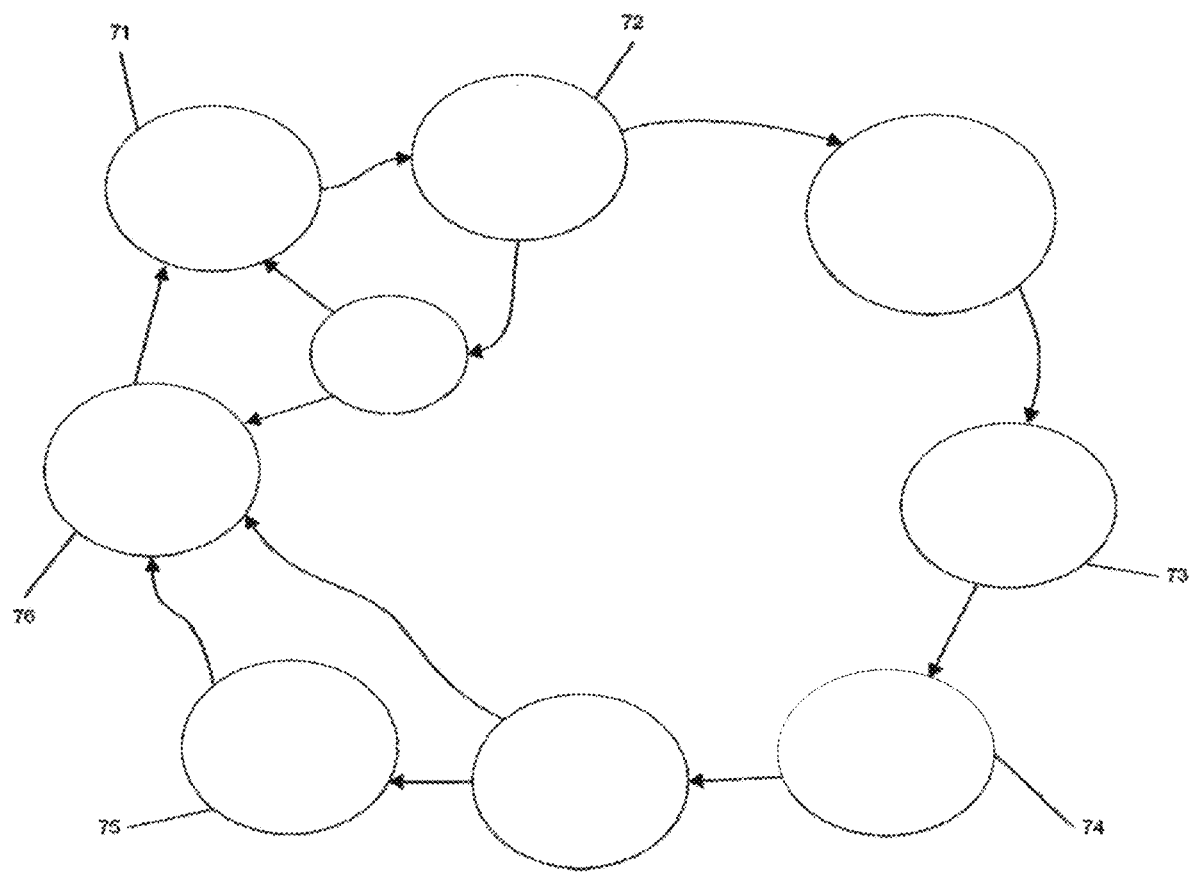
FIG. 7 is a view of the flow of one embodiment of the marketing program generating members through a boarding process.

A boarding process, such as is shown in FIG. 7, may be utilized for example for employees of a company or a financial card provider. In this example, the company or financial card provider may decide to join the marketing program, for example, the company or financial card provider may join as an intermediary and thereby have partial participation in the marketing program. The company or financial card provider may make available information regarding all of its employees or financial card holders for boarding purposes. The employees or financial card holders may be provided with a registration activation code. Once the employee or financial card holder provides the registration activation code to the marketing program the member registration is complete for the employee or financial card holder who then becomes a member 71 of the marketing program. In this example, the participant identifier for the members could be an employee number or a financial card number. This information would be transferred in the boarding process. Alternatively, an employee or financial card holder may be required to watch an informational video regarding the marketing program, or view other information prior to becoming registered as a member. A skilled reader will recognize the variety of means of registration that may be utilized to register a boarded member with the marketing program.

After registration members may access merchant information 72 regarding one or more merchants through the marketing program, as described in this specification. The member may request and access specific information regarding a merchant, for example, such as information regarding merchant products, services and/or incentives. The member may also review information pertaining to the member, such as any amount of rewards (such as reward points) accumulated by the member, member profile information, etc. The member may engage in transactions with the merchant 73, as a result of accessing information regarding a merchant or for other reasons, and the transactions may occur online or offline. Information regarding the transaction may be transferred to the marketing program 74, and the transaction linking utility may be utilized to confirm that a member is eligible for a merchant incentive. The matching may utilize details of the transaction or other member details stored in the data storage area in conjunction with the transaction details, for example, such as merchant incentive information, the identification of a member, financial card information, or other information, to identify when a member is eligible for a merchant incentive.

The transfer of information from a merchant to the marketing program for an online transaction may occur in a variety of ways. For example, the information may be transferred via an information link existing between the marketing program and the online site where the transaction occurred. If the online site where the transaction occurred is accessed through the marketing program website, or through a search engine linked to the marketing program, an information link may automatically transfer the information regarding the transaction to the marketing program. In other instances, the marketing system may be capable of searching the merchant online transaction information stored in the merchant's server to identify transactions involving members of the marketing program or any merchant incentive. In one embodiment, upon a merchant transaction a notification may be sent to the marketing system to search the merchant's transaction information, or the search may occur at any interval or time after the transaction. It may also be possible for the merchant site to transfer information to marketing system at regular intervals when there is relevant transaction information reflecting transactions involving either members or merchant incentives. Any transfer of transaction information or search of transaction information may occur either in real-time in relation to the transaction, or at any time after the transaction occurs. A skilled reader will recognize that a variety of other means and/or methods of transferring transaction details to the marketing program during or after an online transaction occurs may be applied in implementations.

The transfer of information from a merchant to the marketing program for an offline transaction may occur in a variety of ways. The point of sale device of the merchant may be operable to transfer transaction details to the marketing program, either during a sale, for example in real time, or after one or more sales as an upload. Alternatively, the merchant may have a system whereby an electronic report of the transactions is generated and transferred to the marketing program either automatically or upon a specific activity of the merchant. As yet another option, the marketing system may provide a screen whereby a merchant may fill-in transaction details and thereby provide the transaction details to the marketing system. A skilled reader will recognize that a variety of other means and/or methods of transferring transaction details to the marketing program during or after an offline transaction occurs may be applied in implementations.

implementations may involve other means of transferring online and/or offline transaction information to the marketing program. For example, a transfer means may be integrated with a point of sale device used in the transaction, whereby the information is captured by the point of sale device and transferred to the marketing program by the point of sale device. As another example, data feeds may be generated by one or more merchant acquirer or payment processor (for example, such as Moneris®) and the merchant acquirer or payment processor may transfer the data feeds to the marketing program. As yet another example, data feeds may be generated by one or more card issuers (for example, such as the Royal Bank of Canada®, Toronto Dominion Bank®, etc.) and the card issuer may transfer the data feeds to the marketing program. As still another example, data feeds may be generated by one or more card associations (for example, such as Visa®, MasterCard®, etc.) and the card association may transfer the data feeds to the marketing program. As yet another example, data feeds may be generated by one or more data aggregators and the data aggregator may transfer the data feeds to the marketing program. A skilled reader will recognize that other options may be available for transfer of information to the marketing program, including any combination of any of the examples provided above.

As the capture and storage of transaction details, for both online and offline transactions, which may be significant, the marketing program may incorporate a means of obligating and/or otherwise requiring merchants to provide transaction details to the marketing program. For example, the provision of full and complete transaction details to the marketing program may be written as an obligation in any contract whereby the merchant becomes a participant of the marketing program. The administrator may check whether a merchant is meeting this obligation, for example by checking incentives against the transactions, or by any other checking means. A skilled reader will recognize that other means of requiring merchants to provide transaction details may also be applied.

Moreover, a merchant may consider itself to be obligated to provide transaction details due to a recognition that the marketing program is significantly more effective when robust transaction details are provided by all participating merchants, as the transaction details can be utilized to assist merchants to derive information regarding consumer behaviours, and other information. As is described herein, the information of the marketing program may be utilized for a number of purposes, including attracting a larger clientele, creating new incentive programs and other uses. These uses can create significant benefits for merchants, and for this reason, or to meet other obligations or requirements, the merchants may be inclined to assist by providing transaction details to the marketing program.

In one embodiment, a member may experience an AR-enhanced product advertisement viewing session by initiating the same by their use of an identifiable web enabled mobile computing device whose camera images the product advertisement bearing an AR-triggering symbol detected by an application installed on the user's web enabled mobile computing device. When the participant submits the request for the AR-enhanced product viewing session, one or more AR data sets corresponding to the AR-triggering symbol are served for rendering by the display screen of the web enabled mobile computing device. The member may also be communicated one or more incentives to undertake a transaction with a merchant to purchase the advertised product. As described in this application, the member's AR-enhanced product advertisement viewing session may be recognized by the marketing system, and a transaction occurring after the AR-enhanced product advertisement viewing session may be assumed to have occurred as a result of the AR-enhanced product advertisement viewing session, in accordance with criteria of the marketing system, such as the time-lapse between the AR-enhanced product advertisement viewing session and the transaction. If the AR-enhanced product advertisement viewing session causes an incentive to be communicated to the member that is redeemable based upon a transaction, the transaction may also be assumed by the marketing system to be based upon the incentive.

In another embodiment, a member may not undertake an AR-enhanced product advertisement viewing session, but may be assumed by the marketing system to have engaged in a transaction due to an incentive if: the incentive is advertised in the merchant location (e.g., a balloon is provided as an incentive with every purchase); the member acknowledges in a post-transaction survey that the transaction occurred due to the incentive; the member receives a communication about an incentive through electronic communication directed to a personal information area belonging to a member (e.g., a text, an email); the member accesses a webpage displaying the incentive; the member attends an event (e.g., a community program event, or other event) where the incentive is communicated and the attendance of the member at the event is made known to the marketing system and this information stored in the data storage area; and/or other communication means that is trackable by the marketing system so that the marketing system can evaluate the time between the communication of the incentive to the member and the transaction.

After the transaction is completed the transaction data may be processed. This may involve accruing a donation to a community program, if a donation was incorporated into a merchant incentive generated by the transaction.

In one embodiment, a post-transaction survey 75 may be generated and disseminated to the member. The member may respond, and in particular may confirm whether the transaction occurred as a result of the member reviewing the merchant information through the marketing program.

At any point it may be possible for participants to request information from the marketing program 76, as a report, result, review, search display, etc. This request for information or other data query may engage the analytic mode in some circumstances. A skilled reader will recognize that the results of the request for information or other data query may be utilized for a variety of purposes, including for example, identifying transactions occurring in a manner that indicates the transaction occurred as a result of the member receiving information regarding the merchant through the marketing program.

Intermediaries may register with the marketing program of implementations and thereby gain limited access to the program functions and the marketing program data. For example, an intermediary may be a community group interested in limited access for the purpose of looking at the merchant incentives offered pertaining to the community group event. Or the community group may be interested in limited access for the purpose of generating lists of merchants and/or members that may be invited to attend a community program event (such as a fund raising dinner). The list may include local merchants and/or members, or merchants and/or members who have characteristics in their profile that suggest they may be interested in supporting the community program. As another example, an intermediary may be a marketing associate who is working with one or merchants to create merchant incentives relating to community programs. The marketing associate may be granted limited access to some of the data and a certain activities of the data mining tool, to generate information to aid the marketing associate in creating a feasible merchant incentive relating to a community program. As yet another example, an intermediary may be an organization, such as a company or a financial card provider. The organization's participation in the marketing program as an intermediary may provide a link whereby the organizations its associates direct involvement in the marketing program as merchants and/or members.

After the point of registration additional information pertaining to participants in the marketing program may be gathered through a variety of means. For example, a survey may be provided to a participant and completing the survey may generate data that is transferred and stored in the data storage area. Other means of entering information into the marketing program may also be provided to a participant, such as a web page. Surveys and other data input means may be provided to a participant through a variety of means, for example, such as a mobile device, a web page, or other means.

In one or more implementations, a computer-network implemented method is performed for promoting one or more merchants of a marketing program to one or more members of the marketing program. Each of the one or more merchants have a corresponding merchant profile that includes a geographical location and each of the one or more members having a corresponding member profile that includes a geographical location. The one or more member profiles and the one or more merchant profiles of the marketing program are stored on a data storage device, each of the one or more member profiles including a participant identifier of the corresponding member. In such methods, various steps are performed. One such step includes the monitoring, receiving, and storing in the data storage device, electronic signals representing data related to incidences, for the one or more members, of rendering on respective display screens of an augmented reality (AR) view of a corresponding product advertisement containing an AR triggering symbol. The stored data related to each AR view of the product advertisement activity of the one or more members is indexed by the participant identifier of the corresponding member of the one or more members.

Other steps include the detecting of an occurrence of a transaction associated with a merchant of the one or more merchants, the receiving or accessing data associated with the transaction, the determining a participant identifier of the one or more members from the data associated with the transaction, the determining a length of elapsed time between the occurrence of the transaction and the occurrence of the AR view of the product advertisement activity of the one or more members, and the triggering, as a result of detecting the occurrence of the transaction associated with the participant identifier, a determination of whether: (i) the transaction is linked to any AR view of the product advertisement activity of the one or more members with the participant identifier; and (ii) the respective geographical locations of the one or more members and the merchant of the one or more merchants are in the same vicinity.

When the transaction is linked to any AR view of the product advertisement activity of the one or more members with the participant identifier and ii) the respective geographical locations of the one or more members and the merchant of the one or more merchants are in the same vicinity, then a determination is made with a level of certainty whether the transaction is linked to the AR view of the product advertisement activity of the one or more members with the participant identifier, wherein the determined level of certainty varies based on: (i) the length of the elapsed time; (ii) the data related to the AR view of the product advertisement activity of the one or more members; and (iii) the data associated with the transaction.

Based on the determined level of certainty and the data related to the AR view of the product advertisement activity of the one or more members, generating one or more incentives.

In some implementations, the determination of the respective geographical locations of the one or more members and the merchant of the one or more merchants are in the same vicinity is made, at least in part, by location tracking transceiver hardware using a short range wireless network operating protocol that is at least one of the 802.11 family of standards and the frequency range of 2.4 to 2.48 GHz.

In other implementations, the generating of the one or more incentives is performed using a neural network of an artificial intelligence engine.

In still other implementations, the transaction associated with the merchant of the one or more merchants is conducted by one said member, and the generating of the one or more incentives using the neural network of the artificial intelligence engine uses: (i) the corresponding member profile of the one said member; and (ii) the corresponding merchant profile of the merchant of the one or more merchants.

In still further implementations, each incentive is, at least in part, a donation by the merchant of the one or more merchants of a portion of the amount of a future transaction conducted by the one said member to a charity selected by the one said member.

In yet other implementations, the transaction associated with the merchant of the one or more merchants is conducted by one said member, and transaction data for the transaction between the one said member and the merchant of the one or more merchants are communicated by data signals exchanged via near field communication (NFC) devices for the transaction between one said member and the merchant of the one or more merchants.

Possible Data Mining

After registration a merchant may consider possible incentives to implement at a merchant location and/or online. This decision may involve considerations of relevant community programs, possible incentives, cross-loyalty and/or cross-selling groups.

The marketing program may provide query and/or searching assistance whereby a merchant may use a template search query, and the search query may include drop down menus showing search options, to derive information from the marketing system. The template may be utilized by the data mining tool and/or analytic mode to generate a particular result, such as a report, list, incentive suggestion, community program link suggestion, cross-selling suggestion, cross-loyalty suggestion, or other results. A skilled reader will recognize the variety of results that may be derived from the data and/or information in the data storage area, as well as the variety of search query templates that may be provided to a merchant by the marketing system. The results may be utilized by the merchant to make decisions, such as, for example choosing incentives to implement, choosing to form cross-selling groups, choosing to form cross-loyalty groups, choosing community programs to link with, etc.

Information and other data collected by implementations may be stored in a manner whereby the information is easily mineable by a variety of participants and/or third parties, including local businesses. The data mining tool, and optionally the analytic mode, may be utilized to generate or otherwise derive results that may be utilized by merchants or other business owners to determine indicators of successful incentives and other business generators in a specific geographic area. For example, the results of implementations may indicate why one merchant location may get more business than another merchant location or other business location, such as the type of incentive offered (e.g., balloons are offered as an incentive at one merchant location and since these appeal to kids the mothers shopping with their kids will frequent that merchant location which is significant because mothers represent the majority of shoppers in that geographical area; or people living in a particular area may be likely to leave on extended vacations to their cottages during the summer months and on weekends during the rest of the year and therefore may be unlikely to visit some types of merchants during these times; etc.). The results may also indicate to inquiring merchants those members most likely to use their web enabled mobile computing devices to experience AR-enhanced product advertisement viewing, and of those member who are most likely to purchase the advertised product. A skilled reader will recognize the many uses that may be made of the information and data collected by implementations and the fact that such information is generally available for data mining and analytic uses.

In one embodiment, the data mining tool may access information and/or data in the data storage area, and may also access information and/or data from other data sources, which may be outside the marketing system, such as data sources (e.g., databases, hard disks, etc.) controlled by intermediaries, other participants, or third parties. Access to these other data sources may be recognized by the template, by the analytic mode, or by other rules utilized by the marketing system.

A merchant may utilize the data mining tool to identify community programs occurring or to occur in the future, in the vicinity of one or more merchant store locations. The merchant may then devise and develop a merchant incentive for the one or more stores that are local to the community program, said merchant incentive being created to specifically relate to the community program. For example, the relation between the community program and the merchant incentive may function so that upon a transaction between a merchant and a member, a donation may be made to the community program. The transaction between a merchant and a member may be the point at which a merchant incentive is honored, which may involve providing a tangible benefit to a member (such as a prize, sweepstakes entry, or a discount), transferring a benefit to a community program (such as a donation), or another activity. The transaction information may be transferred by the merchant, for example, such as by the merchant's point of sale interface, to the marketing program, and a transaction linking utility may be utilized to confirm that the merchant and member are participants of the marketing program, and that the member qualifies for one or more merchant incentives. A skilled reader will recognize that the merchant incentive may of various types, a coupon, a discount, entry in a sweepstakes, a prize, a donation to a community program, and that a variety of other merchant incentives are possible.

The merchant incentive may be tailored to reflect the specific relationship between a community program and a merchant, aspects of either the merchant or the community program, demographics of local members, etc. Information generated by the data mining tool may assist with the tailoring of a merchant incentive.

A variety of links may exist between participants of the marketing program and these links may be recognized in the data storage area. The links may also develop relationships between participants. Additionally the links and/or relationships may guide and direct the experience of participants of the marketing program. Links may further be created whereby a merchant may be linked to the marketing program brand. Another possibility is that links are created between the merchant program and social media (e.g., Facebook, Twitter, etc.), whereby social media may be utilized to promote merchants, merchant incentives, community programs and/or the marketing program.

In one embodiment, to allow participants to access information regarding the marketing program, the marketing program functions, and to generate queries and/or requests for information, the marketing program may be presented as a website, having a main page and several pages attached thereto. The pages may reflect particular functions of the program, such as reward look-ups, maps of merchants and/or community programs, calendar pages showing community events and/or merchant incentives, links to merchants and/or community programs, access to merchant incentives available to a member, etc. The web pages may facilitate presentations viewable by participants and/or non-participants of the marketing program.

In one embodiment, certain triggers may be set to initiate particular activities of the marketing program. For example, triggered activities may include: data mining in accordance with set rules; sweepstakes processing; donation distribution to community programs or other intermediaries (e.g., such as charities); post-sale feedback; and enhanced analytic mode of the data mining tool. Additionally, particular reports may be produced at regular, specified intervals. Any activity of the marketing program may be initiated upon request, whether a trigger or a specified interval is set for that activity or not.

Figure 9:
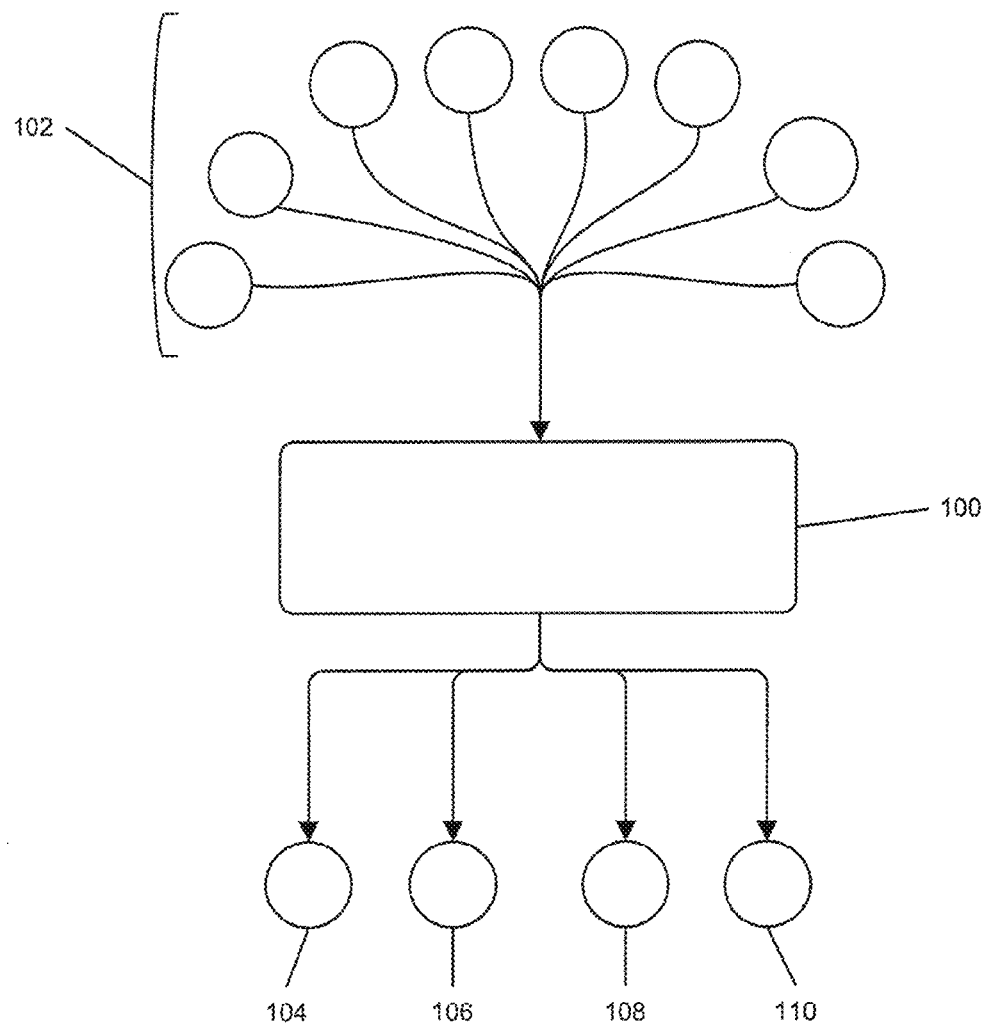
FIG. 9 is a system diagram showing the marketing system outputs that may be generated by the data mining tool, and sometimes the analytic mode, in embodiments.

As shown in FIG. 9, in one embodiment, a variety of inputs and outputs may be provided to and generated by the data mining tool. The inputs and outputs may also be affected by whether the data mining tool engages the analytic mode. For example, the data mining tool, and possibly the analytic mode, may access data or other information that is either stored in the data storage area of the marketing system 100, or may access information from other data sources 102, such as remote databases of intermediaries, merchants or other third parties that the marketing system is permitted to access. The data mining tool, and possibly the analytic mode as well, both of which are elements of the marketing system, may be operable to provide an output 104 that provides suggestions of incentives to a merchant, or group of merchants. The data mining tool, and possibly the analytic mode as well, may also provide other types of reports 106 or other documents as an output. The data mining tool, and possibly the analytic mode as well, may further be operable to generate one or more survey questions 108 as an output to be directed to members. Such survey questions may be dynamic questions. For example, a dynamic question could include the following or any other question: a question asking a member if experiencing an AR enhanced product advertisement prior to a transaction influenced the transaction if the marketing system identifies a suspected correlation between the AR viewing and a subsequent transaction; or a questions that are different depending on whether the transaction occurred on a weekend or a weekday.

A skilled reader will recognize that other results 110 may be generated by the data mining tool, and that these other results may be any of a wide-variety of results.

The data mining tool may access and utilize a variety of information in the course of it processing, such as any of the following, or any combinations of the following: transaction details; member demographics; post-transaction survey responses; responses from any other survey provided by the marketing system, for example, such as market research surveys, etc.; merchant details, including any merchant preferences, merchant store geographical locations, merchant capacity, merchant inventory, merchant target markets, or any other merchant information; seasonal behaviours of any participants of the marketing program, or any other users that data is collected for and transferred to the marketing system; weather trends of forecast information provided to, or accessed by, the marketing system; and any other information or data. A skilled reader will recognize that a variety of other data or information may also be available from the marketing system data storage area and may be utilized by the data mining tool, and in some instances by the analytic mode as well.

The information and data may be processed by the marketing system, and in particular by the transaction linking utility, the data mining tool, and in some instances by the analytic mode as well, to provide specific outputs. For example, the outputs may be any of the following: feedback regarding any success and/or failures of incentives associated with a merchant; feedback regarding any success and/or failures of incentives associated with similar merchants in non-competing geographical areas, if sufficient information regarding similar merchants is provided to, or accessed by, the marketing system; comparisons of incentives associated with a merchant and incentives associated with similar merchants in non-competing geographical areas, if sufficient information regarding similar merchants is provided to, or accessed by, the marketing system; feedback regarding success rates and trends from associated platforms, such as web advertising, traditional media (e.g., print, radio, television, etc.), if sufficient information regarding such associated platforms are provided to, or accessed by, the marketing system; and feedback regarding consumer behaviour or members or users. A skilled reader will recognize that a data or information may also be provided to, or accessed by, the marketing system and utilized by the transaction linking utility, the data mining tool, and in some cases the analytic mode as well, to provide a variety of other outputs as well.

Analysis of data to product behavioural data relating to members or users may be a particular output of embodiments of implementations. The behavioural data may indicate consumer behaviour of members or merchants specifically. Such behavioural data may be derived through a variety of analysis means undertaken by the transaction linking utility, the data mining too and in some cases the analytic mode. The analysis behavioural data output may be utilized in conjunction with specific rules to formulate determinations for a variety of purposes by the marketing program and the participants. For example, the behavioural data may be applied to rules or formula, such as rules based on a determinant outcome, for example, rules having the following structure: if x then y. For example, if a consumer exhibits x behaviour then y is the outcome. As a further example, one rule may be that if a member or user undertakes to experience an AR-enhanced product advertisement viewing session using their identifiable web enabled mobile computing device then that member or user is exhibiting interest in a transaction for the advertised product, or a related advertised product, in the near future. Therefore the time lapse between the AR-enhanced product advertisement viewing session and the transaction may be expected to be a shorter time period than is expected between other AR-enhanced product advertisement viewing sessions and transactions to indicate a likely relationship between the transaction and the AR-enhanced product advertisement viewing session. The basis for this rule may be that an AR-enhanced product advertisement viewing session on a mobile device may be more likely to occur while a member or user is already shopping.

This is an example of one rule that may be used to evaluate or analyze behavioural data. Rules may be further narrowed to factor in certain demographics or attributes of members, such as age groups, genders, parenting responsibilities, etc. which may affect transactions undertaken by members. A skilled reader will recognize that a variety of other rules and factors within rules may be utilized for other evaluations and analysis of behavioural data. A skilled reader will also recognize that extraction of behavioural data, and the analysis and evaluation of such data may expand the member demographic and attribute data of implementations. This expanded data may be used for many purposes, including generating specific incentives to increase purchases made at merchant stores (either online or bricks and mortar stores) and the good will ascribed to merchants.

A skilled reader will recognize that a variety of reports or other documents may be generated by the data mining tool and in some instances the analytic mode as well. For example, such as incentives statistics or incentive trends, to provide details of incentives communicated, incentives redeemed, incentive effectiveness on a cost/return basis, and incentive effectiveness on a traction basis. As another example, success of associated platforms that may include web advertising, traditional media (e.g., print, radio or television) may be provided if information or data regarding associated platforms is provided to, or accessed by, the marketing system. Still another example is output that provides analysis and behavioural data relating to consumer activities of members or users. As yet another example, survey statistics, trends and conclusions may be generated, so that the marketing system may provide comprehensive reporting of survey data acquired and any correlations that can be made from external factors provided to, or accessed by, the marketing program. Such a correlation may be for example, that a golf course has fewer transactions on cold days. The marketing system may be operable to generate suggestions of activities that may address the correlations, generally in the form of incentive suggestions. For example, the marketing system may suggest that an incentive be offered on golfing costs when the weather is below a seasonal averages. A skilled reader will recognize that a variety of reports containing a variety of information, correlations and suggestions may be generated by implementations.

Figure 10:
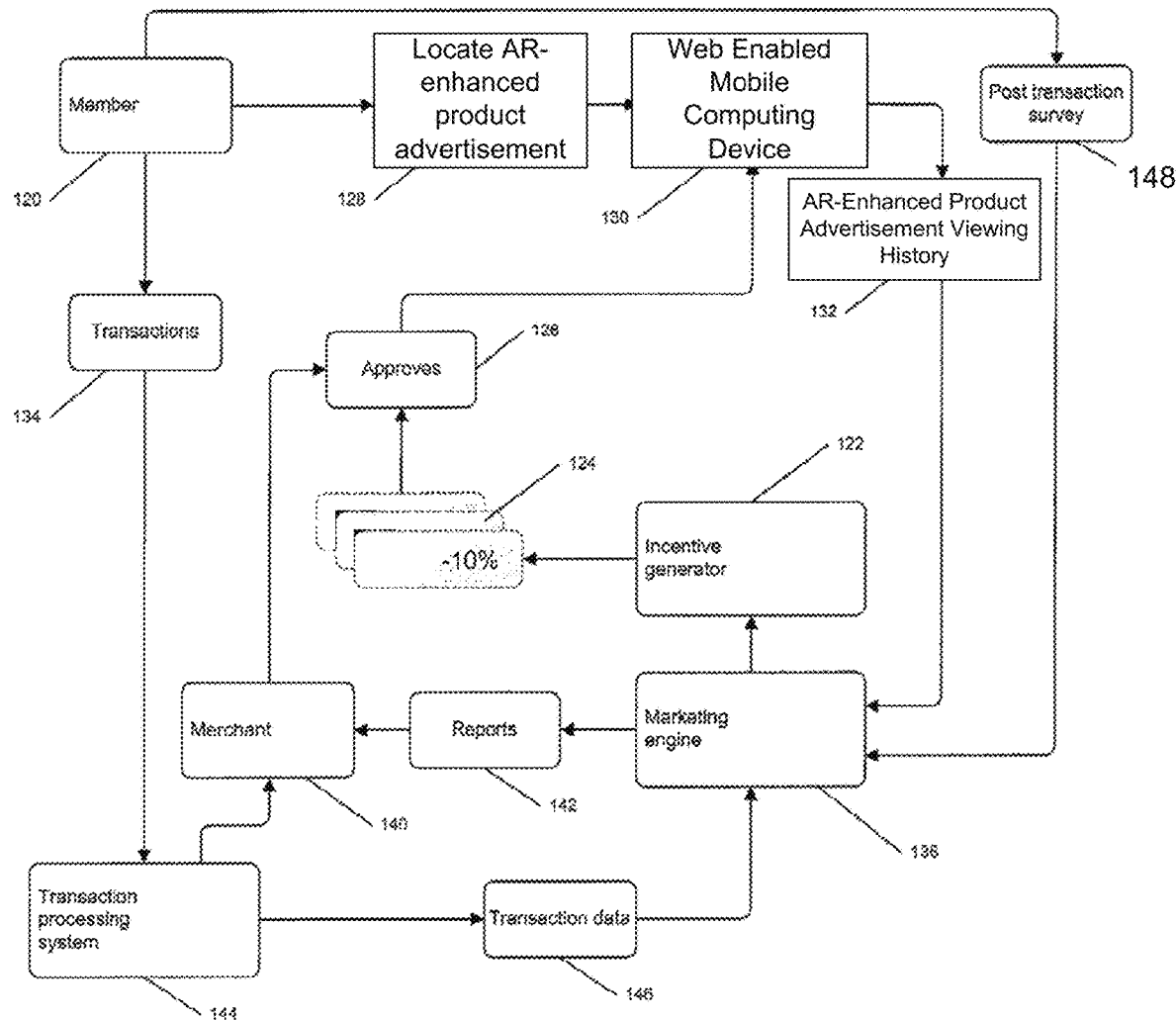
FIG. 10 is a flowchart showing the options for member interaction with the marketing program in one embodiment.

As shown in FIG. 10, in one embodiment, incentives may be generated based on member activities and the data or other information provided to, or accessed by, the marketing system regarding these activities. A member 120 may request an AR-enhanced product advertisement viewing session 128 by utilizing their web enabled mobile computing device 130 that identifiable to the marketing system or linked to the marketing system. An application installed on the web enabled mobile computing device 130 makes a request to be served one or more AR data sets corresponding to one or more AR-triggering symbols in a product advertisement captured by the camera of web enabled mobile computing device 130. Each such instance 132 of the member 120's AR-enhanced product advertisement viewing session may be provided to, or accessed by, the marketing system 136. The marketing system may use the member's instances of AR-enhanced product advertisement viewing sessions 128, in conjunction with other information to generate one or more reports 142 which may be provided to one or more merchants 140. The member's instances of AR-enhanced product advertisement viewing sessions 128 may also be utilized with other information to generate incentive suggestions 122, which may lead to the generation of a merchant incentive 124, such as a discount, that may be approved 126 by a merchant. An approved incentive may be provided to a member as part of the search engine search results, or search click options.

A member 120 may further engage in one or more transactions 134 with a merchant. Details of each transaction may be provided to a transaction processing system 144, such as a point of sale device, or any other means. The transaction details may be provided by the transaction processing system to the merchant 140. The transaction processing system may generate transaction data record 146, which may be provided to the marketing system and utilized by the transaction linking facility in particular in order to link the member's use of their identifiable web enabled mobile computing device 130 with instances 132 of the member's AR-enhanced product advertisement viewing sessions 128.

A member 120, may also complete a post-transaction survey 148. The survey itself, or the survey data may be provided to the marketing system. All of the data provided to the marketing system, including the survey details, and the transaction details, may be utilized by the marketing system to generate reports, or other information, or certain activities, such as sales reports, suggestions for incentives, or incentive generation activities, as just a few examples of possible outputs of the marketing system.

Some embodiments of implementations may be operable to generate incentives on an automatic basis. The marketing system may utilize information and data stored in the data storage area to perform particular analysis, including analysis of the effectiveness of prior incentives, as well as market trends, such as periods when sales are higher or lower. The marketing system may utilize the analysis results and other data to generate one or more new incentives. These incentives may be automatically generated and may be communicated by the marketing system pending merchant approval. Merchant approval may be manual or automatic approval. Upon approval the incentive may be auto-loaded to various media including any of the following: newspapers, brochures, flyers, specialty advertising (e.g., Val Pak®, etc.) or any other media.

A variety of information or data may be utilized by the marketing system to automatically generate one or more incentives. For example, any of the following data or information may be utilized: merchant type (e.g. merchant category, services and/or products provided, service vs. product based merchant, etc.); location of merchant stores and geographical location; history of a merchant's experience with past and present incentives (customer acceptance, feedback about the incentives, contribution margin, etc.), for example incentives that generate the most interest, as indicated by the incentives being rated highest by users and members in post-transaction surveys, or as indicated by a comparison of incremental sales data following the incentive being posted; successful incentives in areas that are non-competing geographical areas; indications of identified member's interest in an incentive, such as data based on recorded AR enhanced product advertisement viewing patterns in an retail merchant brick and mortar store environment (e.g., frequent AR ad viewings of a product, service, or member by a user), electronic coupons downloaded by a user or member, or the comparison of AR product ad viewing patterns and/or downloaded coupons with transaction details; and member demographics tied to transaction history and trends.

Automated incentive generation may be based on a variety of criteria, for example it may be based on specific customer segments. Such customer segments may include as an example: targeted local neighborhoods; customer demographics (e.g., gender, age, etc.); financial card BIN range, as this may determine if the card is a regular card, gold card, platinum card, etc., and the type of card may provide details regarding the card holder and the likely transactions to be conducted by the card holder; buying history of users, members, or other customers; users AR ad viewing at a merchant's brick and mortar retail store; the AR ad viewing behavior of particular users, such as frequent AR Ad viewing relating to a product or service, such as bikes or bike accessories, undertaken by a user or a member.

The incentives that are automatically generated may be related to several elements and/or factors. As an example, automatically generated incentives may be related to any of the following: a season; one or more days of the week, or of the month; special events, including holiday seasons (e.g., the Christmas season, etc.) and celebrations (e.g., parades, a community event such a run for a cause, etc.); or local events (e.g., little league finals, town street festivals, etc.). The success or effectiveness of an incentive may be determined based on any of the following: the statistics regarding whether an incentive is redeemed; post transaction feedback regarding the incentive, such as feedback derived from a post-transaction survey; and increased sales from a group of consumers targeted by an incentive, or during a period of time that is targeted by an incentive.

Transactions

Transactions between merchants and members may occur online or offline. A transaction will be recognized as occurring between a merchant and a member because the member will utilize at least one of the identifications recognized as belonging to the member by the marketing program. The merchant may also utilize at least one of the participant identifiers recognized as belonging to the merchant by the marketing program.

As an example of an online transaction, such a transaction may occur in a website environment, whereby a member purchases an item or service from a merchant through a series of clicks, or other online means of purchasing an item or service. The website will transfer the transaction information to the marketing program. In some instances the information may be transferred to the marketing program by a third party. The marketing program will recognize the transaction as occurring between a member and a merchant due to the use of the participant identifiers.

As an example of an offline transaction, a member may visit a merchant's store location and may undertake a transaction to purchase an item or service from the merchant. The transaction may involve a point of sale device that will transfer information regarding the transaction, including the participant identifiers to the marketing program. A transaction that does not involve a point of sale device may be recorded by another means and the transaction details, including the participant identifiers, may be transferred or manually entered into the marketing program. The transaction details may be transferred to the marketing system by a third party in some instances.

Depending upon the form of transaction, the transaction may be recognized by the marketing program in real-time, near-real time or after a time lapse. Transaction details may be matched to a member profile by the data mining tool or other element of the loyalty engine, and the transaction details may be stored to the member profile in the data storage area. Following a transaction a post-transaction survey may be communicated to a member, for example, via a web page, via email, via a mobile device, etc. The post-transaction survey may gather feedback from the member. In some embodiments of implementations the post-transaction survey may be anonymous and the information collected from the survey may be stored in a manner linked to the merchant in the data storage area. This data may be utilized by the data mining tool and the analytics mode. Post-transaction survey results may be generated by the data mining tool and may be provided to participants of the marketing program.

A merchant may utilize information generated by the data mining tool and possibly the transaction linking utility, both of which utilize the data stored in the data storage area, to devise, define and develop a merchant incentive. In one embodiment, an intermediary, such as a marketing associate, may be involved in developing or communicating a merchant incentive. Either or both of the merchant and the intermediary may access information generated by the data mining tool for the purpose of creating the marketing incentive, or analyzing the effectiveness of a marketing incentive once it is completed. A group of merchant incentives may further be analyzed for the purpose of creating more effective merchant incentives in the future.

Information may be collected pertaining to participants in the marketing program upon the event of transactions between a merchant and a member. Such information may be transaction details, and may further include details regarding any related merchant incentive. As described above a merchant incentive may be related to a community program and therefore may be available at one or more merchant stores that are within the vicinity of the community program. (The vicinity may be of various sizes, a community park area, a neighborhood, a city, a county, a province or state, a country, defined by travel time, etc.) The merchant incentive, or information about the merchant incentive, may be communicated to a member, or a group of identified members, in a variety of means, including via a web page, via a mobile device, via an email or text, etc. A merchant incentive, or information about the merchant incentive, may be communicated to a mixture of members and third parties by a variety of means, including print media, radio or television broadcasts, web pages, billboards, emails, text, mobile devices, etc.

The communication of the merchant incentive to third parties may introduce said third parties to the one or more merchant stores, the community program that the merchant incentive pertains to and/or the marketing program. In one embodiment, transactions between third parties and merchants during a merchant incentive or a community program may be tracked and data regarding such transactions may be stored in the data storage area. Said data may be utilized by the data mining tool and the analytics mode to produce analysis of the transactions to aid in the participation of the merchant in the marketing program, for example, such as to create new effective merchant incentives.

In one embodiment, transactions may include transactions that do not occur at a physical (bricks and mortar) store location, but may include transactions occurring in a digital environment, such as via a website.

Example Method

A skilled reader will recognize that the marketing system and method of implementations may function in a variety of ways. As an example of one embodiment, a system administrator may cause a local community program to be stored in the marketing system, for example, such as Caribbean, a festival celebrating Caribbean culture held in cities such as Toronto, Canada. One or more merchants registered with the marketing program may recognize that one or more Caribbean events will occur near a store location. The one or more merchants may develop one or more merchant incentives related to Caribbean. The one or more merchant incentives related to Caribbean may be communicated to participants, for example, to members that are located near to one or more Caribbean events, or to members that are located near to the one or more merchants offering Caribbean related incentives. The one or more merchant incentives may also be communicated to third parties, and information regarding the marketing system may also be communicated to third parties so that third parties can know how to become a participant of the marketing system.

Transaction details regarding transactions with the one or more merchants whereby the one or more merchant incentives are redeemed may be transferred to the marketing system and stored in the marketing system. A skilled reader will recognize that the means of transferring transaction details to the marketing system may be varied and that the options may differ for online and offline transactions. Some of the possible means of transferring transaction details for online and offline transactions are discussed above, although a skilled reader will recognize that the discussion does not provide a complete list of all of the possible transfer options it merely provides some examples of transfer options.

A post-transaction survey may also be provided to participants and/or third parties redeeming merchant incentives to gather information relevant to the transaction and the participants and/or third parties undertaking the transaction.

The transactions may involve registered members of the marketing program. A member may be identified as a member during the transaction by using one or more participant identifiers and/or other identifications recognized by the marketing program as associated with the member. For example, the member may use a participant identifier or other identification that is a financial card, a number generated by the marketing system, or any other identification.

The data mining tool, and in some instances the analytic mode, may be utilized to search the transaction details and other marketing system data to provide results. The results may indicate success measurements for promotions and the results may also indicate information that may be applied to the creation of other incentives in the future. For example, the results may indicate demographic information regarding the persons redeeming incentives, including participants and third parties. In the case of an incentive created by a merchant in relation to a Caribbean event, the results may indicate that participants and/or third parties wanting to redeem an incentive may not be local to the merchant location, but may have travelled from a specific area, for example, such as a specific town in the province, or a specific neighborhood in the city that is distant from the merchant location. In this manner implementations may be utilized to draw assumptions regarding the relationships between transactions at a merchant location and a particular incentive offered at that merchant location. A skilled reader will recognize the variety of results that may be provided by implementations and the ways that such results may be utilized by participants and/or third parties.

The data mining tool, and in some instances the analytic mode and/or the transaction linking utility, may also recognize that the activities of a participant may cause that participant to be eligible for specific incentives. For example, the frequency of transactions with a merchant, the time of day of a transaction with a merchant, the creation of a review, or other activities may cause a participant to be eligible for an incentive. The data mining tool may automatically apply the incentive, such as a donation to a community group, may automatically communicate the incentive to the participant, such as a coupon for a future purchase, or may apply or communicate the incentive based upon instructions by the administrator or merchant.

Cross-Sell

In another embodiment, cross-selling relationships and programs may be created. A cross-sell involves at least two merchants, or at least two merchant stores, that are generally non-competing. A cross-sell occurs when a member completes transactions at each of the two (or more) merchants involved in a cross-sell relationship. A cross-sell may be required to include the transactions with the merchants involved in a cross-sell relationship occurring within a specified period of time. Events of cross-selling may be validated by a query sent to the transaction linking utility in accordance with particular rules that cause the transaction linking utility to identify valid cross-sells by members. For example, a transaction with one of two cross-sell merchants followed within the specified period of time with a transaction with the other cross-sell merchant may be recognized as a cross-sell. As another example, if the transactions are online, a click to complete a transaction with one of two cross-sell merchants followed by a click to complete a transaction with the other cross-sell merchant may be recognized as a cross-sell. In this example, the member's two (2) clicks to complete the cross-sell transaction may be required to be proceeded by the member experiencing two (2) or more AR-enhanced product advertisement viewing sessions each of which respectively advertises a different product sold by each of the two (2) different merchants.

As yet another example, a cross-sell may be refined based on the terms of the cross-sell incentive. Such terms may include specific times, specific day(s) of the week, minimum purchase restrictions, or other terms. So that if a transaction occurred at each of two cross-sell merchants and the transactions meet specific terms, for example, such as occurring on a Tuesday between 5 pm and 8 pm, then this may be recognized as a cross-sell. A skilled reader will recognize that other criteria may be utilized to define cross-sells.

Upon the completion of, or recognition of, a cross-sell a reward may be generated and communicated or distributed to the member. In one embodiment, a member may be required to login to the marketing program to accept or otherwise obtain the reward. Specific steps may be required to accept the reward, or alternatively the reward may be transferred to the members profile and be visible when the member accesses his or her profile information. Other means of accepting or obtaining the reward may be utilized with implementations as well. The reward may be of a variety of types, such as a coupon, bonus offer, prize, sweepstakes entry, etc. A reward may therefore be redeemed in accordance with the nature of the reward.

A cross-sell relationship could be created amongst merchants, or merchant stores for a variety of reasons. For example, a merchant that includes two or more stores could create a cross-sell relationship whereby a member would have to visit all the merchant stores before receiving a prize (e.g., such as a treasure hunt). As another example, a merchant having a single store may provide a reward after multiple visits (e.g. after nine transactions a 50% discount will be applied to the next transaction).

As yet another example, a group of merchants could unite to provide a benefit to members that undertake transactions at all, or some, of the associated merchants. It may be possible for the benefit to increase as the member undertakes transactions with an increasing number of merchants. It may be possible the marketing program may define the group of merchants, for example, such as a group that includes merchants from the same category (e.g., sports stores) or from complimentary categories (e.g., clothing stores and shoe stores). It may be possible for the reward to involve a merchant outside the group of cross-sell merchants (e.g., transactions with a cross-sell group of three golf course merchants will generate a reward for a member that is a coupon for a free dinner at a restaurant merchant).

In one embodiment chain cross-selling may occur between three or more merchants. Chain cross-selling may involve three or more merchants, generally non-competing merchants, deciding to create a chain cross-sell group. The chain cross-sell group may involve three or more merchants with related products and/or services that may offer incentives based upon a member frequenting three or more of the chain cross-sell group. A member in a chain cross-sell group may be outside of the marketing system. In a chain cross-sell group it may be possible for the incentive offered to a member or other participant to increase as more of the cross-sell group products and/or services are purchased. The member, or other participant, may be recognized by the provision of an identification that is stored in the marketing system, whereby the member is identified as a member of the marketing system, such as a participant identifier.

For example, a cross-sell group may include a hotel, golf course, restaurant, sports store and hiking guide in a particular location, such as Banff, Alberta, during a particular event, such as the summer golf months. A member, or other participant, who stays in the hotel and plays golf at the golf course in the cross-sell group may receive a 10% discount or other incentive. Whereas, if a member books a hotel room, a round of golf and dinner at the restaurant that are part of the cross-sell group a 20% discount may be applied. And as the member purchases products and/or services from even more of the cross-sell group the incentives continue to increase. A member staying at the hotel, who golfed at the golf course and ate dinner at the restaurant, and who also purchases a product at the sports store may receive 40% off the product purchased at the sports store. Should that member also book a hike with the hiking guide of the cross-sell group then the hike may be provided at a 50% discount and a donation may be given to the Banff National Park, or another community group. A skilled reader will recognize that a variety of cross-sell groups may be formed and that a variety of incentive options may be provided based upon the cross-sell groups.

Cross-selling incentives may be evaluated to determine the success of the cross-sell incentives. it may be possible for the cross-sell incentives to be evaluated as individual incentives, and as a group of cross-sell incentives. In this manner the marketing system may evaluate whether a particular incentive was successful on its own, and whether a group of incentives were popular. In this manner it may be possible to identify where cross-selling led to transactions frequently, including transactions that may not have otherwise occurred without the cross-sell incentive being offered. For example, did the offer of a hiking guide lead to more use of this service by members staying at a hotel, eating at restaurant and golfing at a golf club that are part of a cross-sell group than would have occurred if the hiking guide was not included in the cross-sell. A skilled reader will recognize the variety of evaluations that may be undertaken of the individual and collective incentives involved in a cross-sell.

Figure 11:
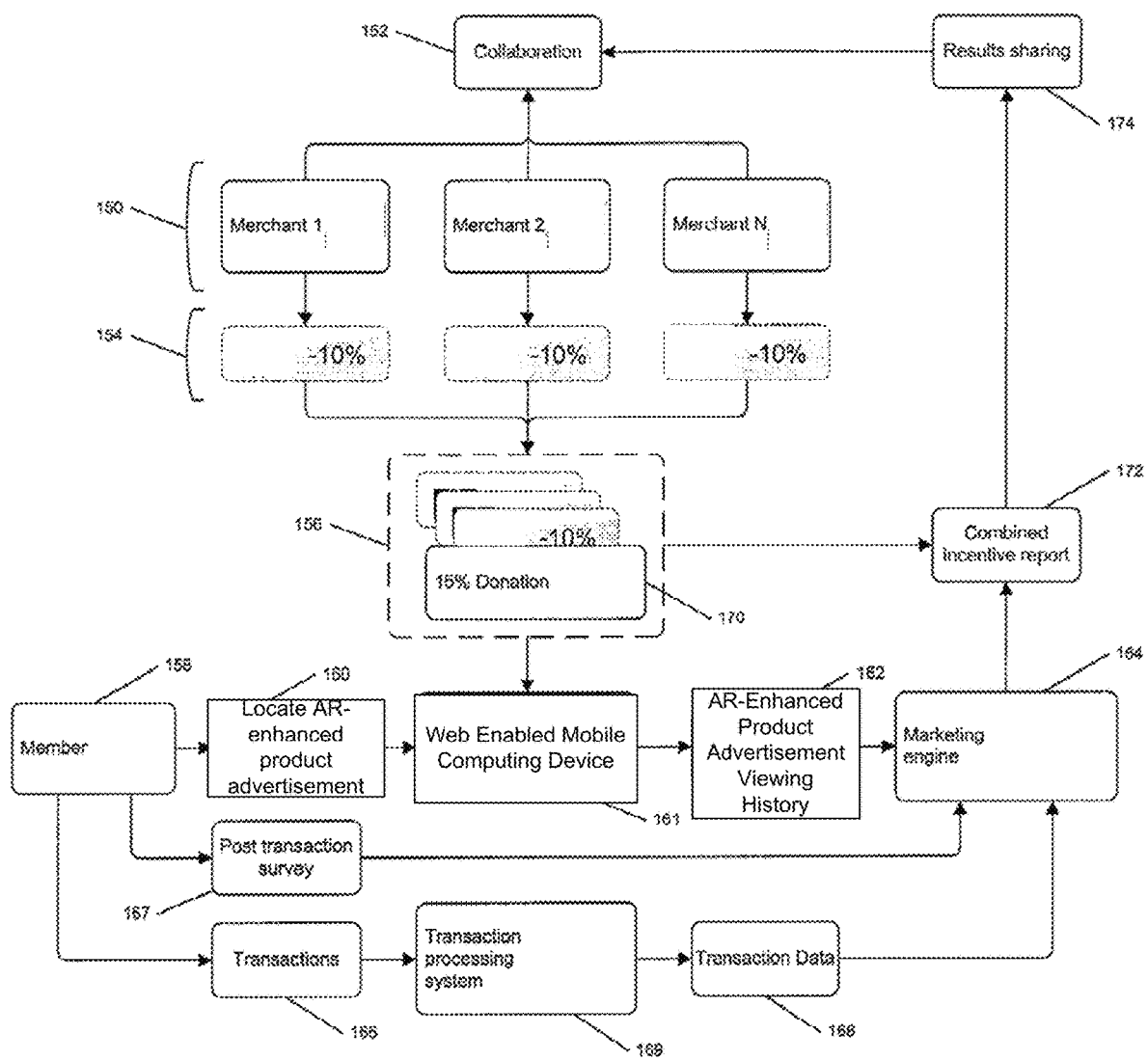
FIG. 11 is a flowchart showing the options for an embodiment involving cross-selling.

In one embodiment, as shown in FIG. 11, two or more merchants 150 may collaborate to produce one or more cross-sell collaborations 152. The collaboration may involve one or more incentives 154 provided by each merchant. The incentives of each merchant may be combined into a linked incentive 156. The linked incentive may include a further incentive 170, that is honored when transactions with each of the collaborator merchants are undertaken by a single member. To be eligible for the linked incentive 156, a member 158 may be required experience one or more separate AR-enhanced product advertisement views 160 utilizing their identifiable web enabled mobile computing device 161, where each session respectively corresponds to each of the two or more merchants 150 and products they sell or advertise for sale. The linked incentive may be communicated to the member as a result of the AR-enhanced product advertisement viewing sessions 160 requested by the member's use of their web enabled mobile computing device. The history 162 of the member's separate AR-enhanced product advertisement viewings 160 links may be provided to the marketing system 164.

The member that experienced separate AR-enhanced product advertisement viewings 160 and had the linked incentive communicated to him or her, may undertake a transaction 166 at one or more of the collaborating merchants. Transaction details 168 for each of the transactions may be transferred a transaction processing system 169 that may generate transaction data 168, and the transaction data may be transferred to the marketing system 164. The marketing system may process the transaction details and any post-transaction survey 167 results provided by the member. The marketing system may generate a combined incentive report 172. For example, the generation of the combined incentive report may occur when a merchant undertakes transactions with all of the collaborative members and triggers the additional incentive, or at any other time. Results for sharing 174 may be generated from the combined incentive report so that results of each of the incentives in the linked incentive are shared with all collaborative merchants, so that each merchant receives results relating to its particular incentive and the additional incentive, results may be produced to share some of the results of two or more collaborative members, or results may be produced in any other configuration. Results may be compared to the collaboration, so that conditions of the collaboration, such as the additional incentive, may be evaluated. In particular the comparison may consider whether the conditions were fulfilled. In some embodiments of implementations the marketing program may auto-generate suggestions for cross-sell incentives or auto-generate cross-sell incentives for approval by collaborating merchants.

Cross-Loyalty

The marketing program of implementations may further involve cross-loyalty programs or cross-marketing programs. Such cross-marketing program may function in a manner as described in U.S. patent application Ser. No. 11/283,856 which is hereby incorporated herein by reference. The cross-marketing programs of implementations may further involve a variety of merchants and intermediaries, such as community programs. In this embodiment the community program may work with the merchant to develop a cross-loyalty program. To aid a merchant in creating cross-loyalty and/or cross-sell relationships, the data mining tool may be utilized by the merchant to access information regarding other merchants and/or intermediaries (or groups of merchants and/or intermediaries) that are participants in the marketing program.

Other Implementations

Figure 12:
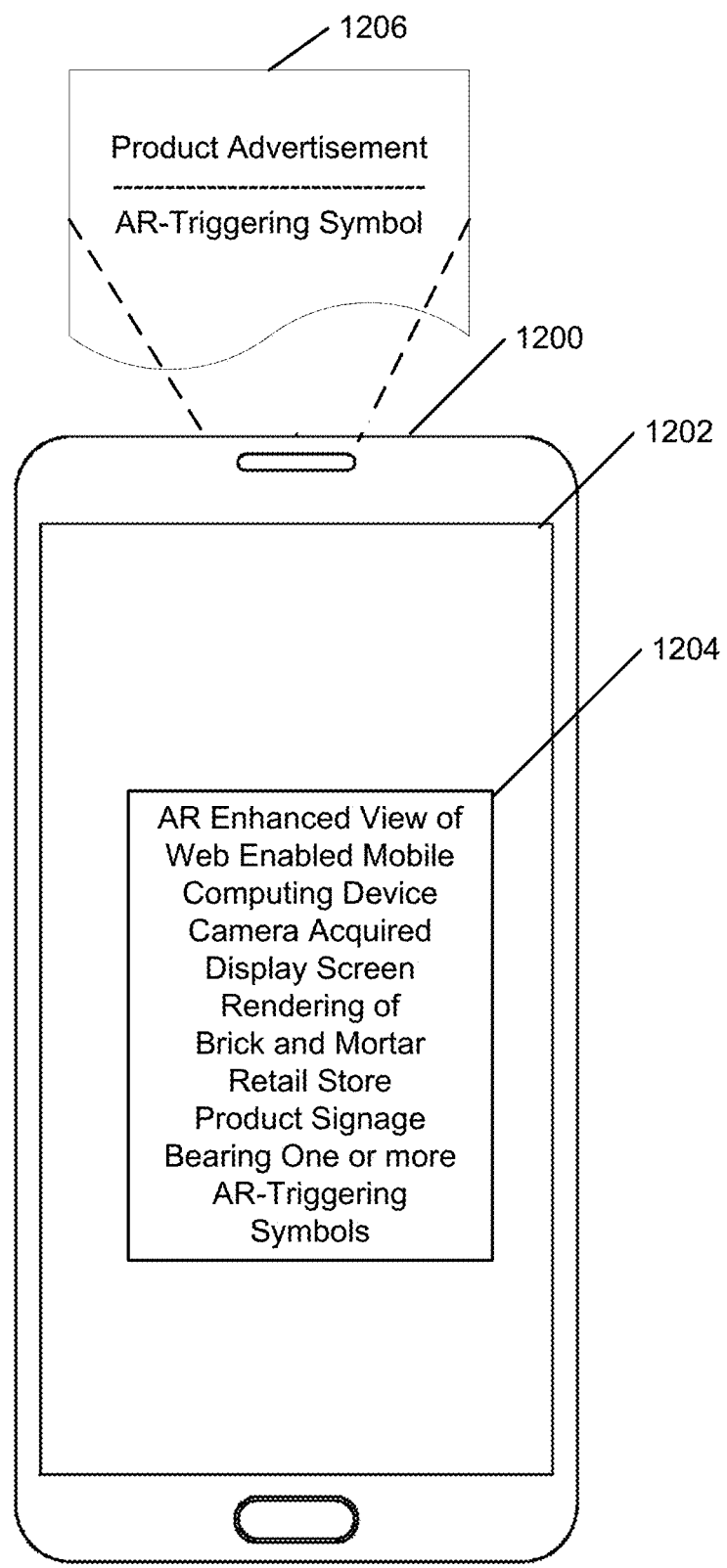
FIG. 12 is a block diagram of a device displaying a product with augmented information according to an example embodiment.

Augmented reality functions are used to obtain, display, present and/or provide content concerning: (i) a product; and/or (ii) a different product that is complimentary to a particular product. Typically, the content is obtained and displayed in response to the product advertisement being brought within the field of view of a display device. Thus, for example, when a user brings a product advertisement into the field of view of a display device, the product advertisement includes an augmented reality (AR) triggering symbol that defines the context for obtaining and/or displaying the content. Alternatively, or in any combination, the AR triggering symbol may define the context for obtaining and/or displaying content pertaining to a different product that is complimentary to a particular product depicted in the product advertisement. For example, if the user is engaged in an AR experience relating to a mountain bike product advertisement, the AR triggering symbol borne within the mountain bike product advertisement may define the context for obtaining and/or displaying content pertaining to products that are complementary to the sport of mountain biking, such as bike gloves, bike seats, suspension upgrades, helmets, etc. Typically, after or as the user removes the product advertisement from the camera's field of view, content corresponding to the product or a portion thereof that is no longer in the field of view is no longer displayed (e.g., disappears or fades from) the display because the corresponding content is no longer supported by the AR triggering symbol or portion thereof. In other words, when the product advertisement is removed from or leaves the field of view, there is no context about which to generate product information. In another embodiment, all of the content or at least a portion thereof may continue to be displayed for a period of time after the product advertisement is removed from or leaves the field of view. By using a web enabled mobile computing device 1200 illustrated in block diagram form in FIG. 12, equipped with a camera (not shown) and display 1202, such as a smartphone, tablet, or near to eye wearable device that facilitates augmented reality, a user may view the actual product advertisement 1206 through the camera view finder/display as an image 1204, which also includes live video of the product. Information is overlaid, in an augmented reality enhanced view 1204 on camera's captured rendered image of the physical product advertisement 1206 as if it were actually there on the product itself. Various features of the product 1206 may be highlighted in the overlay, and a user may be walked through typical usage of the product by highlighting various features described in text in regard to the product.

In various embodiments, user issued voice commands are executed, and user interface interactions, such as pressing a button on the smart phone 1200 are detected and used to provide further information in the augmented reality enhanced view 1204 of the product advertisement. These user interactions may be used to provide all the information about the product's use directly on top of the actual product advertisement so that one does not have to reference an external source.

In various embodiments, the augmented reality experience may be provided via a tablet or smart phone as illustrated at 1204, running a smartphone application that instructs the user to look at a particular product through a real time camera video feed on the display. When an augmented reality (AR) triggering symbol in the captured image of the product advertisement is recognized in a video feed, corresponding one or more corresponding AR data sets are retrieved and rendered on top of the captured image of the product so as to be superimposed directly on top of the physical object to provide the augmented reality view.

Audio rendered by device 1200 may be used to guide the user. With this framework in place, a user may be visually and optionally audibly walked through any operation on the product and/or be made to understand any of several benefits and advantages of purchasing and using the product.

Figure 13:
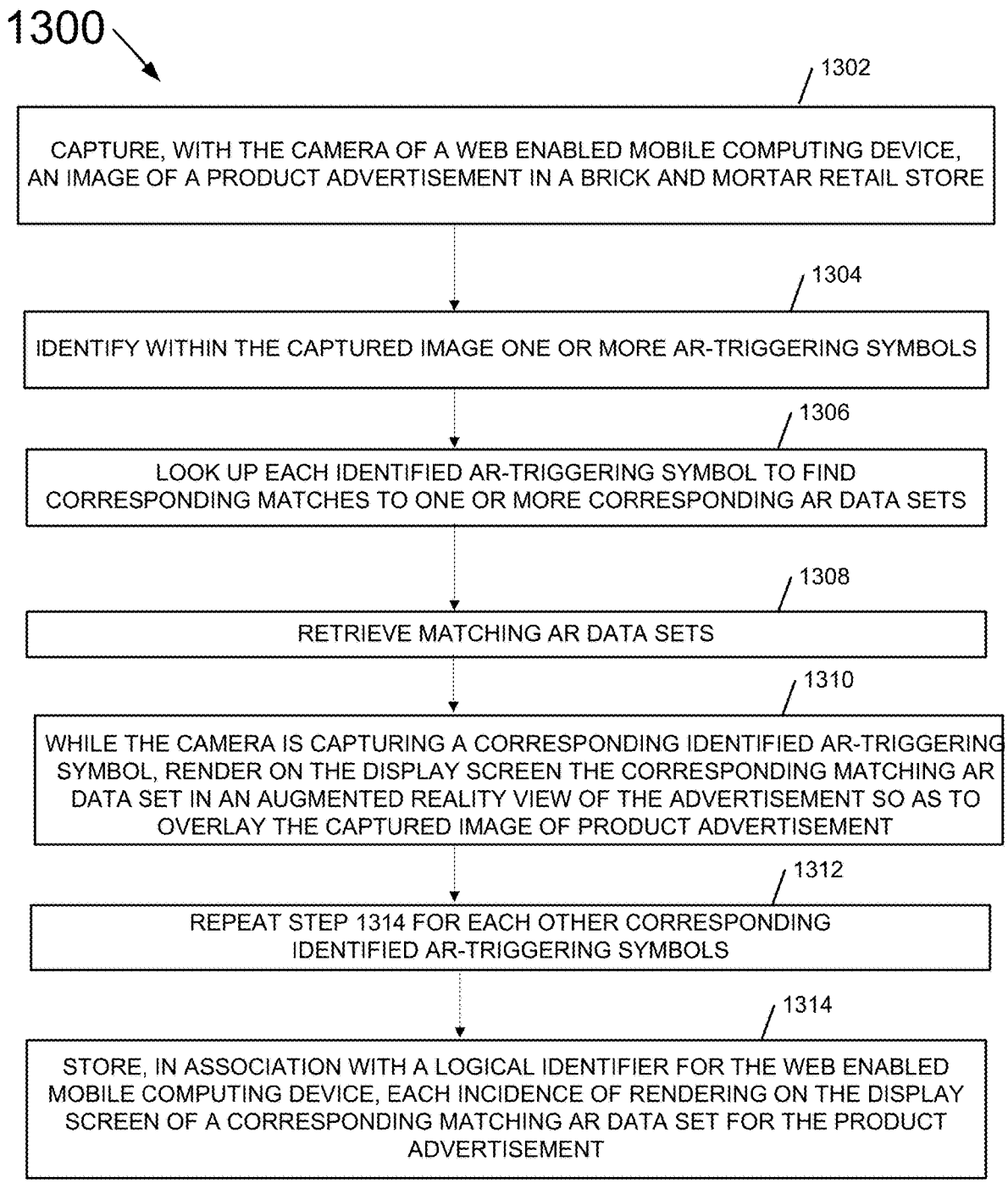
FIG. 13 is a flowchart illustrating a method of providing information about a product utilizing an augmented reality view of the product according to an example embodiment.

FIG. 13 is a flowchart illustrating a method 1300 of providing information about a product utilizing an augmented reality view of the product's advertisement. At 1302, an image of the product advertisement is received via capture with the camera of a web enabled mobile computing device, where an image is that of a product advertisement in a brick and mortar retail store. The image may comprise a single image, or a series of images, such as a video of the product.

At 1304, an AR-triggering symbol found in the captured image of the product advertisement is used to retrieve at steps 1306-1308 and render at 1310 an AR-enhanced view of the captured image of the product advertisement, which view may include information such as a start guide to help a user start using the product. The information may further include information from a product manual having instructions for using different features of the product, including advanced features. Information from the guide relevant to using the product is retrieved or otherwise obtained and rendered at 1306-1312 for each AR-triggering symbol found in the captured image of the product advertisement. At 1314, data is stored, in association with a logical identifier for the web enabled mobile computing device, each incidence of rendering on the display screen of a corresponding matching AR data set for the product advertisement.

In one embodiment, an operation may involve multiple different interactions with the product, and the information associated with the interaction may be sequentially highlighted in an order corresponding to a selected operation on the product. Highlighting may include making an area of the display brighter, blurring other areas, providing a text attribute such as bolding, highlighting, blinking, etc., or other means of highlighting to draw a users attention to the information on the display. In some embodiments, the displayed image of the product is augmented with information descriptive of features of the product.

Other types of information beyond text include animated graphics showing a user various ways to interact with the product. User input gestures may be more easily illustrated by using such an animation to demonstrate the gesture directly overlaid via the augmented view of the product.

Figure 14:
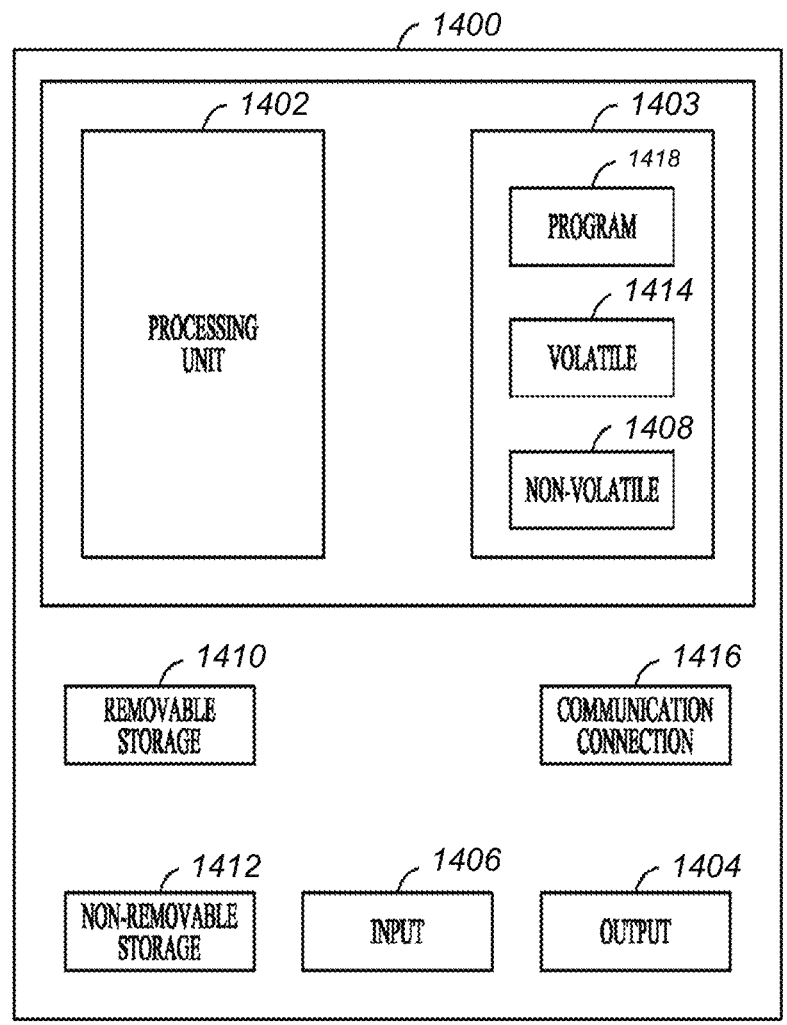
FIG. 14 is a flowchart illustrating a method of providing information about an operation on product utilizing an augmented reality view of the product to inform a user about accomplishing the operation according to an example embodiment.

FIG. 14 is a block schematic diagram of a computer system 1400, such as a web enabled mobile computing device, to implement methods according to example embodiments. Note that in some embodiments, various parts of a method may be implemented in a distributed manner, such that a server or cloud may perform some parts of the methods, or they may be completely self-contained on a single device. All components need not be used in various embodiments, such as web enabled mobile computing devices, smart phones, tablets, and other devices capable of providing augmented reality views of products. One example computing device in the form of a computer 1400 may include a processing unit 1402, memory 1403, removable storage 1410, and non-removable storage 1412. Although the example computing device is illustrated and described as computer 1400, the computing device may be in different forms in different embodiments. For example, the computing device may instead be a smartphone, a tablet, smartwatch, or other computing device including the same or similar elements as illustrated and described with regard to FIG. 14. Devices such as web enabled mobile computing devices, smartphones, tablets, and smartwatches are generally collectively referred to as mobile devices. Further, although the various data storage elements are illustrated as part of the computer 1400, the storage may also or alternatively include cloud-based storage accessible via a network, such as the Internet.

Memory 1403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1400 may include or have access to a computing environment that includes input 1406, output 1404, and a communication connection 1416. Output 1404 may include a display device, such as a touchscreen, that also may serve as an input device. The input 1406 may include one or more of a touchscreen, touchpad, mouse, keyboard, camera, one or more device-specific buttons, one or more sensors integrated within or coupled via wired or wireless data connections to the computer 1400, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, Wi-Fi, Bluetooth, or other networks.

Computer-readable instructions stored on a computer-readable medium are executable by the processing unit 1402 of the computer 1400. A hard drive, CD-ROM, and RAM are some examples of articles including a non-transitory computer-readable medium such as a storage device. The terms computer-readable medium and storage device do not include carrier waves. For example, a computer program 418 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1400 to provide generic access controls in a COM based computer network system having multiple users and servers.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It will be appreciated by those skilled in the art that other variations of the embodiments described herein may also be practiced without departing from the scope of implementations. Other modifications are therefore possible.

What is claimed is:

1. A computer-network implemented method for promoting one or more merchants of a marketing program to one or more members of the marketing program, each of the one or more merchants having a corresponding merchant profile that includes a geographical location and each of the one or more members having a corresponding member profile that includes a geographical location, wherein the one or more member profiles and the one or more merchant profiles of the marketing program are stored on a data storage device, each of the one or more member profiles including a participant identifier of the corresponding member, the method comprising:
    monitoring, receiving, and storing in the data storage device, electronic signals representing data related to incidences, for the one or more members, of rendering on respective display screens of an augmented reality (AR) view of a corresponding product advertisement containing an AR triggering symbol, wherein the stored data related to each said AR view of the product advertisement activity of the one or more members is indexed by the participant identifier of the corresponding member of the one or more members;
    detecting an occurrence of a transaction associated with a merchant of the one or more merchants;
    receiving or accessing data associated with the transaction;
    determining a participant identifier of the one or more members from the data associated with the transaction;
    determining a length of elapsed time between the occurrence of the transaction and the occurrence of the AR view of the product advertisement activity of the one or more members;
    triggering, as a result of detecting the occurrence of the transaction associated with the participant identifier, a determination of whether:
        the transaction is linked to any AR view of the product advertisement activity of the one or more members with the participant identifier; and
        the respective geographical locations of the one or more members and the merchant of the one or more merchants are in the same vicinity;
    and
    if so, then:
        determining with a level of certainty whether the transaction is linked to the AR view of the product advertisement activity of the one or more members with the participant identifier, wherein the determined level of certainty varies based on:
            the length of the elapsed time;
            the data related to the AR view of the product advertisement activity of the one or more members; and
            the data associated with the transaction;
        and
        based on the determined level of certainty and the data related to the AR view of the product advertisement activity of the one or more members, generating one or more incentives.

2. The method as defined in claim 1, wherein the vicinity is selected from, the group consisting of a city block, a neighborhood, a city, a street, a community park area, a county, a province, a state, a country, a geographic area in which travel time between merchants and customers does not exceed a predetermined threshold, and a predetermined geographical region.

3. The method as defined in claim 2, wherein:
    the one or more incentives comprises applying a benefit to a community program;
    the benefit is donation to the community program; and
    the community program corresponds to a community having a geographical location in the vicinity.

4. The method as defined in claim 1, further comprising:
    generating and communicating a post-transaction survey to the one or more members after the detection of the transaction with the merchant; and
    using the result of the post-transaction survey to compute the determined level of certainty.

5. The method as defined in claim 1, wherein the determination of the respective geographical locations of the one or more members and the merchant of the one or more merchants are in the same vicinity is made, at least in part, by location tracking transceiver hardware using a short range wireless network operating protocol that is at least one of the 802.11 family of standards and the frequency range of 2.4 to 2.48 GHz.

6. The method as defined in claim 1, wherein the generating of the one or more incentives is performed using a neural network of an artificial intelligence engine.

7. The method as defined in claim 6, wherein:
    the transaction associated with the merchant of the one or more merchants is conducted by one said member; and
    the generating of the one or more incentives using the neural network of the artificial intelligence engine uses:
        the corresponding member profile of the one said member; and
        the corresponding merchant profile of the merchant of the one or more merchants.

8. The method as defined in claim 1, wherein:
    the transaction associated with the merchant of the one or more merchants is conducted by one said member; and
    transaction data for the transaction between the one said member and the merchant of the one or more merchants are communicated by data signals exchanged via near field communication (NFC) devices for the transaction between one said member and the merchant of the one or more merchants.

9. A system comprising:
    at least one processor;
    a network interface;
    memory storing instructions executable at the at least one processor to cause the system to:
        monitor, receive, and store in the memory electronic signals representing data related to incidences, for the one or more members, of rendering on respective display screens of an augmented reality (AR) view of a corresponding product advertisement containing an AR triggering symbol, wherein the stored data related to each said AR view of the product advertisement activity of the one or more members is indexed by the participant identifier of the corresponding member of the one or more members;

detect an occurrence of a transaction associated with a merchant of the one or more merchants;

receive or access data associated with the transaction;

determine a participant identifier of the one or more members from the data associated with the transaction;

determine a length of elapsed time between the occurrence of the transaction and the occurrence of the AR view of the product advertisement activity of the one or more members;

trigger, as a result of detecting the occurrence of the transaction associated with the participant identifier, a determination of whether:

the transaction is linked to any AR view of the product advertisement activity of the one or more members with the participant identifier; and the respective geographical locations of the one or more members and the merchant of the one or more merchants are in the same vicinity;

and if so, then:

determine with a level of certainty whether the transaction is linked to the AR view of the product advertisement activity of the one or more members with the participant identifier, wherein the determined level of certainty varies based on:

the length of the elapsed time;

the data related to the AR view of the product advertisement activity of the one or more members; and the data associated with the transaction; and based on the determined level of certainty and the data related to the AR view of the product advertisement activity of the one or more members, generate one or more incentives.

10. The system as defined in claim 9, wherein the vicinity is selected from, the group consisting of a city block, a neighborhood, a city, a street, a community park area, a county, a province, a state, a country, a geographic area in which travel time between merchants and customers does not exceed a predetermined threshold, and a predetermined geographical region.

11. The system as defined in claim 10, wherein:

the one or more incentives comprises applying a benefit to a community program;

the benefit is donation to the community program; and the community program corresponds to a community having a geographical location in the vicinity.

12. The system as defined in claim 9, wherein the memory storing instructions executable at the at least one processor further cause the system to:

generate and communicate a post-transaction survey to the one or more members after the detection of the transaction with the merchant; and use the result of the post-transaction survey to compute the determined level of certainty.

13. The system as defined in claim 9, wherein the determination of the respective geographical locations of the one or more members and the merchant of the one or more merchants are in the same vicinity is made, at least in part, by location tracking transceiver hardware using a short range wireless network operating protocol that is at least one of the 802.11 family of standards and the frequency range of 2.4 to 2.48 GHz.

14. The system as defined in claim 9, wherein the generating of the one or more incentives is performed using a neural network of an artificial intelligence engine.

15. The system as defined in claim 14, wherein:

the transaction associated with the merchant of the one or more merchants is conducted by one said member; and the generating of the one or more incentives using the neural network of the artificial intelligence engine uses:

the corresponding member profile of the one said member; and the corresponding merchant profile of the merchant of the one or more merchants.

16. The system as defined in claim 14, wherein each said incentive is, at least in part, a donation by the merchant of the one or more merchants of a portion of the amount of a future transaction conducted by the one said member to a charity selected by the one said member.

17. The system as defined in claim 9, wherein:

the transaction associated with the merchant of the one or more merchants is conducted by one said member; and transaction data for the transaction between the one said member and the merchant of the one or more merchants are communicated by data signals exchanged via near field communication (NFC) devices for the transaction between one said member and the merchant of the one or more merchants.

18. A non-transitory computer-readable medium or media storing computer instructions which when executed by at least one computer processor causes the at least one computer processor to perform a method comprising:

monitoring, receiving, and storing in the data storage device, electronic signals representing data related to incidences, for the one or more members, of rendering on respective display screens of an augmented reality (AR) view of a corresponding product advertisement containing an AR triggering symbol, wherein the stored data related to each said AR view of the product advertisement activity of the one or more members is indexed by the participant identifier of the corresponding member of the one or more members;

detecting an occurrence of a transaction associated with a merchant of the one or more merchants;

receiving or accessing data associated with the transaction;

determining a participant identifier of the one or more members from the data associated with the transaction;

determining a length of elapsed time between the occurrence of the transaction and the occurrence of the AR view of the product advertisement activity of the one or more members;

triggering, as a result of detecting the occurrence of the transaction associated with the participant identifier, a determination of whether:

the transaction is linked to any AR view of the product advertisement activity of the one or more members with the participant identifier; and the respective geographical locations of the one or more members and the merchant of the one or more merchants are in the same vicinity;

and if so, then:

determining with a level of certainty whether the transaction is linked to the AR view of the product advertisement activity of the one or more members with the participant identifier, wherein the determined level of certainty varies based on:
the length of the elapsed time;
the data related to the AR view of the product advertisement activity of the one or more members; and
the data associated with the transaction;
and
based on the determined level of certainty and the data related to the AR view of the product advertisement activity of the one or more members, generating one or more incentives.

19. The non-transitory computer-readable medium or media storing computer instructions as defined in claim 18, wherein the generating of the one or more incentives is performed using a neural network of an artificial intelligence engine.

20. The system as defined in claim 19, wherein:
the transaction associated with the merchant of the one or more merchants is conducted by one said member;
the generating of the one or more incentives using the neural network of the artificial intelligence engine uses:
the corresponding member profile of the one said member; and
the corresponding merchant profile of the merchant of the one or more merchants;
and
each said incentive is, at least in part, a donation by the merchant of the one or more merchants of a portion of the amount of a future transaction conducted by the one said member to a charity selected by the one said member.

* * * * *